(12) United States Patent
Ishii

(10) Patent No.: US 11,378,860 B2
(45) Date of Patent: Jul. 5, 2022

(54) DIMMING DEVICE, IMAGE DISPLAY DEVICE, AND DISPLAY DEVICE, AND DIMMING DEVICE MANUFACTURING METHOD

(71) Applicant: SONY CORPORATION, Tokyo (JP)

(72) Inventor: Yui Ishii, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 141 days.

(21) Appl. No.: 16/754,665

(22) PCT Filed: Sep. 14, 2018

(86) PCT No.: PCT/JP2018/034209
§ 371 (c)(1),
(2) Date: Apr. 8, 2020

(87) PCT Pub. No.: WO2019/077920
PCT Pub. Date: Apr. 25, 2019

(65) Prior Publication Data
US 2020/0355976 A1 Nov. 12, 2020

(30) Foreign Application Priority Data
Oct. 17, 2017 (JP) .............................. JP2017-201028

(51) Int. Cl.
*G02F 1/153* (2006.01)
*G02F 1/03* (2006.01)
(Continued)

(52) U.S. Cl.
CPC ......... *G02F 1/161* (2013.01); *G02B 27/0172* (2013.01); *G02F 1/155* (2013.01);
(Continued)

(58) Field of Classification Search
CPC .......... G02F 1/0316; G02F 3/16; G02F 1/163; G02F 1/155; G02F 1/1523; G02F 1/1525;
(Continued)

(56) References Cited

U.S. PATENT DOCUMENTS

| 5,216,536 A | 6/1993 | Agrawal et al. |
| 2004/0051931 A1 | 3/2004 | Minami et al. |

(Continued)

FOREIGN PATENT DOCUMENTS

| CN | 1471656 A | 1/2004 |
| CN | 1471656 A1 | 1/2004 |

(Continued)

OTHER PUBLICATIONS

Extended European Search Report of EP Application No. 18867331.3, dated Sep. 21, 2020, 07 pages.

(Continued)

*Primary Examiner* — Dawayne Pinkney
(74) *Attorney, Agent, or Firm* — Chip Law Group

(57) ABSTRACT

A dimming device 700 includes a first substrate 711 and a second substrate 712, a first electrode 731 formed on top of the first substrate 711, a dimming layer 720 formed on top of the first electrode 731, a second electrode 732 formed on top of at least the dimming layer 720, a moisture-retaining member 741 that covers at least the second electrode 732 and faces the second substrate 712, and sealing members 733, 734, 735, and 736 provided in an edge portion of the first substrate 711, and a moisture-retaining member extending portion 743 that extends from the moisture-retaining member 741 is disposed between the sealing member and the second substrate 712, and a thickness of the moisture-retaining member extending portion 743 is thinner than a thickness of the moisture-retaining member 742 in a central portion of the dimming device 700.

20 Claims, 32 Drawing Sheets

(51) Int. Cl.
  *G02F 1/15* (2019.01)
  *G09G 3/19* (2006.01)
  *G09G 3/38* (2006.01)
  *H04N 9/16* (2006.01)
  *G02F 1/161* (2006.01)
  *G02B 27/01* (2006.01)
  *G02F 1/155* (2006.01)

(52) U.S. Cl.
  CPC ................ *G02B 2027/0118* (2013.01); *G02B 2027/0174* (2013.01)

(58) Field of Classification Search
  CPC ........ G02F 1/1521; G02F 1/1533; G02F 1/03; C09K 9/02; B60R 1/088; H04N 9/3137; H04N 9/22
  USPC ........... 359/265–277, 245–247, 242; 345/49, 345/105; 348/817; 438/929
  See application file for complete search history.

(56) References Cited

U.S. PATENT DOCUMENTS

2015/0370075 A1    12/2015  Ato et al.
2019/0227309 A1*   7/2019   Kadono ................. G09G 3/36

FOREIGN PATENT DOCUMENTS

| | | |
|---|---|---|
| CN | 104520753 A | 4/2015 |
| EP | 1437621 A1 | 7/2004 |
| EP | 2959333 A1 | 12/2015 |
| JP | 58-211123 A | 12/1983 |
| JP | 09-304796 A | 11/1997 |
| JP | 2014-160169 A | 9/2014 |
| KR | 10-2004-0031684 A | 4/2004 |
| KR | 10-2015-0119837 A | 10/2015 |
| TW | 201433824 A | 9/2014 |
| WO | 2003/034139 A1 | 4/2003 |
| WO | 2014/129109 A1 | 8/2014 |
| WO | 2018/012108 A1 | 1/2018 |

OTHER PUBLICATIONS

International Search Report and Written Opinion of PCT Application No. PCT/JP2018/034209, dated Nov. 13, 2018, 10 pages of ISRWO.

* cited by examiner

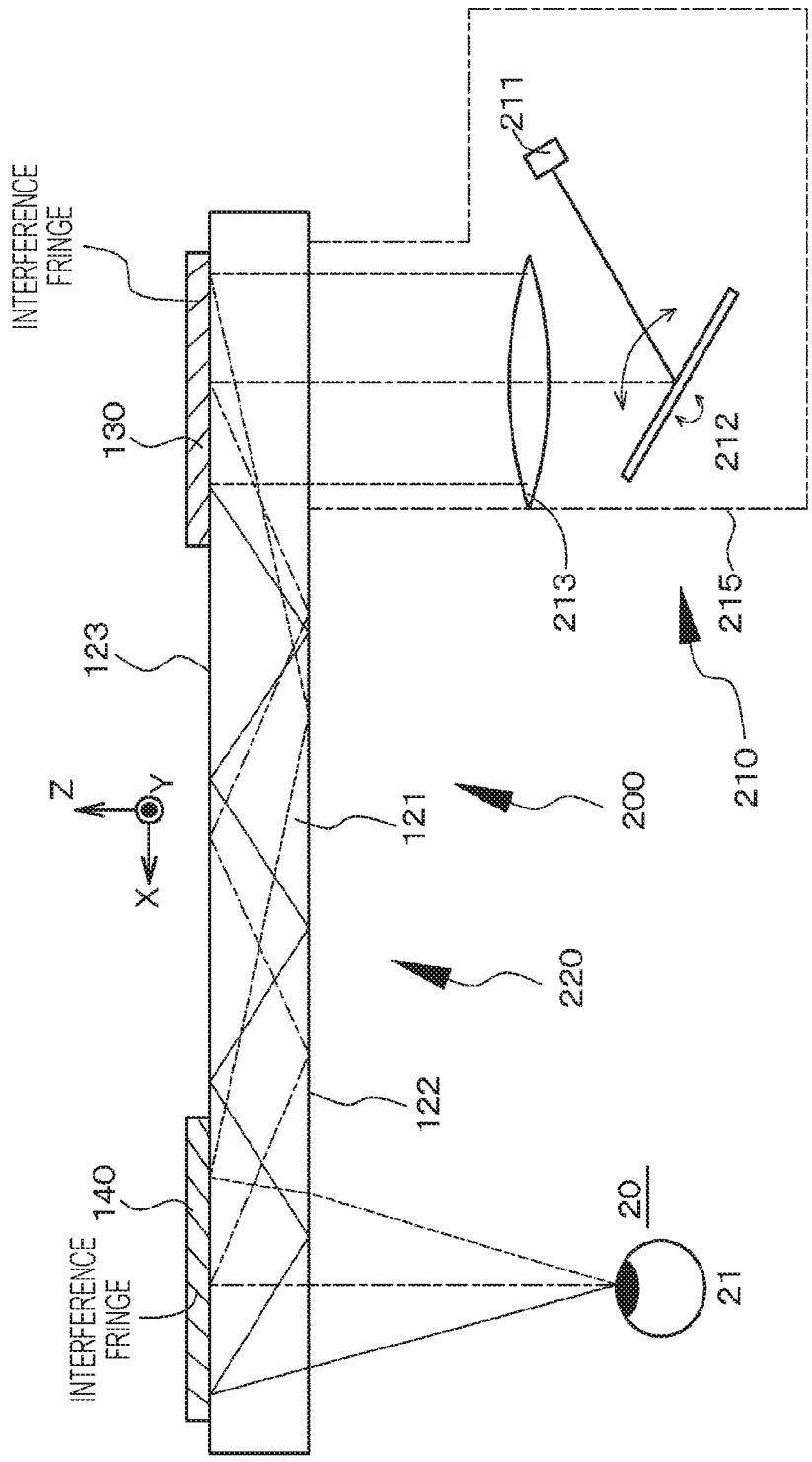

excluded

DIMMING DEVICE, IMAGE DISPLAY DEVICE, AND DISPLAY DEVICE, AND DIMMING DEVICE MANUFACTURING METHOD

CROSS REFERENCE TO RELATED APPLICATIONS

This application is a U.S. National Phase of International Patent Application No. PCT/JP2018/034209 filed on Sep. 14, 2018, which claims priority benefit of Japanese Patent Application No. JP 2017-201028 filed in the Japan Patent Office on Oct. 17, 2017. Each of the above-referenced applications is hereby incorporated herein by reference in its entirety.

TECHNICAL FIELD

The present disclosure relates to a dimming device, an image display device including the dimming device, and a display device including the image display device, and more specifically, for example, relates to a display device used for a head-mounted display (HMD) and a dimming device manufacturing method.

BACKGROUND ART

In recent years, augmented reality (AR) technology that synthesizes and presents a virtual object and various kinds of information in a form of electronic information to a real environment (or a part thereof) as additional information has attracted attention. In order to achieve the augmented reality technology, for example, a head mounted display has been studied as a device for presenting visual information. In addition, as an application field, work support in a real environment has been expected, and examples thereof include provision of road guidance information and provision of technical information to an engineer who performs maintenance or the like, for example. Particularly, a head mounted display is very convenient because of not occupying hands. Furthermore, even in a case where a person wants to enjoy videos and images while moving outdoors, the person can capture videos, images, and an external environment at the same time in the field of view. Therefore, the person can move smoothly.

A virtual image display device (display device) for causing an observer to observe a two-dimensional image formed by an image forming device as an enlarged virtual image by a virtual image optical system is well known. In addition, by forming a virtual image based on a two-dimensional image in the display device, an observer can view the formed virtual image superimposed on an image of an outside world. By the way, in a case where an environment around the display device is very bright or depending on contents of the formed virtual image, a sufficient contrast cannot be imparted to a virtual image observed by an observer disadvantageously. Therefore, a means for solving such a problem, that is, a virtual image display device (display device) including a dimming device is well known from, for example, Japanese Patent Application Laid-Open No. 2012-252091.

However, in a case where a dimming layer constituting a dimming device is constituted by an electrochromic material and light transmittance is changed by applying a color change of a substance generated by a redox reaction of the electrochromic material, if moisture disappears in the dimming layer, a phenomenon that a color change does not occur in the dimming layer occurs.

Claim 1 of Japanese Patent Application Laid-Open No. 2007-101947 discloses a transmission type electrochromic element obtained by sequentially laminating a first transparent conductive film, a porous electron-leaking solid electrolyte film, an electron-leaking electrochromic film, and a second transparent conductive film on a transparent substrate and sticking a transparent sealing substrate onto the second transparent conductive film via a transparent sealing material. Here, the sealing material is a hygroscopic sealing material, the thickness of the sealing material is 50 μm or more, and preferably 50 to 500 μm (refer to claim 6 of Japanese Patent Application Laid-Open No. 2007-101947), and the hygroscopic sealing material is any one of an epoxy resin, PVA, and PVB (refer to claim 7 of Japanese Patent Application Laid-Open No. 2007-101947).

CITATION LIST

Patent Document

Patent Document 1: Japanese Patent Application Laid-Open No. 2012-252091
Patent Document 2: Japanese Patent Application Laid-Open No. 2007-101947

SUMMARY OF THE INVENTION

Problems to be Solved by the Invention

In the technology disclosed in Japanese Patent Application Laid-Open No. 2007-101947, the sealing material can internally hold $H_2O$, $H^+$, and $OH^-$. As a result, a part of $O_2$ gas or $H_2$ gas generated from the solid electrolyte film by coloring/decoloring of the electrochromic element passes through the electrochromic film and the transparent conductive film or a reflective film/electrode film and is taken into $H_2O$ in the sealing material that internally holds $H_2O$, $H^+$, and $OH^-$. Therefore, it is considered that $O_2$ gas or $H_2$ gas generated from the solid electrolyte film is hardly accumulated at an interface between the solid electrolyte film and the electrochromic film, and film peeling at the interface between the solid electrolyte film and the electrochromic film hardly occurs. However, the sealing material disclosed in Japanese Patent Application Laid-Open No. 2007-101947 merely takes in a part of $O_2$ gas or $H_2$ gas generated in the electrochromic element. Japanese Patent Application Laid-Open No. 2007-101947 does not mention any means for suppressing occurrence of a phenomenon that a color change does not occur in the electrochromic element when moisture disappears in the electrochromic element. Moreover, according to the technology disclosed in Japanese Patent Application Laid-Open No. 2007-101947, because the thickness of the sealing material 52 on the transparent electrode film 50 is fixed and the edges of the solid electrolyte film 46, the EC film 48, and the transparent electrode film 50 are covered by the sealing material 52, the edges (sides) of the sealing material 52 are thick. Consequently, if a case occurs in which moisture enters or exits through the sealing material 52, the increased entering and exiting of moisture creates the problem of lowered reliability of the electrochromic element.

Consequently, an object of the present disclosure is to provide a dimming device having a highly reliable configuration and structure that is furthermore capable of suppressing the occurrence of a phenomenon in which a color change does not occur in a dimming layer when moisture disappears inside the dimming layer, an image display device including such a dimming device, and a display device including such an image display device, and a dimming device manufacturing method.

Solutions to Problems

A dimming device according to a first aspect of the present disclosure for achieving the above object includes:
  a first substrate;
  a second substrate, disposed facing the first substrate, which external light enters;
  a first electrode formed on top of the first substrate;
  a dimming layer formed on top of the first electrode;
  a second electrode formed on top of at least the dimming layer;
  a moisture-retaining member that covers at least the second electrode and faces the second substrate; and
  a sealing member provided in an edge portion of the first substrate, in which
  a moisture-retaining member extending portion that extends from the moisture-retaining member is disposed between the sealing member and the second substrate, and
  a thickness of the moisture-retaining member extending portion is thinner than a thickness of the moisture-retaining member in a central portion of the dimming device.

A dimming device according to a second aspect of the present disclosure for achieving the above object includes:
  a first substrate;
  a second substrate, disposed facing the first substrate, which external light enters;
  a first electrode formed on top of the first substrate;
  a dimming layer formed on top of the first electrode;
  a second electrode formed on top of at least the dimming layer; and
  a moisture-retaining member that covers at least the second electrode and faces the second substrate, in which
  the dimming device further includes
  a first sealing member disposed on top of an edge portion of the first substrate, and
  a second sealing member disposed between the first sealing member and the second substrate.

An image display device of the present disclosure for achieving the above object includes:
  an image forming device;
  an optical device having a virtual image forming region where a virtual image is formed on the basis of light emitted from the image forming device; and
  a dimming device that adjusts the amount of external light incident from outside, disposed to face at least the virtual image forming region, in which
  the dimming device includes the dimming device according to the first aspect of the present disclosure described above. Alternatively, the dimming device includes the dimming device according to the second aspect of the present disclosure described above.

A display device of the present disclosure for achieving the above object includes:
  a frame to be mounted on a head of an observer; and
  an image display device attached to the frame, in which the image display device includes:
  an image forming device;
  an optical device having a virtual image forming region where a virtual image is formed on the basis of light emitted from the image forming device; and
  a dimming device that adjusts the amount of external light incident from outside, disposed to face at least the virtual image forming region, and
  the dimming device includes the dimming device according to the first aspect of the present disclosure described above. Alternatively, the dimming device includes the dimming device according to the second aspect of the present disclosure described above.

A dimming device manufacturing method of the present disclosure for achieving the above object includes the steps of:
  forming a first electrode, a dimming layer, and a second electrode on top of a first substrate, and after providing a sealing member in an edge portion of the first substrate;
  disposing a moisture-retaining member on top of at least the second electrode, and disposing a moisture-retaining member extending portion that extends from the moisture-retaining member on top of the sealing member; and
  disposing a second substrate on top of the moisture-retaining member and the moisture-retaining member extending portion. Thus, according to this dimming device manufacturing method, the dimming device of the first aspect of the present disclosure can be obtained.

2A, and a plan view of the first substrate and the like of the dimming device of Example 3 as viewed from the light-incident side (above).

Figure 2A:
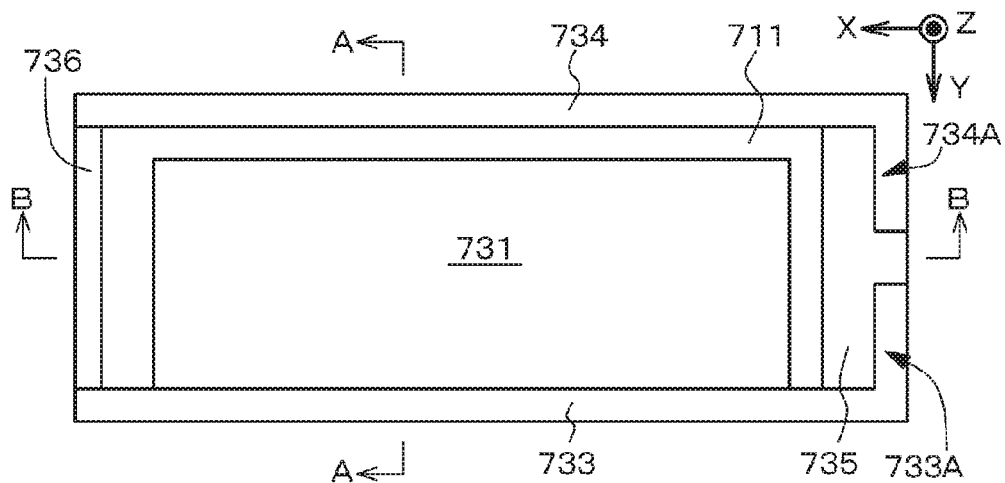
FIGS. 2A and 2B are a plan view of the first substrate and the like and a plan view of the second substrate and the like when viewing the dimming device of Example 1 from the light-incident side (above).
Figure 11:
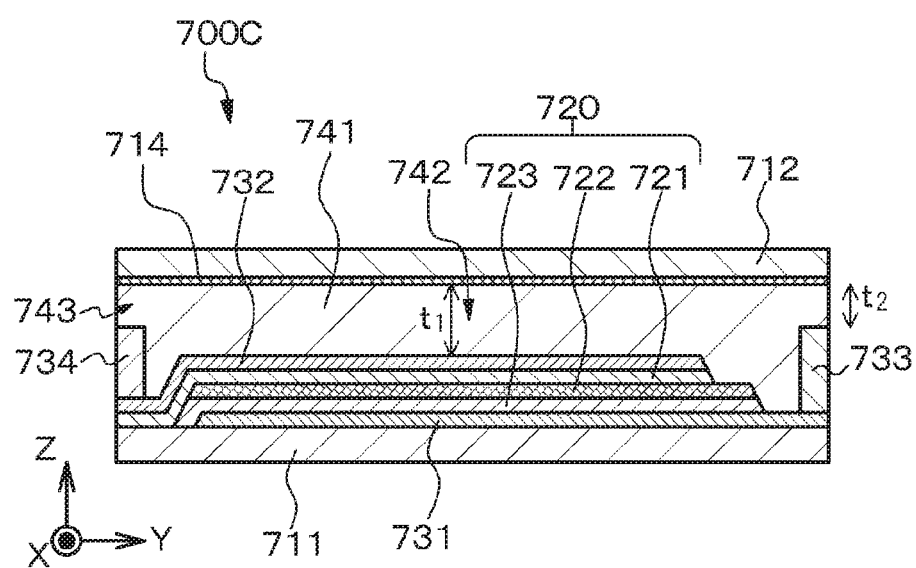

FIG. 11 is a schematic cross-sectional view similar to a view obtained by cutting a dimming device of Example 4 along the arrow A-A in FIG. 2A.

Figure 12A:
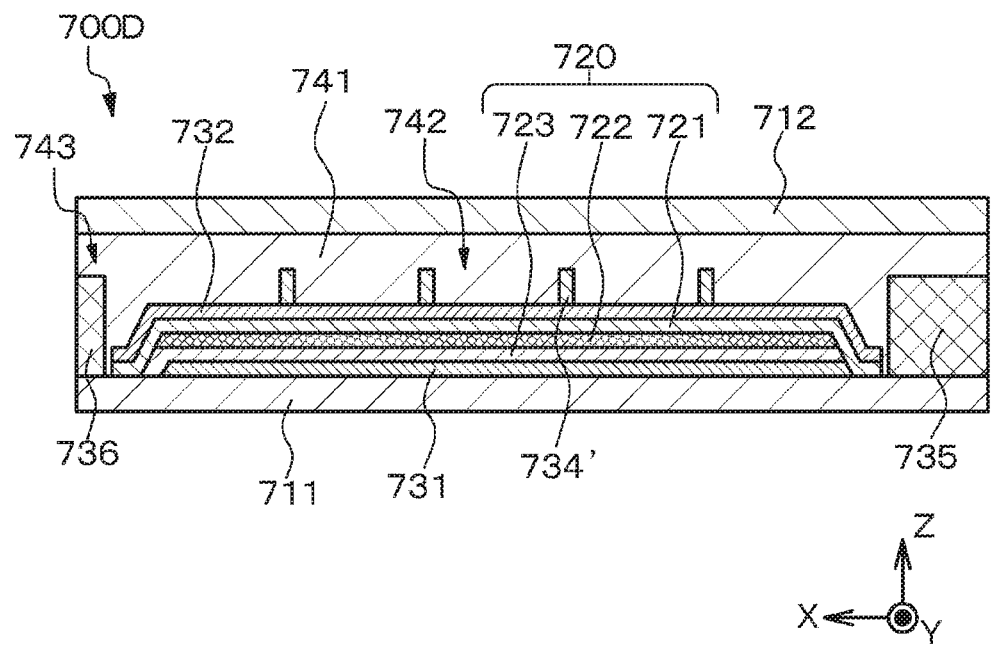
Figure 12B:
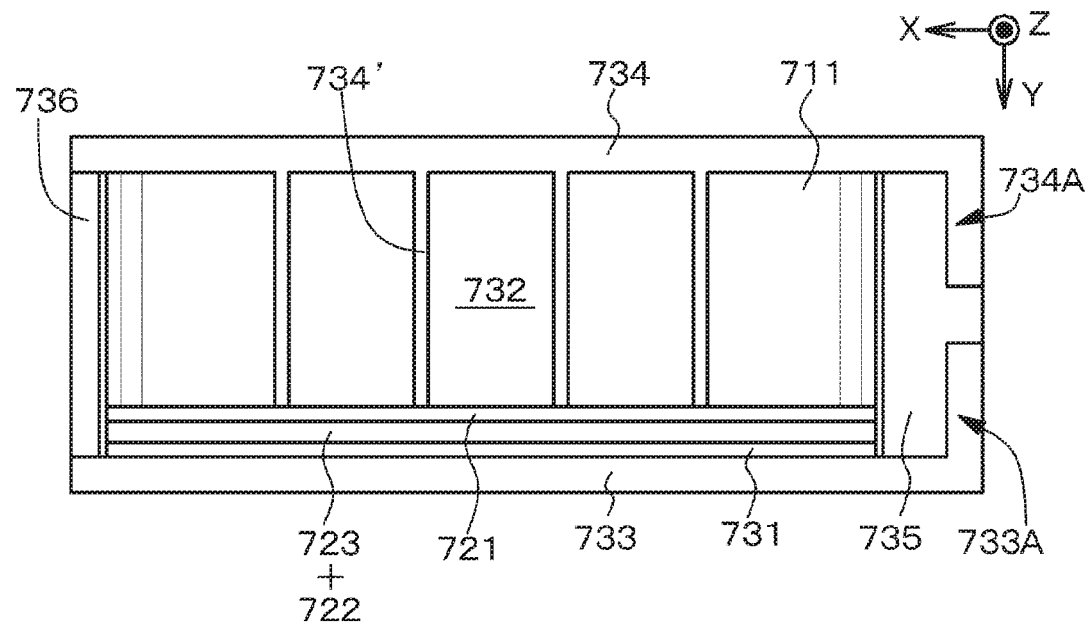

FIGS. 12A and 12B are, respectively, a schematic cross-sectional view similar to a view obtained by cutting a dimming device of Example 5 along the arrow B-B in FIG. 2A, and a plan view of a second electrode and the like as viewed from the light-incident side (above).

Figure 13A:
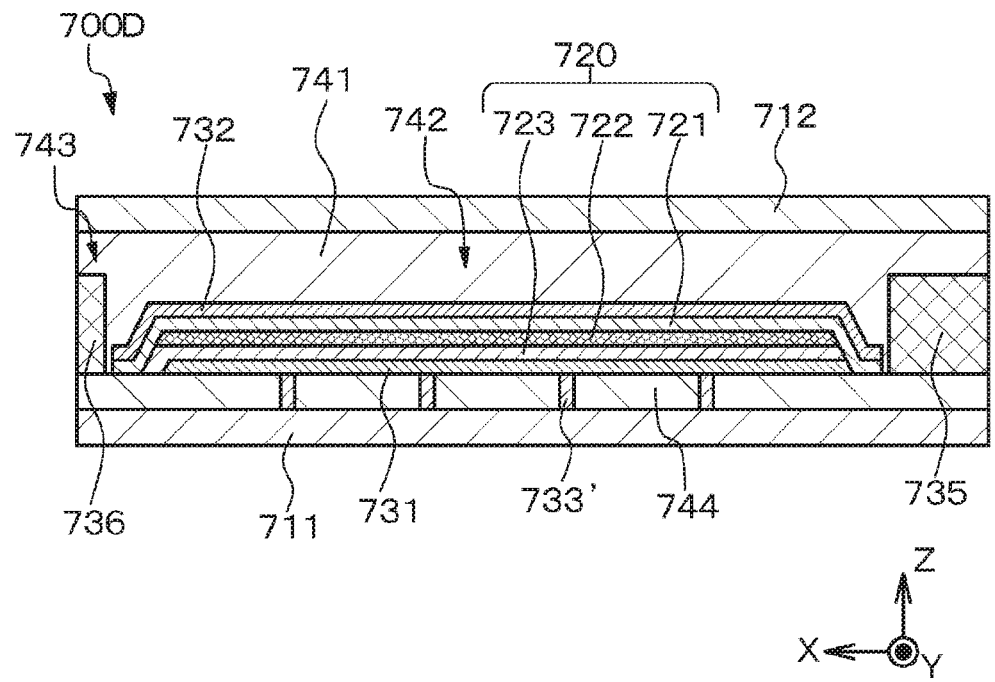
Figure 13B:
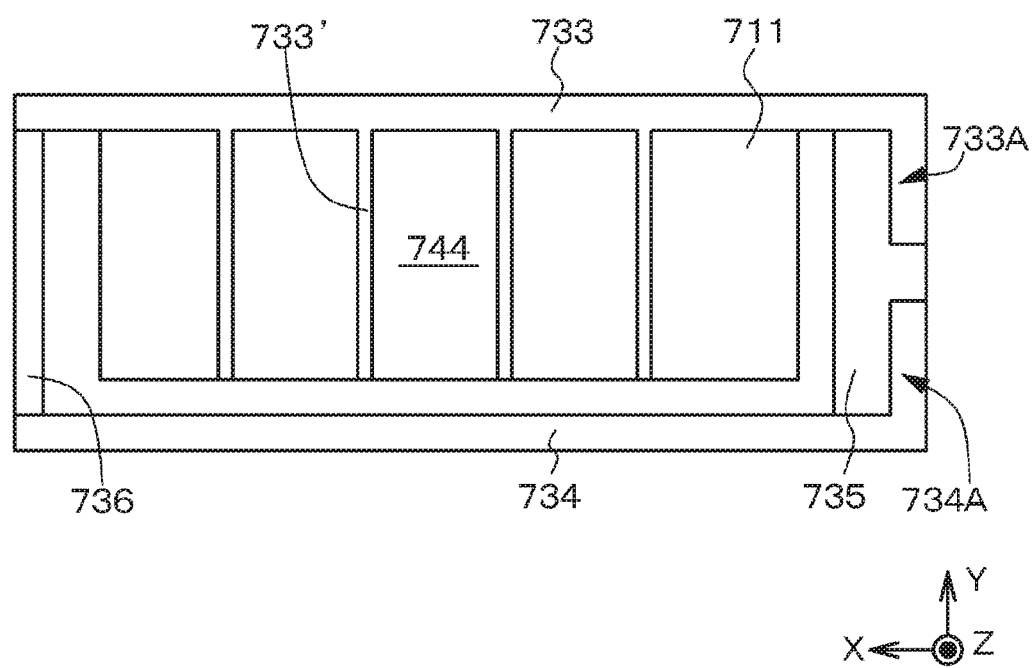

FIGS. 13A and 13B are, respectively, a schematic cross-sectional view similar to a view obtained by cutting the dimming device of Example 5 along the arrow B-B in FIG. 2A, and a plan view of a first electrode and the like as viewed from the opposite side of the light-incident side (below).

Figure 14:
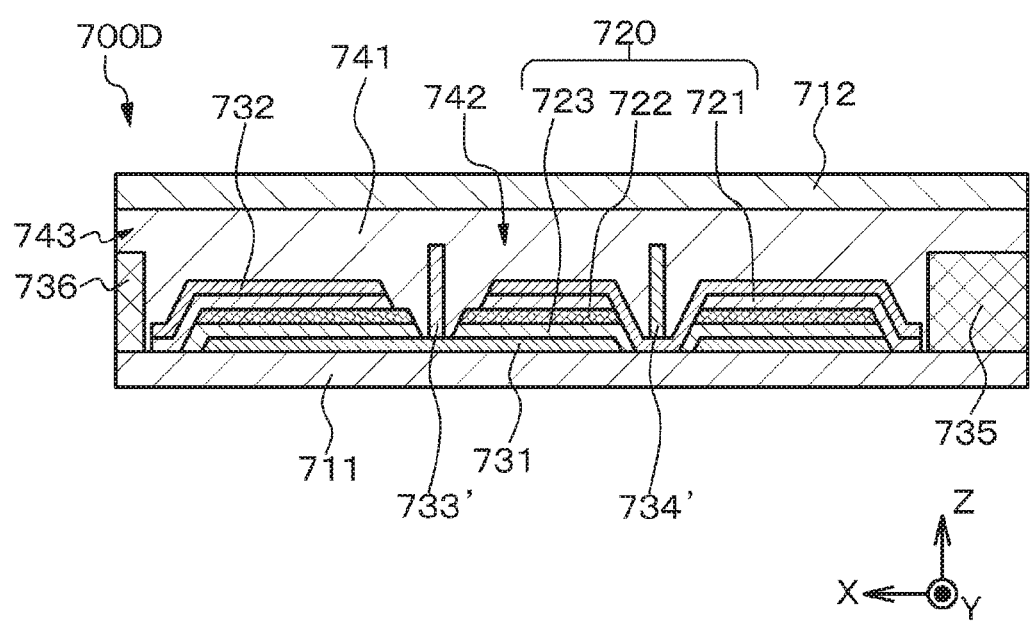

FIG. 14 is a schematic cross-sectional view similar to a view obtained by cutting a different modified example of the dimming device of Example 5 along the arrow B-B in FIG. 2A.

Figure 15A:
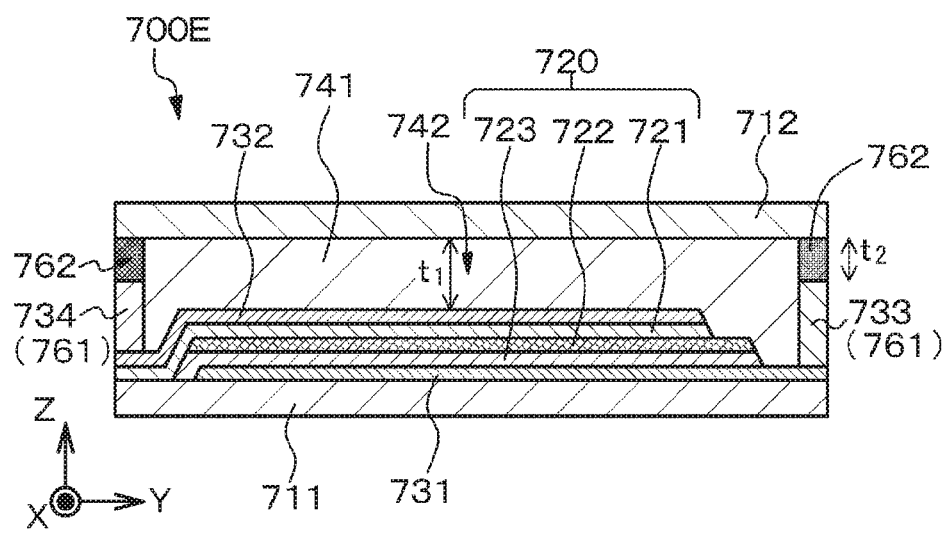
Figure 15B:
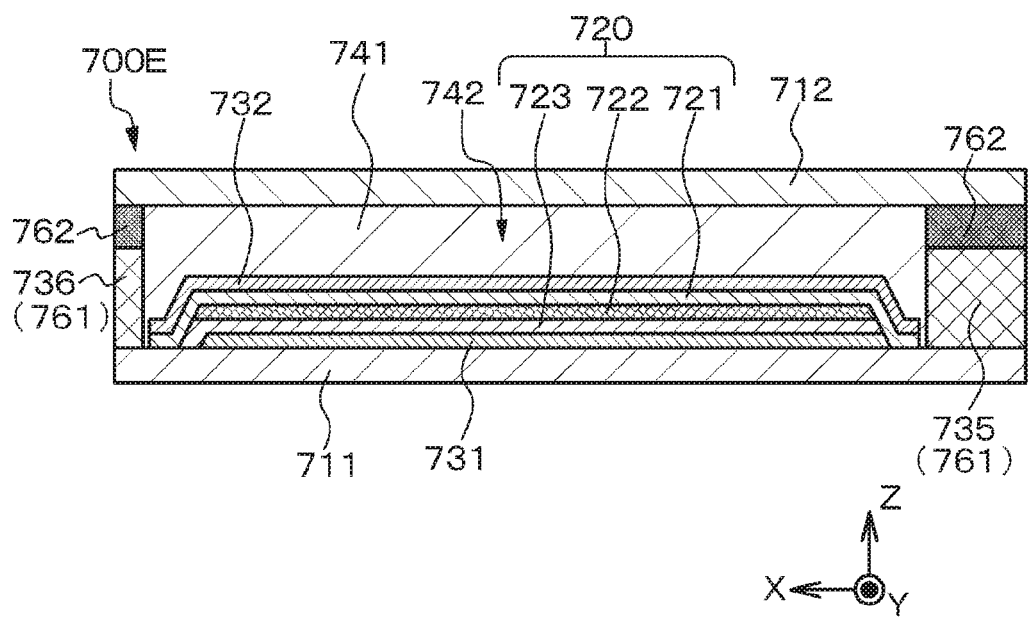

FIGS. 15A and 15B are schematic cross-sectional views similar to views obtained by cutting a dimming device of Example 6 along the arrow A-A and the arrow B-B in FIG. 2A, respectively.

Figure 16A:
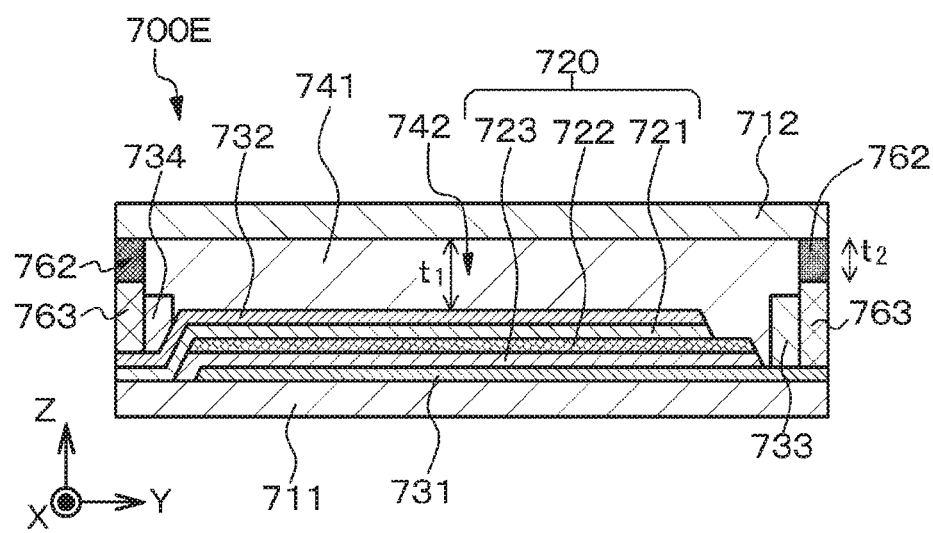
Figure 16B:
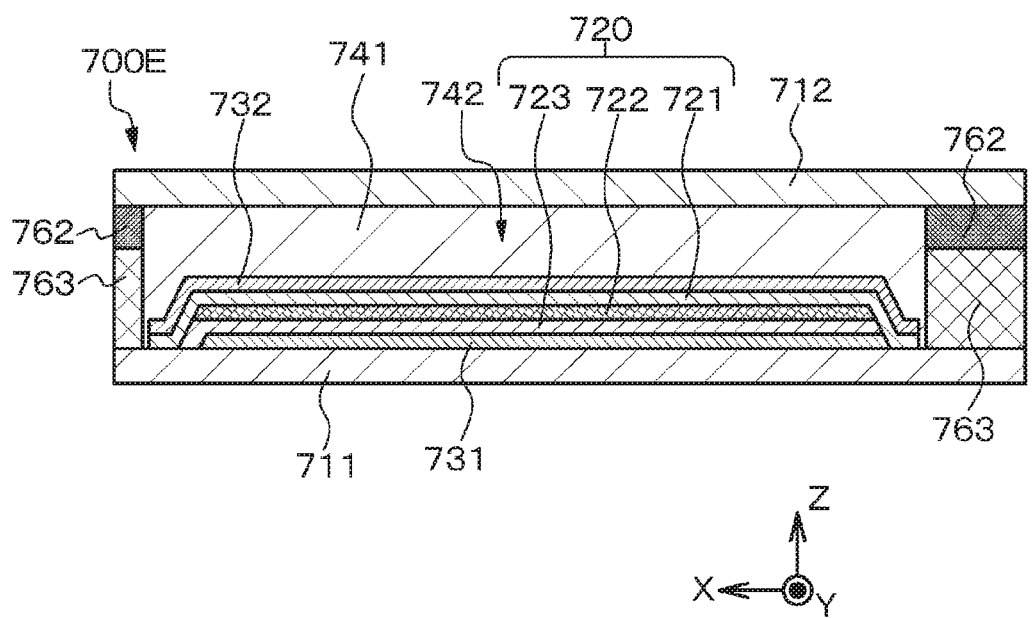

FIGS. 16A and 16B are schematic cross-sectional views similar to views obtained by cutting a modified example of the dimming device of Example 6 along the arrow A-A and the arrow B-B in FIG. 2A, respectively.

FIG. 17 is a conceptual diagram of an image display device of Example 7.

Figure 18:
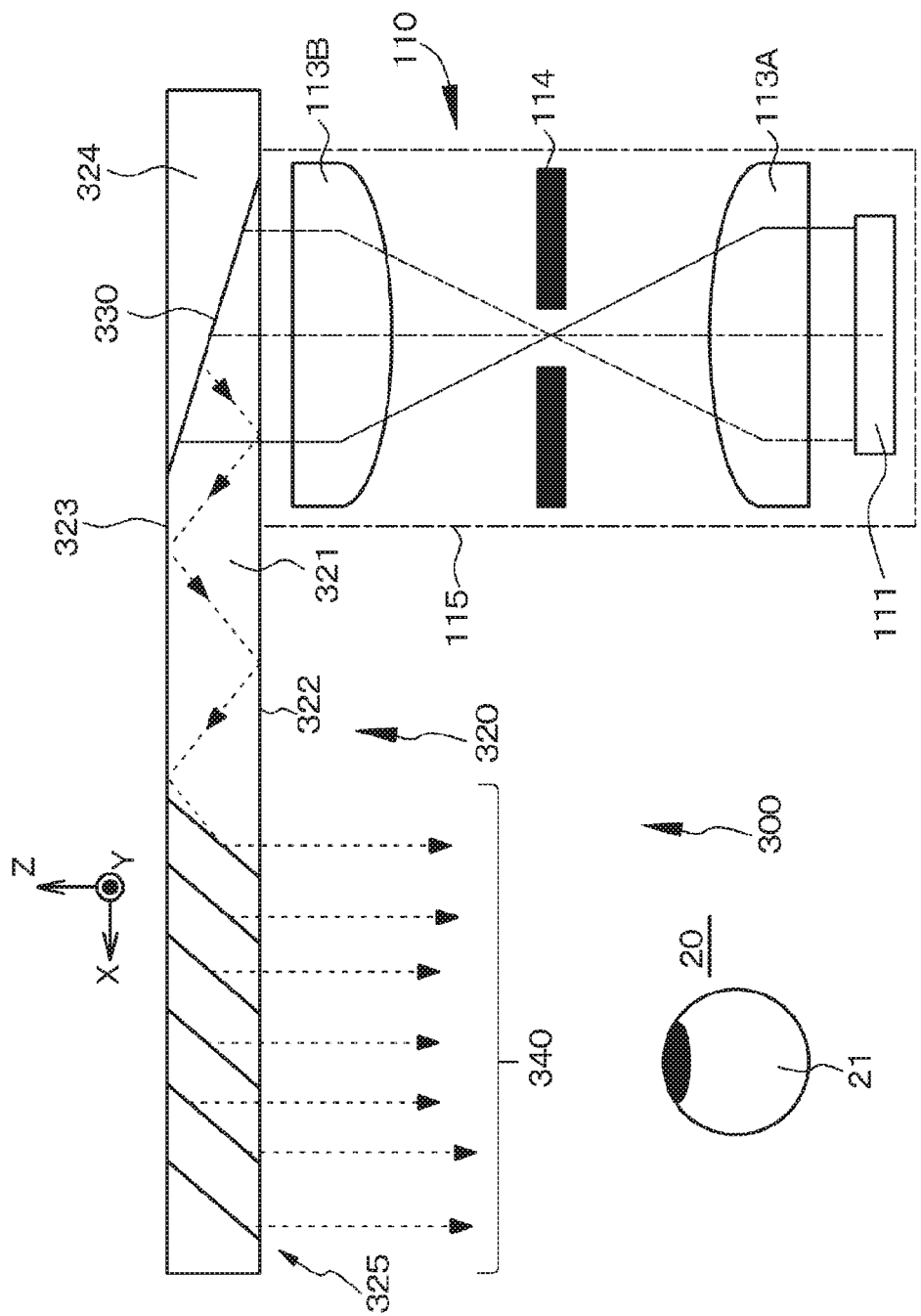

FIG. 18 is a conceptual diagram of an image display device of Example 8 (modified example of Example 1).

Figure 19:
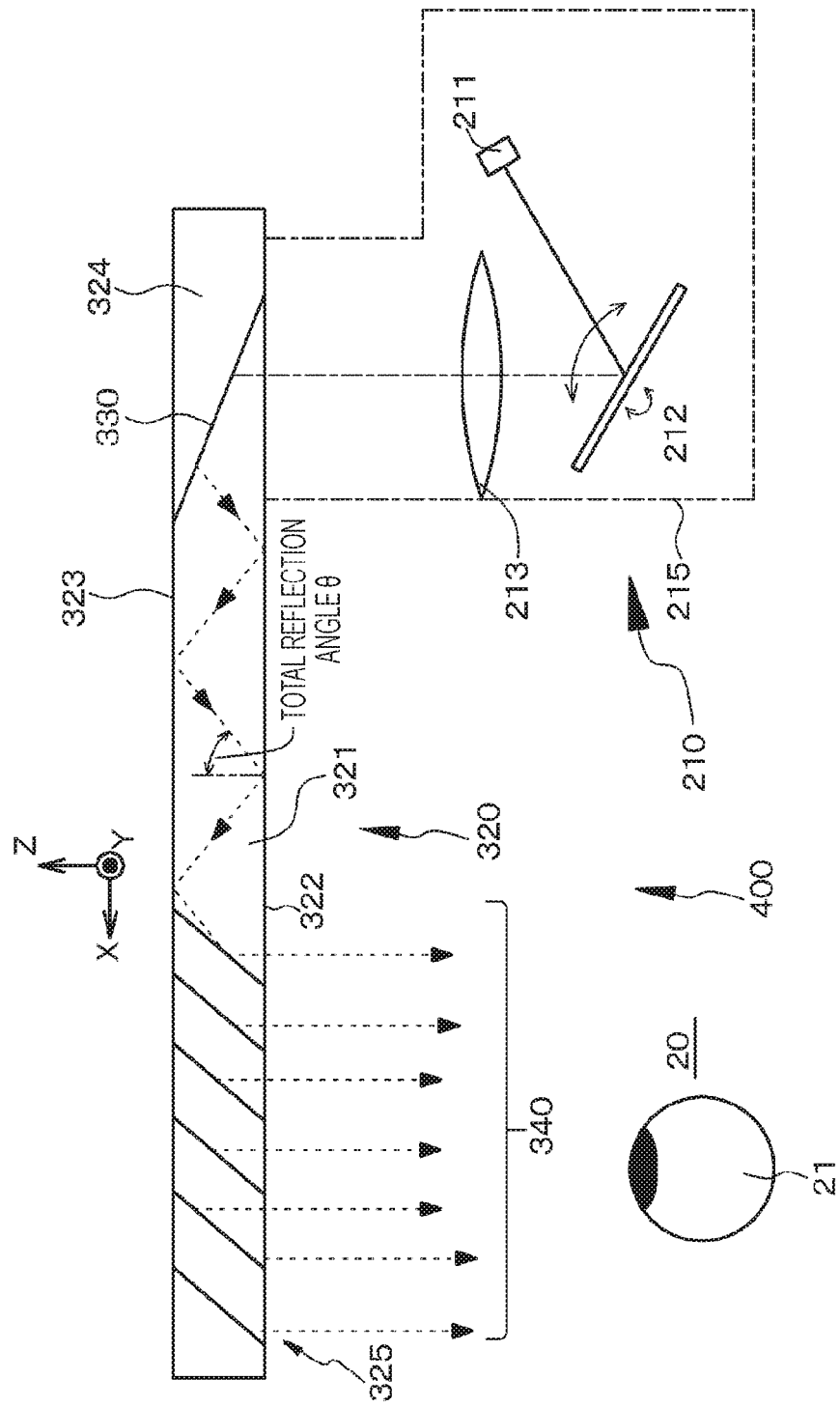

FIG. 19 is a conceptual diagram of the image display device of Example 8 (modified example of Example 7).

Figure 20:
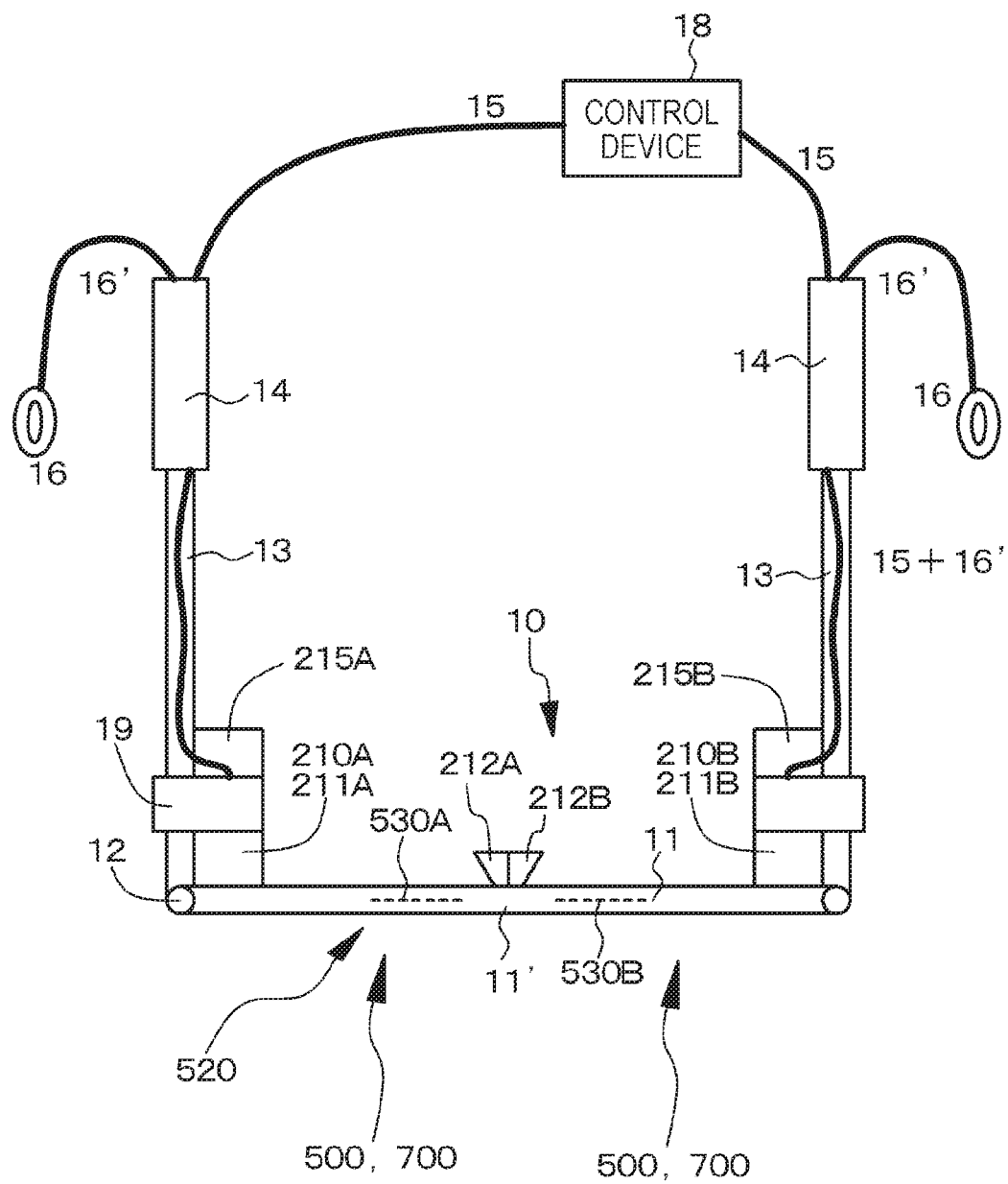

FIG. 20 is a conceptual diagram of an image display device in a display device of Example 9.

Figure 21A:
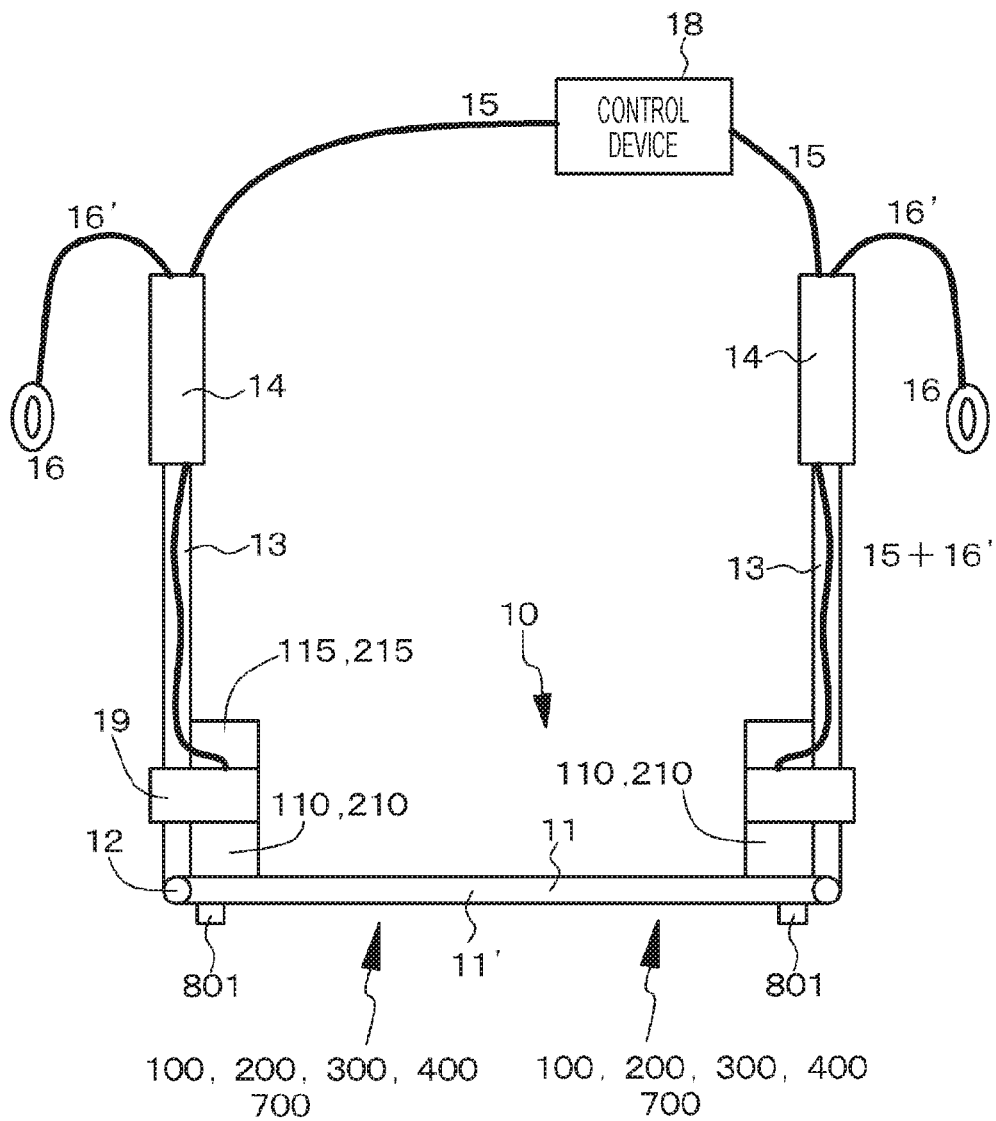
Figure 21B:
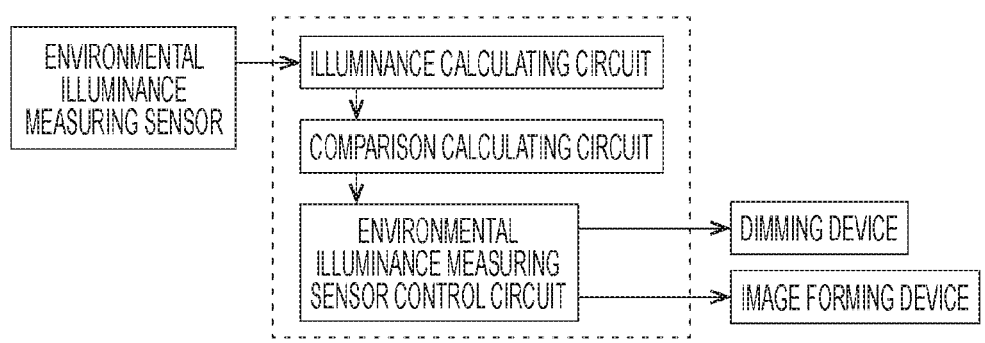

FIG. 21A is a schematic view of a display device of Example 10 as viewed from above. FIG. 21B is a schematic diagram of a circuit for controlling an illuminance sensor.

Figure 22A:
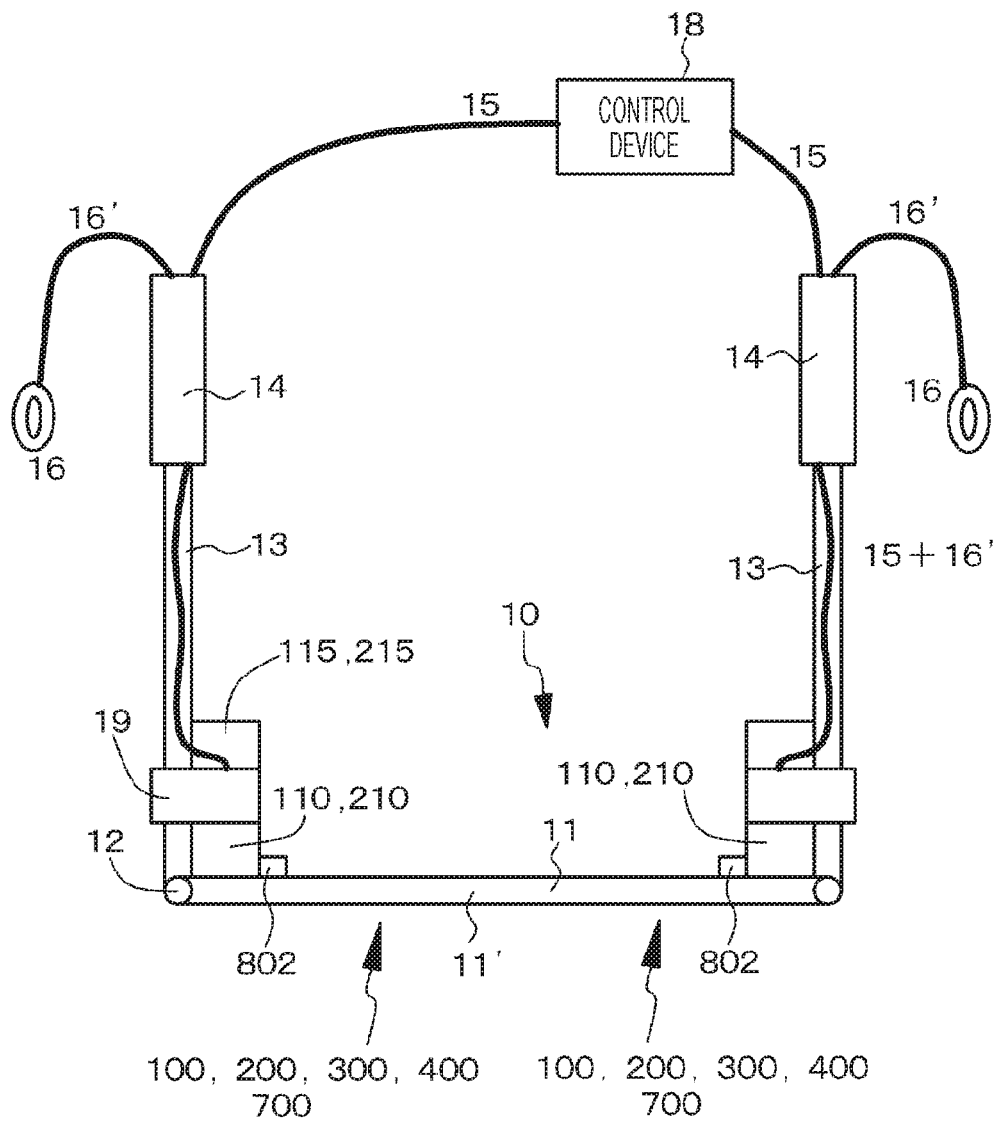
Figure 22B:
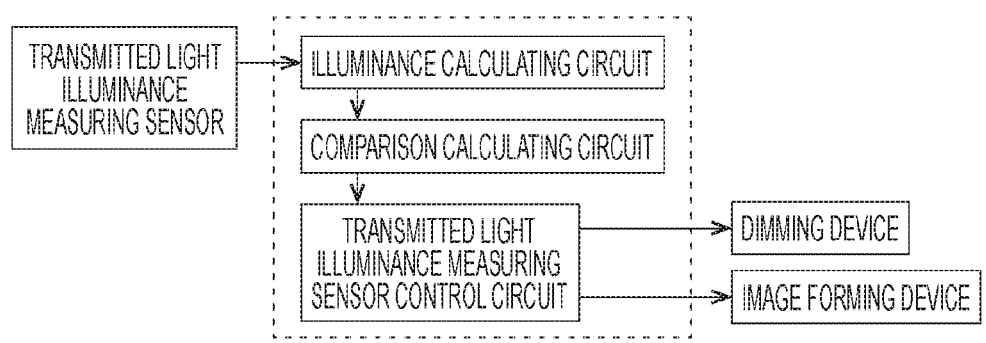

FIG. 22A is a schematic view of a display device of Example 11 as viewed from above. FIG. 22B is a schematic diagram of a circuit for controlling an illuminance sensor.

Figure 23:
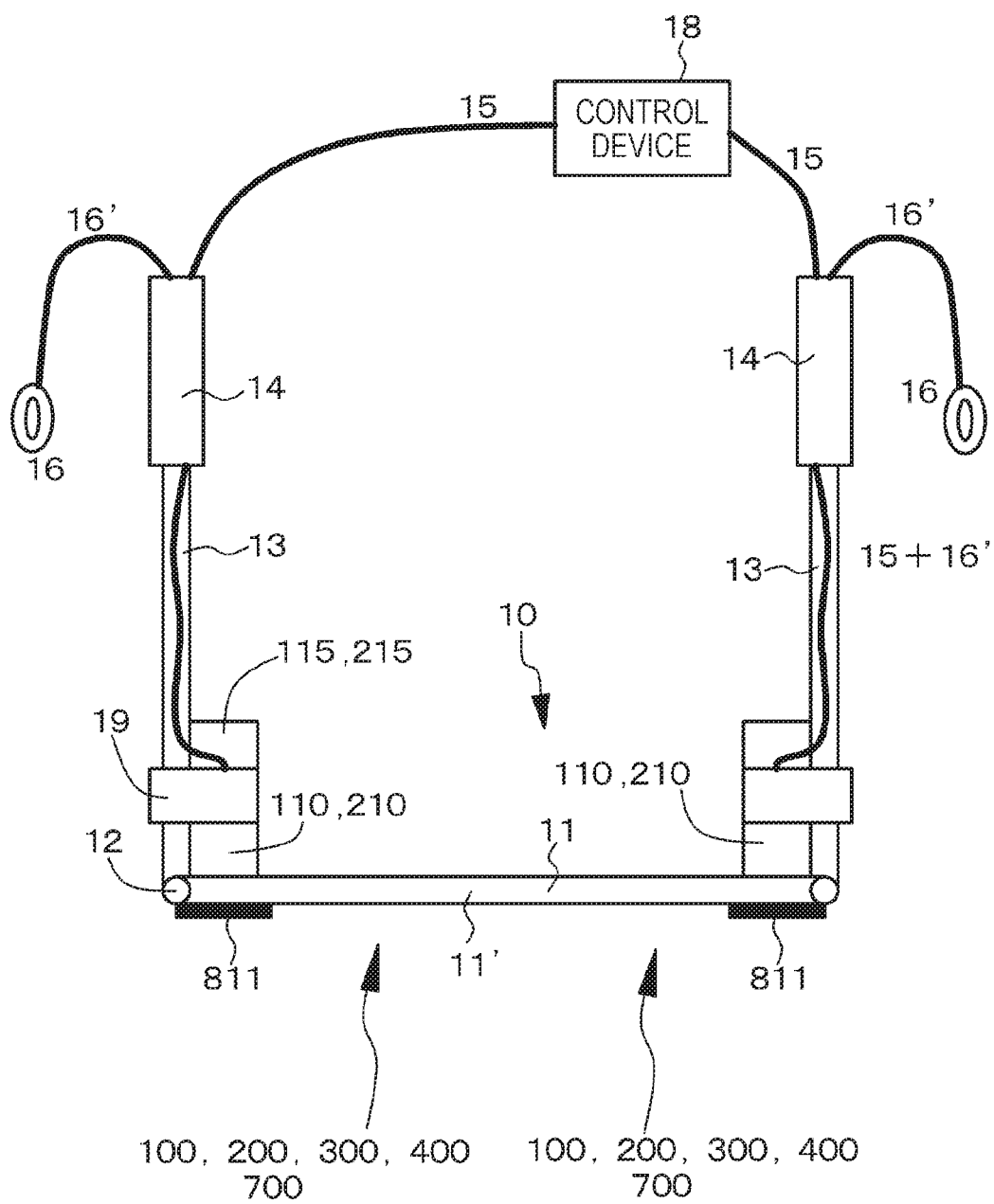

FIG. 23 is a schematic view of a display device of Example 12 as viewed from above.

Figure 24:
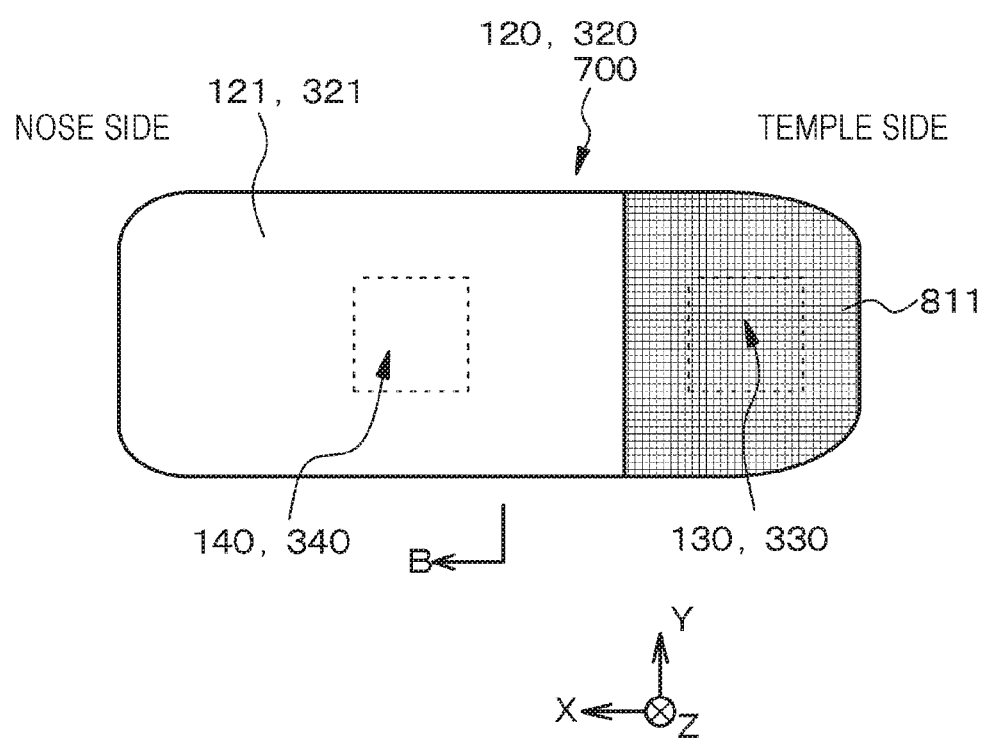

FIG. 24 is a schematic front view of an optical device and a dimming device in the display device of Example 12 illustrated in FIG. 23.

Figure 25:
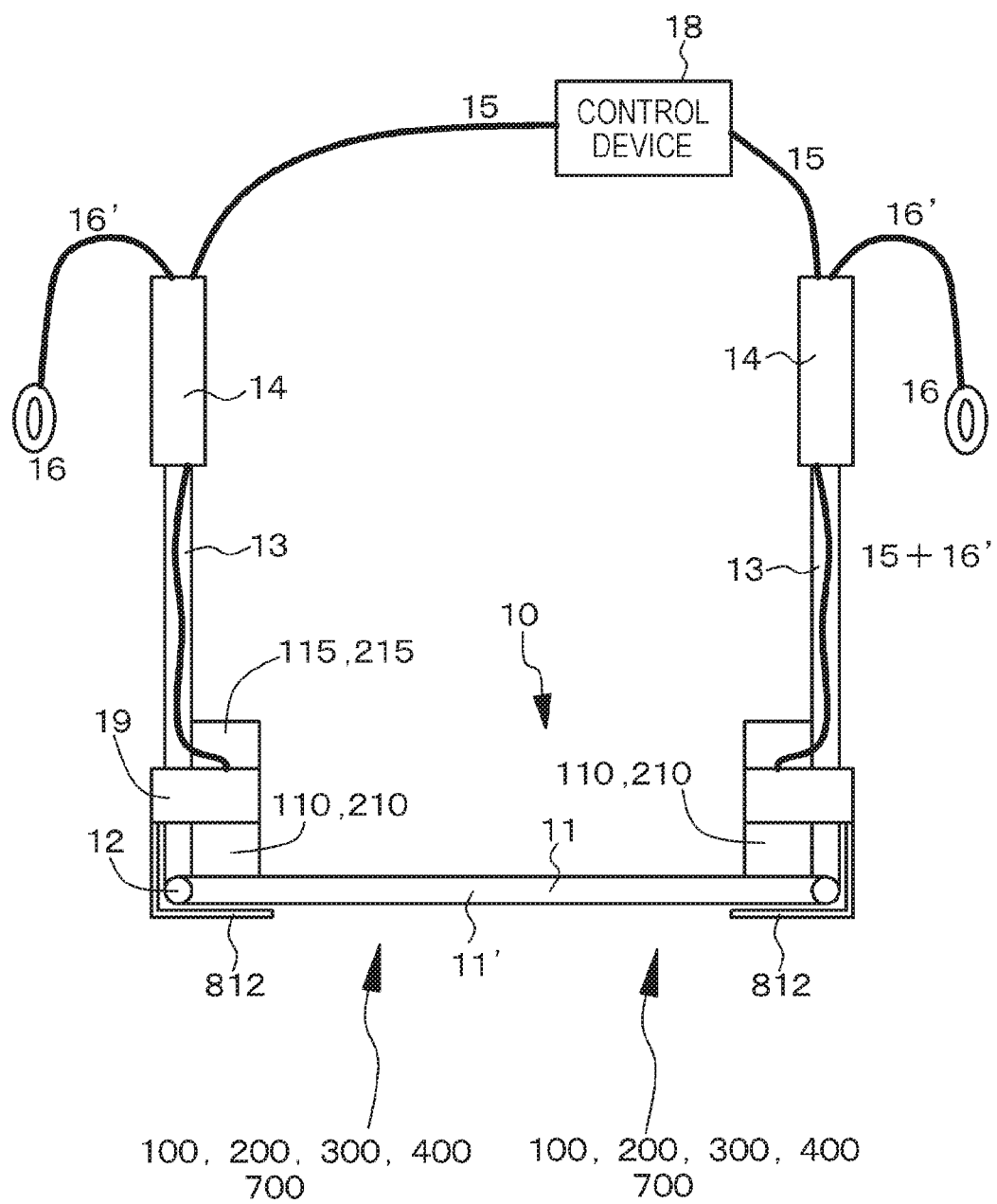

FIG. 25 is a schematic view of a different display device of Example 12 as viewed from above.

Figure 26:
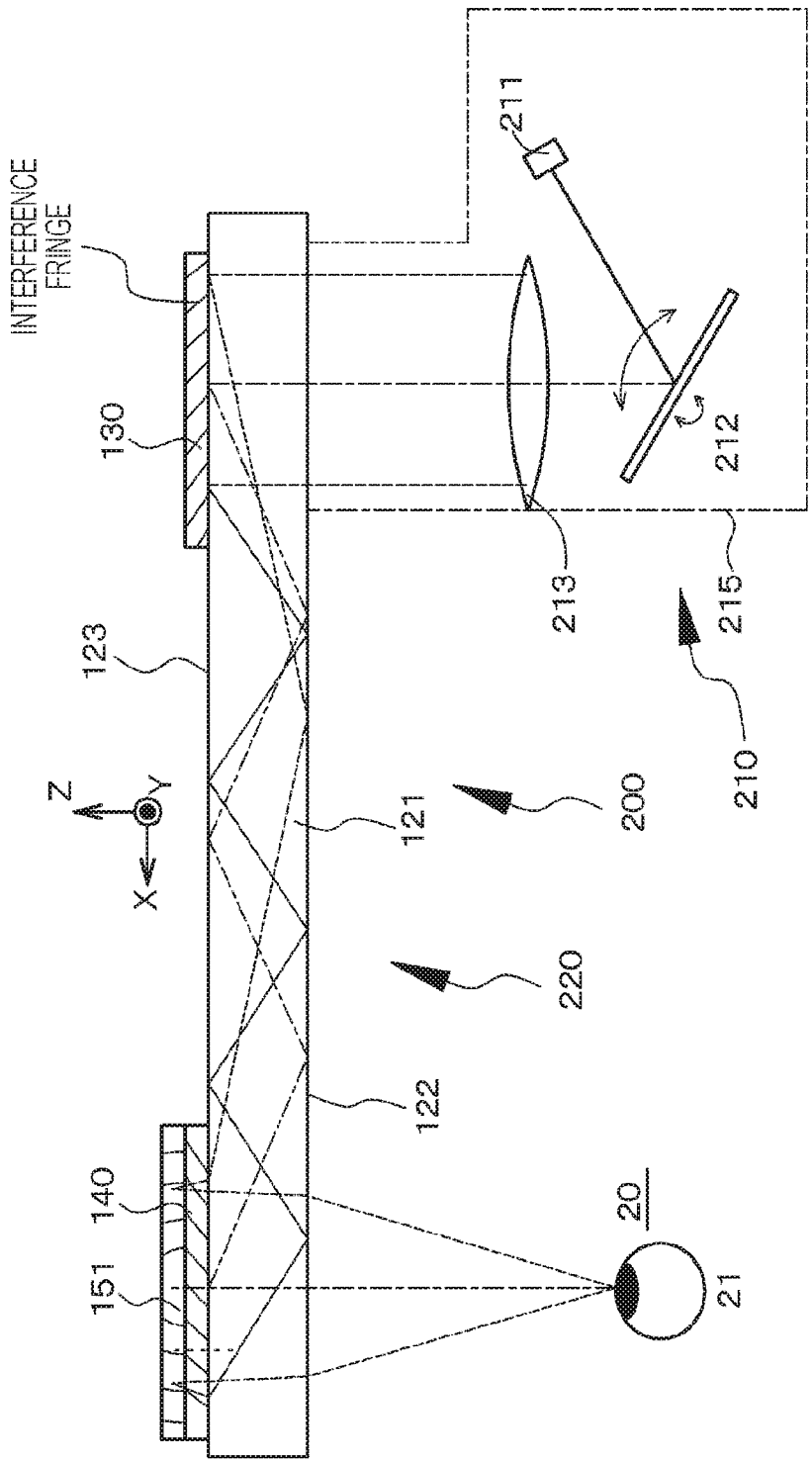

FIG. 26 is a conceptual diagram of an image display device of Example 13.

Figure 27:
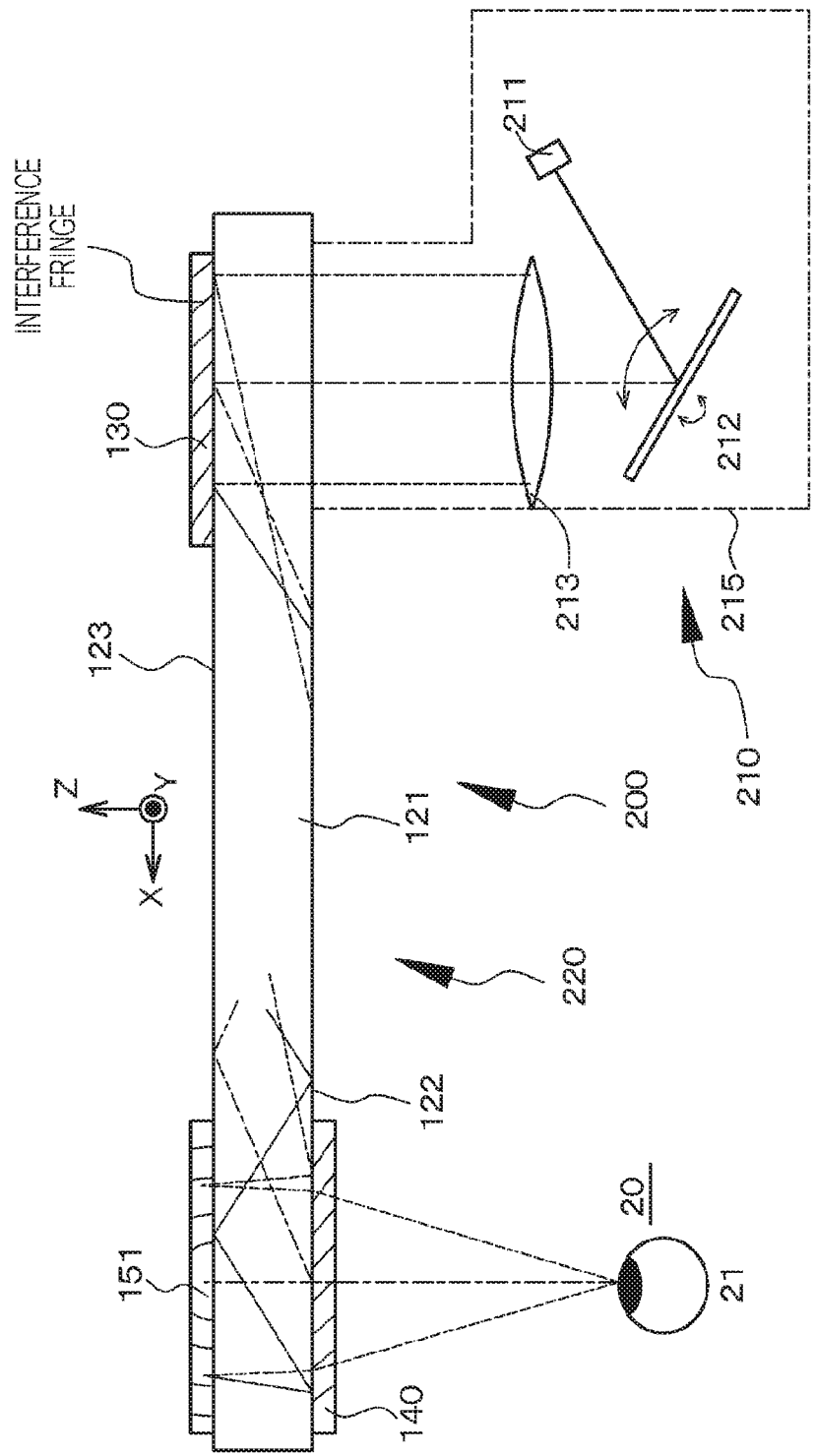

FIG. 27 is a conceptual diagram of an image display device of Example 13.

Figure 28:
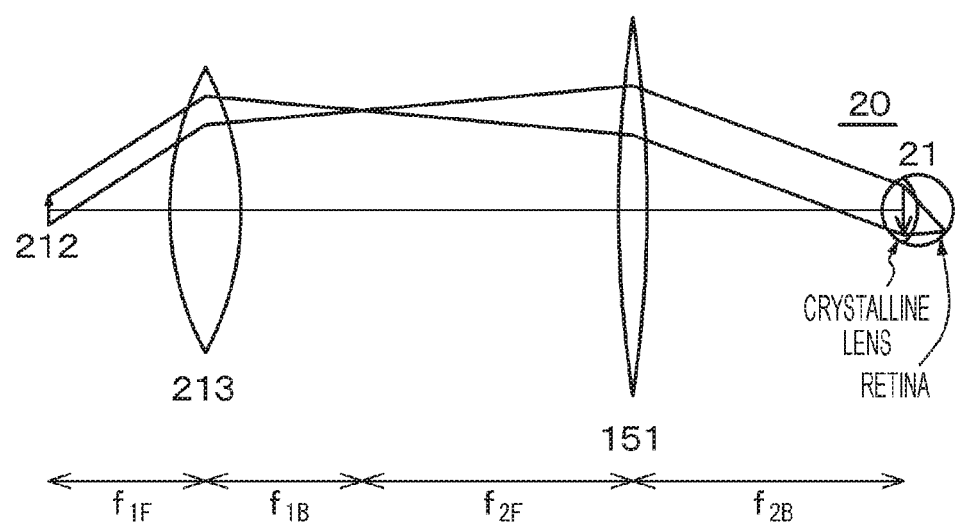

FIG. 28 is a conceptual diagram for explaining an optical system in a modified example of the image display device of Example 13.

Figure 29A:
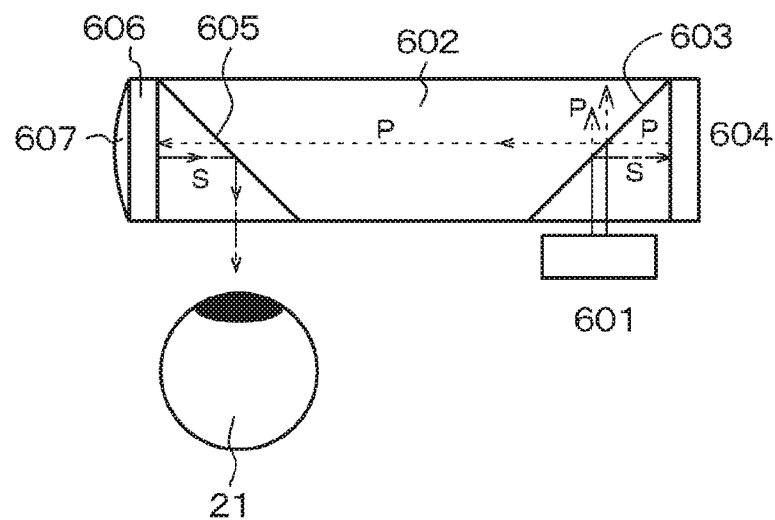
Figure 29B:
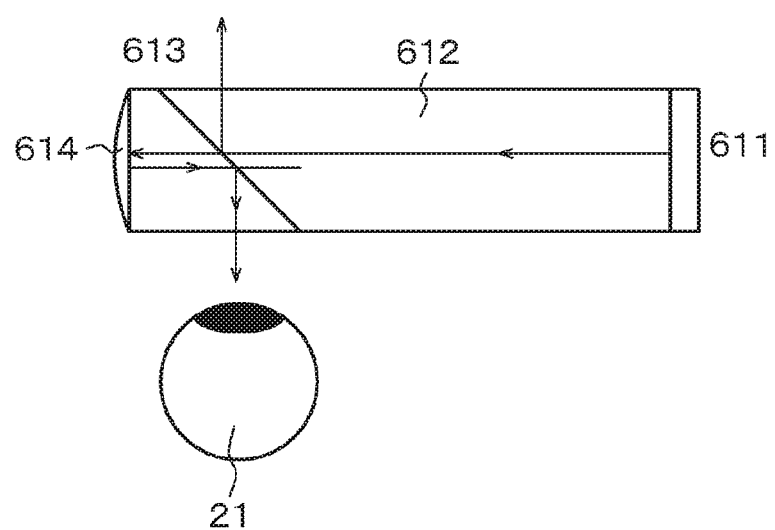

FIGS. 29A and 29B are schematic views of an optical device in a display device of Example 14 as viewed from above.

Figure 30A:
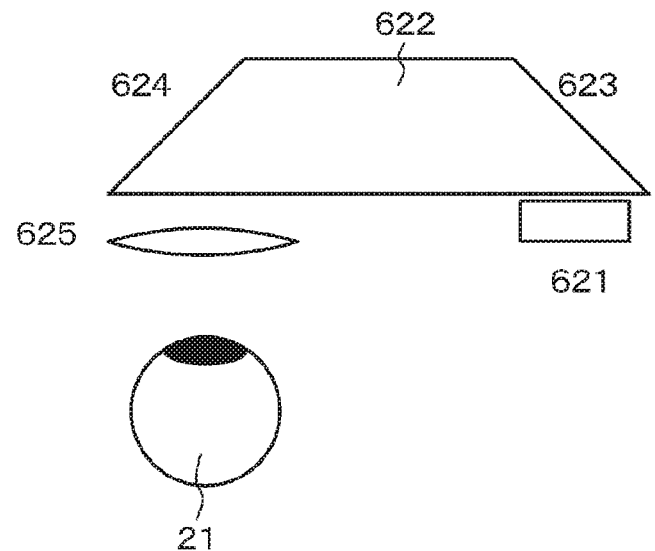
Figure 30B:
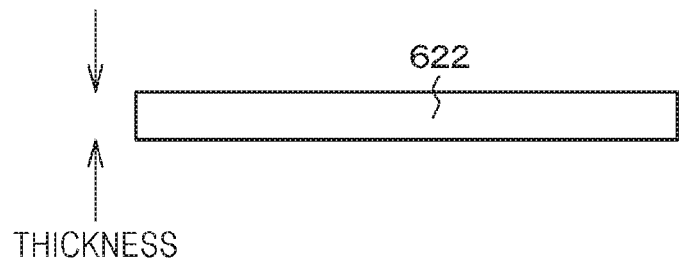

FIGS. 30A and 30B are schematic views of an optical device in a modified example of the display device of Example 14 as viewed from above and as viewed from a side, respectively.

Figure 31:
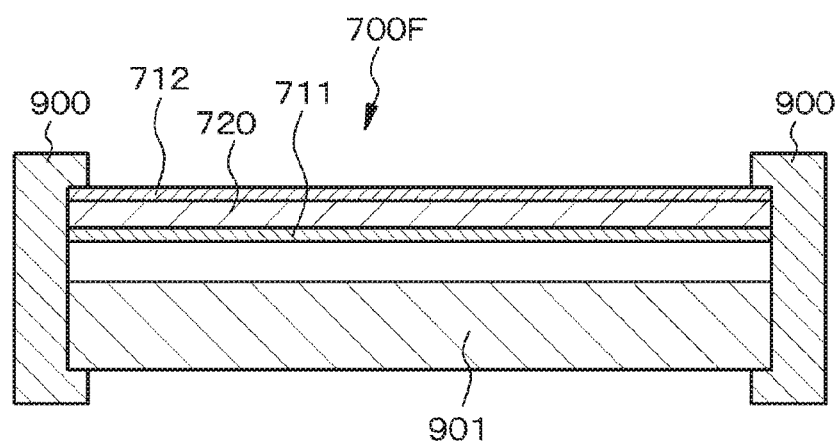

FIG. 31 is a schematic cross-sectional view of the dimming device of Example 15.

Figure 32:
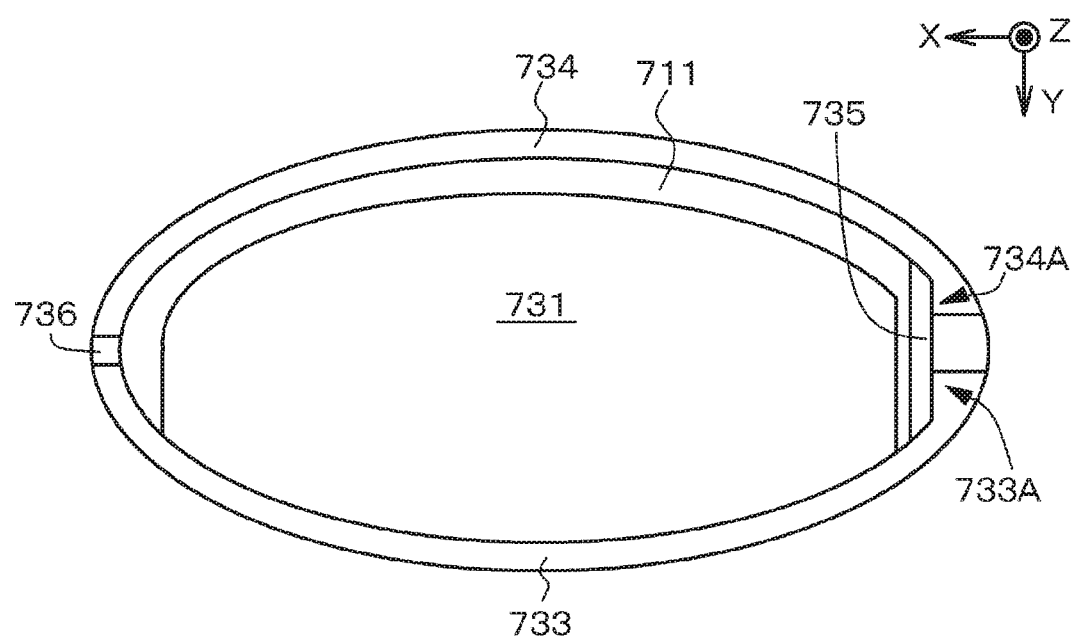

FIG. 32 is a schematic view illustrating a dimming device having an elliptical outward shape.

Figure 33A:
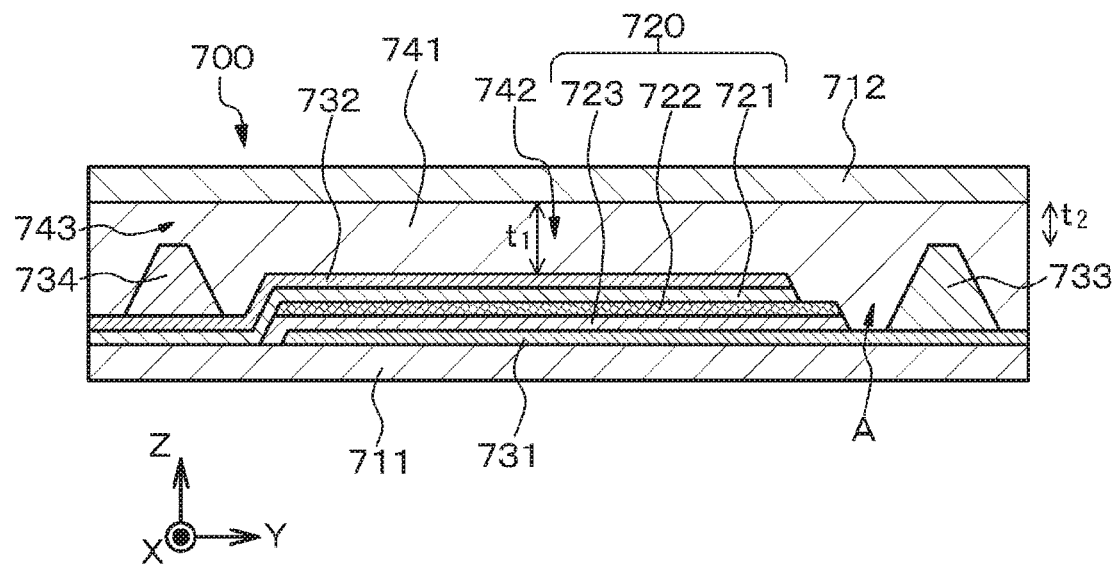
Figure 33B:
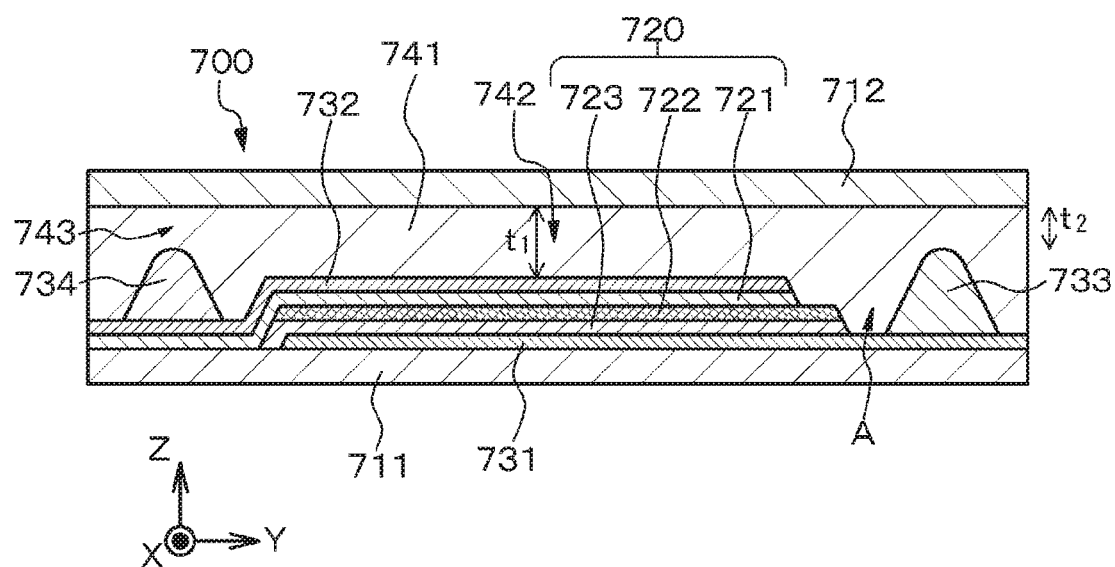

FIGS. 33A and 33B are schematic cross-sectional views similar to views obtained by cutting a modified example of the dimming device of Example 1 along the arrow A-A in FIG. 2A.

Figure 34:
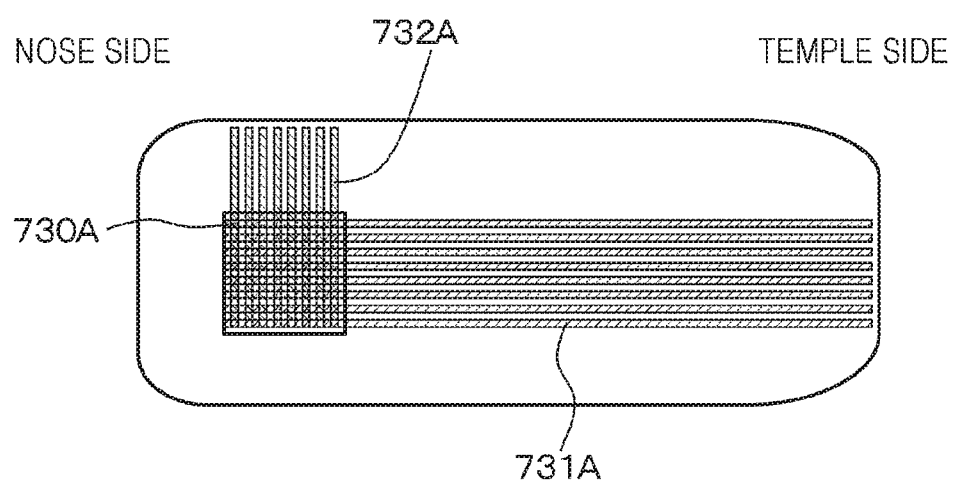

FIG. 34 is a schematic front view of a modified example of a dimming device.

MODE FOR CARRYING OUT THE INVENTION

Hereinafter, the present disclosure will be described on the basis of Examples with reference to the drawings, but the present disclosure is not limited to the Examples, and the various numerical values and materials in the Examples are for illustrative purposes. The description will proceed in the following order.

1. General description of dimming device, according to first and second aspects of the present disclosure, image display device of the present disclosure, display device of the present disclosure, and dimming device manufacturing method of the present disclosure 2. Example 1 (dimming device according to first aspect of the present disclosure, image display device and display device of the present disclosure, optical device with structure 1-B/image forming device with first configuration, and dimming device manufacturing method of the present disclosure)

3. Example 2 (modification of Example 1)

4. Example 3 (different modification of Example 1)

5. Example 4 (modification of Examples 1 to 3)

6. Example 5 (modification of Examples 1 to 4)

7. Example 6 (dimming device according to second aspect of present disclosure)

8. Example 7 (modification of Examples 1 to 6, optical device with structure 1-B/image forming device with second configuration)

9. Example 8 (modification of Examples 1 to 7, optical device with structure 1-A/image forming device with first or second configuration)

10. Example 9 (modification of Examples 7 and 8, optical device with structure 2/image forming device with second configuration)

11. Example 10 (modification of Examples 1 to 9)

12. Example 11 (modification of Examples 1 to 9)

13. Example 12 (modification of Examples 1 to 11)

14. Example 13 (modification of Example 7)

15. Example 14 (modification of Example 9)

16. Example 15 (application to window of dimming device)

17. Others

<General Description of Dimming Device, According to First and Second Aspects of the Present Disclosure, Image Display Device of the Present Disclosure, Display Device of the Present Disclosure, and Dimming Device Manufacturing Method of the Present Disclosure>

A dimming device according to a first aspect of the present disclosure, a dimming device according to the first aspect of the present disclosure included in an image display device of the present disclosure, a dimming device according to the first aspect of the present disclosure included in a display device of the present disclosure, and a dimming device according to the first aspect of the present disclosure obtained by a dimming device manufacturing method of the present disclosure are hereinafter collectively referred to as the "dimming device and the like according to the first aspect of the present disclosure" for convenience in some cases. Also, a dimming device according to a second aspect of the present disclosure, a dimming device according to the second aspect of the present disclosure included in an image display device of the present disclosure, and a dimming device according to the second aspect of the present disclosure included in a display device of the present disclosure are hereinafter collectively referred to as the "dimming device and the like according to the second aspect of the present disclosure" for convenience in some cases.

In the dimming device and the like according to the first aspect of the present disclosure or the dimming device and the like according to the second aspect of the present disclosure (hereinafter, these dimming devices and the like are collectively referred to as the "dimming device and the like of the present disclosure" for convenience in some cases), the second electrode may be formed extending over from the dimming layer to the first substrate, and separated from a first electrode, and the moisture-retaining member may cover at least the second electrode and the dimming layer.

In the dimming device and the like according to the first aspect of the present disclosure including the above preferable form, the sealing member functions as a moisture barrier layer, but a part of the sealing member may be formed by an auxiliary electrode. In this case, the auxiliary electrode may include a first auxiliary electrode formed on the first electrode and a second auxiliary electrode formed on the second electrode and separated from the first auxiliary electrode. In this way, by providing the auxiliary electrodes, appropriate voltages can be applied easily to the first electrode and the second electrode, and the occurrence of a voltage drop in the first electrode or the second electrode can be suppressed, thereby reducing unevenness when the dimming device is colored. The same applies hereinafter. When the length of the auxiliary electrode as a whole is "1", the length of the first auxiliary electrode is preferably less than 0.5, and the length of the third auxiliary electrode is preferably less than 0.5. The same applies hereinafter.

Alternatively, in the dimming device and the like according to the first aspect of the present disclosure including the above preferable form, the sealing member may contain a resin. In this case, the Young's modulus of the resin contained in the sealing member may be $1 \times 10^7$ Pa or less, and furthermore, in these cases, the auxiliary electrode may be provided on an inner side of a part of the sealing member. Here, the auxiliary electrode may include a first auxiliary electrode formed on top of the first electrode and a second auxiliary electrode formed on top of the second electrode and separated from the first auxiliary electrode. Examples of the resin contained in the sealing member include ultraviolet-curing resins (specifically, resins containing acrylic resins, urethane resins, silicone resins, fluorine resins, polyimide resins, and epoxy resins). In the case where the sealing member contains a resin, inorganic filler such as silica and alumina may also be added to the resin.

Alternatively, in the dimming device and the like according to the first aspect of the present disclosure including the above preferable form, the sealing member may include a protruding portion provided in an edge portion of the first substrate. In this case, the auxiliary electrode may be provided on an inner side of a part of the sealing member. Here, the auxiliary electrode may include a first auxiliary electrode formed on top of the first electrode and a second auxiliary electrode formed on top of the second electrode and separated from the first auxiliary electrode. The protruding portion in the edge portion of the first substrate may be formed by hot-pressing the edge portion of the first substrate using a hot press, and may also be formed by any of various PVD methods, CVD methods, and printing methods, for example.

In the dimming device according to the second aspect of the present disclosure, the auxiliary electrode may be provided on an inner side of a part of at least the first sealing member. Additionally, in this case, the auxiliary electrode preferably includes a first auxiliary electrode formed on top of the first electrode and a second auxiliary electrode formed on top of the second electrode and separated from the first auxiliary electrode. Furthermore, in these configurations, the first sealing member and the second sealing member may contain a resin. In this case, the Young's modulus of the resin contained in the first sealing member and the second sealing member may be $1 \times 10^7$ Pa or less. Alternatively, in the dimming device according to the second aspect of the present disclosure, a part of the first sealing member may include an auxiliary electrode. In this case, the auxiliary electrode may include a first auxiliary electrode formed on top of the first electrode and a second auxiliary electrode formed on top of the second electrode and separated from the first auxiliary electrode. In addition, in this case, the second sealing member preferably contains a resin. Examples of the resin contained in the first sealing member and the second sealing member include ultraviolet-curing resins (specifically, resins containing acrylic resins, urethane resins, silicone resins, fluorine resins, polyimide resins, and epoxy resins). In the case where the first sealing member contains a resin, inorganic filler such as silica and alumina may also be added to the resin, and inorganic filler such as silica and alumina may also be added to the second sealing member. A moisture transmittance value $VT_2$ of the material forming the second sealing member is preferably lower than a moisture transmittance value $VT_0$ of the material forming the moisture-retaining member. In the case where the first sealing member and the second sealing member contain a resin, and the thickness of the second sealing member is thinner than the thickness of the first sealing member, it is desirable for a moisture transmittance value $VT_1$ of the material forming the first sealing member to satisfy the relationship $VT_1 < VT_2 < VT_0$. Here, the moisture transmittance may be measured on the basis of JIS K7129:2008, and a test piece of 50 mm×50 mm is subjected to a test under conditions of a test temperature of 25° C.±0.5° C. and a relative humidity of 90±2%. Measurement is performed using a dry/wet sensor. In some cases, the first sealing member and the second sealing member may contain the same resin. In such cases, it is sufficient for the first sealing member and the second sealing member to be formed as one at the same time. Preferably, the moisture transmittance value $VT_{1+2}$ of the material forming the first sealing member and the second sealing member is less than the moisture transmittance value $VT_0$ of the material forming the moisture-retaining member.

Furthermore, in the dimming device and the like of the present disclosure including the preferable form and configuration described above, the cross-sectional shape of the sealing member may become narrower as approaching the second substrate. By causing the cross-sectional shape of the sealing member to have such a shape, when the moisture-retaining member is disposed on top of at least the second electrode and the moisture-retaining member extending portion that extends from the moisture-retaining member is disposed on top of the sealing member, the occurrence of problems such as air bubbles getting under the moisture-retaining member may be avoided. Such a cross-sectional shape of the sealing member may be formed on the basis of any of various methods, such as molding of the sealing member based on a printing method or molding of the sealing member based on a sputtering method using a metal mask, for example.

Furthermore, in the dimming device and the like of the present disclosure including the preferable form and configuration described above, an inorganic film may be formed on the face of the second substrate that faces the moisture-retaining member. Here, the inorganic film contains an inorganic material such as aluminum oxide, silicon oxide, silicon nitride, or niobium oxide, for example. By forming the inorganic film, rigidity can be imparted to the second substrate, thereby making strain occur less readily in the second substrate. The inorganic film may be formed on the basis of PVD, CVD, laser ablation, or atomic layer deposition (ALD), for example.

Furthermore, in the dimming device and the like of the present disclosure including the preferable form and configuration described above, the Young's modulus of the material (specifically, the resin) forming the moisture-retaining member is desirably $1\times10^6$ Pa or less. With this arrangement, various differences in level occurring inside the dimming device can be absorbed, and inconsistencies in the thickness of the moisture-retaining member in a central portion of the dimming device and inconsistencies in the thickness of the moisture-retaining member extending portion can be reduced (in other words, a uniform overall distance between the first substrate and the second substrate may be attained), thereby preventing degraded visibility. Specifically, when looking out at the external world through the dimming device, the occurrence of distortions or discrepancies in the image of the external world can be suppressed.

Furthermore, in the dimming device and the like of the present disclosure including the preferable form and configuration described above, the resin forming the moisture-retaining member may be an acrylic resin, a silicone resin, or a urethane resin. Alternatively, the moisture-retaining member may contain an ultraviolet-curing resin. Alternatively, the moisture-retaining member may contain a material called an optical clear adhesive (OCA). Note that the term "moisture-retaining member" may also be replaced with the terms proton-supplying member, transparent adhesive member capable of retaining moisture, or transparent sealing member capable of retaining moisture. If the moisture-retaining member containing an OCA is stored at room temperature with a relative humidity of 50%, for example, an equilibrium moisture state can be maintained. Although dependent on the form of the moisture-retaining member, in the case where the moisture-retaining member is sheet-like, for example, the second substrate and the second electrode or the second substrate and the sealing member can be stuck to each other through the moisture-retaining member, or a thermoplastic ultraviolet-curing moisture-retaining member can be used. Alternatively, in the case where the moisture-retaining member is a liquid, it is sufficient to apply the moisture-retaining member throughout from the second electrode to the sealing member, and after pre-curing as necessary, overlay the second substrate onto the moisture-retaining member while applying pressure as necessary, and cure the moisture-retaining member with ultraviolet rays. Alternatively, although dependent on the material to use, the moisture-retaining member may also be stuck throughout from the second electrode to the sealing member on the basis of a method such as heat laminating.

Furthermore, in the dimming device and the like of the present disclosure including the preferable form and configuration described above, the dimming device can be curved. With this arrangement, the dimming device can be easily and reliably mounted to the image display device or the display device.

In the dimming device according to the first aspect of the present disclosure, the thickness of the moisture-retaining member extending portion is thinner than the thickness of the moisture-retaining member in the central portion of the dimming device, but the thickness ($t_1$) of the moisture-retaining member in the central portion of the dimming device may be from $1\times10^{-4}$ m to $5\times10^{-4}$ m for example, and the thickness ($t_2$) of the moisture-retaining member extending portion may be from $1\times10^{-7}$ m to $1\times10^{-4}$ m for example. Alternatively, it is preferable to satisfy $5\times10^{-4} \leq t_2/t_1 \leq 1$.

In the dimming device manufacturing method of the present disclosure, the moisture-retaining member is disposed on top of at least the second electrode and the moisture-retaining member extending portion that extends from the moisture-retaining member is disposed on top of the sealing member. Specifically, for example, it is sufficient to bond or stick the moisture-retaining member to the second electrode, and bond or stick the moisture-retaining member extending portion to the sealing member. Also, the second substrate is disposed on top of the moisture-retaining member and the moisture-retaining member extending portion. Specifically, for example, it is sufficient to bond or stick the second substrate to the moisture-retaining member and the moisture-retaining member extending portion.

The second substrate also functions as a protective substrate, for example. The first substrate faces the optical device with or without a gap in between, or alternatively, doubles as the member forming the optical device (for example, a protective member provided in the optical device). On an outer face of the second substrate, a hard coat layer containing an organic/inorganic mixed layer or an anti-reflection film containing a fluorine resin may be formed.

Furthermore, in the dimming device and the like of the present disclosure including the preferable form described above, the dimming layer may be provided with an electrochromic material layer. Additionally, in this case, the dimming layer (electrochromic material layer) may have a laminated structure of reduction coloring layer, an electrolyte layer, and an oxidation coloring layer.

As described above, the dimming device may contain an optical shutter by which a color change of a substance generated by a redox reaction of an electrochromic material layer containing an inorganic or organic electrochromic material is applied. Specifically, the dimming layer may include an inorganic or organic electrochromic material, and as above, may contain a reduction coloring layer, an electrolyte layer, and an oxidation coloring layer. As described above, the electrochromic material layer may be constituted by a reduction coloring layer, an electrolyte layer, and an oxidation coloring layer. Examples of the reduction coloring layer include an inorganic material such as tungsten oxide, molybdenum oxide, or vanadium oxide, and an organic material such as a viologen derivative, a polythiophene derivative, or a Prussian blue derivative. Examples of the electrolyte layer include tantalum oxide, propylene carbonate, an ionic liquid, and an ionic polymer. Examples of the oxidation coloring layer include an inorganic material such as an iridium oxide-based material, nickel oxide, zirconium oxide, zirconium phosphate, nickel hydroxide, chromium oxide, or copper chloride, an organic material such as an amine derivative, phenazine, or a viologen derivative, a polymer, an organic-metal mixture, and the like. More specifically, for example, from the second electrode side, the dimming layer may have a laminated structure of inorganic electrochromic material layers such as $WO_3$ layer/$Ta_2O_5$ layer/$Ir_xSn_{1-x}O$ layer, or a laminated structure of inorganic electrochromic material layers such as $WO_3$ layer/$Ta_2O_5$ layer/$IrO_x$ layer. Instead of the $WO_3$ layer, as described above, a $MoO_3$ layer or a $V_2O_5$ layer can be used. Furthermore, instead of the $IrO_x$ layer, as described above, a $ZrO_2$ layer or a zirconium phosphate layer can be used, or a Prussian blue complex/nickel-substituted Prussian blue complex or the like can also be used. As a material constituting the organic electrochromic material layer, for example, electrochromic materials disclosed in Japanese Patent Application Laid-Open Nos. 2014-111710 and 2014-159385 can also be used.

For example, a light shielding ratio can be controlled on the basis of a simple matrix method. In other words, the first electrode may include a plurality of band-shaped first electrode segments extending in a first direction, the second electrode may include a plurality of band-shaped second electrode segments extending in a second direction different from the first direction, and a light shielding ratio of a portion of the dimming device corresponding to overlap regions between the first electrode segments and the second electrode segments (minimum unit regions in which the light shielding ratio of the dimming device changes) may be controlled on the basis of control of voltages applied to the first electrode segments and the second electrode segments. The first direction and the second direction may be orthogonal to each other, for example. Alternatively, in order to control the light shielding ratios of the minimum unit regions in which the light shielding ratio of the dimming device changes, a thin film transistor (TFT) may be disposed in each of the minimum unit regions. In other words, the light shielding ratio may be controlled on the basis of an active matrix method. Alternatively, at least one of the first electrode or the second electrode may be a so-called solid electrode (electrode not patterned).

The first electrode may be patterned or does not have to be patterned. The second electrode may be patterned or does not have to be patterned. Examples of a material contained in the first electrode and the second electrode include a transparent conductive material. More specific examples thereof include an indium-tin composite oxide (indium tin oxide (ITO), including Sn-doped $In_2O_3$, crystalline ITO, and amorphous ITO), fluorine-doped $SnO_2$ (FTC)), F-doped $In_2O_3$ (IFO), antimony-doped $SnO_2$ (ATO), $SnO_2$, ZnO (including Al-doped ZnO and B-doped ZnO), indium-zinc composite oxide (indium zinc oxide (IZO)), a spinel type oxide, an oxide having a $YbFe_2O_4$ structure, and a conductive polymer such as polyaniline, polypyrrole, or polythiophene, and the like, but are not limited thereto. Furthermore, two or more kinds thereof can be used in combination. Alternatively, the first electrode and the second electrode in a thin line shape can be constituted by metal such as gold, silver, copper, aluminum, nickel, or titanium, or alloy. The auxiliary electrode can also be formed, for example, using metal such as gold, silver, copper, aluminum, nickel, titanium, or alloys thereof. Alternatively, the auxiliary electrode can be formed using silver paste or copper paste. The auxiliary electrode (first auxiliary electrode and second auxiliary electrode) is demanded to have a lower electrical resistance than the first electrode and the second electrode. The first electrode, the second electrode, and the auxiliary electrode (first auxiliary electrode and second auxiliary electrode) can be formed on the basis of a physical vapor deposition method (PVD method) such as a vacuum vapor deposition method or a sputtering method, various chemical vapor deposition methods (CVD methods), various kinds of coating and the like, and various kinds of printing methods. Patterning of an electrode can be performed by any method such as an etching method, a lift-off method, or a method using various masks.

Furthermore, in the image display device or the like of the present disclosure including the above-described preferable form, the first substrate and the second substrate may be constituted by a transparent glass substrate such as a soda-lime glass or a white plate glass, a plastic substrate, a plastic sheet, or a plastic film. Here, examples of the plastic include polyethylene terephthalate, polyethylene naphthalate, polycarbonate, a cellulose ester such as cellulose acetate, a fluorocarbon polymer such as polyvinylidene fluoride or a copolymer of polytetrafluoroethylene and hexafluoropropylene, a polyether such as polyoxymethylene, polyacetal, polystyrene, a polyolefin such as polyethylene, polypropylene, or a methylpentene polymer, a polyimide such as polyamideimide or polyetherimide, polyamide, polyether sulfone, polyphenylene sulfide, polyvinylidene fluoride, tetraacetyl cellulose, brominated phenoxy, polyarylate, polysulfone, and the like. Note that if necessary, as described above, it is only required to dispose the inorganic film on the second substrate and by doing this, rigidity can be imparted to the second substrate, thereby making strain occur less readily in the second substrate when assembling a dimming device.

Furthermore, in the image display device of the present disclosure including the above-described preferable form and the display device of the present disclosure including the above-described preferable form, the optical device may include:

(b-1) a light guide plate in which light incident from the image forming device is propagated by total reflection through the inside, and then the light is emitted toward an observer;

(b-2) a first deflecting unit for deflecting light incident on the light guide plate such that the light incident on the light guide plate is totally reflected inside the light guide plate; and (b-3) a second deflecting unit for deflecting light propagated by total reflection through the inside of the light guide plate and emitting the light from the light guide plate, and the second deflecting unit may form a virtual image forming region of the optical device. Such an optical device is referred to as an "optical device with first structure" for convenience. Note that the term "total reflection" means total internal reflection or total reflection inside the light guide plate. In some cases, the second deflecting unit (virtual image forming region) is positioned inside the projected image of the dimming device, while in other cases, the dimming device is positioned inside the projected image of the second deflecting unit (virtual image forming region).

A region in which a high light shielding ratio value is set in the dimming device may be a whole region of the dimming device or a partial region of the dimming device. In other words, the light shielding ratio of a region of the dimming device facing a region of the second deflecting unit (for example, a partial region of the second deflecting unit) where a virtual image is actually formed may be controlled. In other words, if a virtual image is formed in a part of the virtual image forming region on the basis of light emitted from the image forming device, the dimming device may perform control such that the light shielding ratio of a virtual image projection region (region of the dimming device corresponding to the virtual image forming region in the optical device) of the dimming device including a projected image of a virtual image on the dimming device is higher than the light shielding ratio of another region of the dimming device. Note that the position of the virtual image projection region does not have to be fixed in the dimming device but may vary depending on the formation position of a virtual image. Furthermore, the number of the virtual image projection regions may also vary depending on the number of virtual images (the number of a series of virtual image groups, the number of blocked virtual image groups, or the like).

During operation of the dimming device, if the light shielding ratio of the virtual image projection region of the dimming device including a projected image of a virtual image on the dimming device is assumed to be "1", the light shielding ratio of another region of the dimming device may be, for example, 0.95 or less. Alternatively, the light shielding ratio of another region of the dimming device may be, for example, 30% or less. Meanwhile, during operation of the dimming device, the light shielding ratio of the virtual image projection region of the dimming device may be 35% to 99%, for example, 80%. As described above, the light shielding ratio of the virtual image projection region may be constant or may vary depending on illuminance of an environment in which the display device is placed.

In the display device of the present disclosure including the various preferable forms described above (hereinafter collectively referred to as the "display device or the like of the present disclosure" in some cases), the frame may include a front portion disposed in front of an observer, two temple portions rotatably attached to both ends of the front portion via hinges, and a nose pad. The dimming device may be disposed on the front portion, and in this case, the optical device may be attached to the dimming device. Alternatively, the optical device may be attached to the front portion, and in this case, the dimming device may be attached to the optical device. Furthermore, in these cases, the front portion may have a rim portion, and the dimming device may be fitted in the rim portion, or the optical device may be fitted in the rim portion. In the display device or the like of the present disclosure, from an observer side, the optical device and the dimming device may be disposed in this order, or the dimming device and the optical device may be disposed in this order.

In the display device or the like of the present disclosure, the light shielding ratio may change gradually (that is, may change continuously), may change stepwise depending on the disposition state and shapes of electrodes, or may change continuously or stepwise from a constant value. In other words, the dimming device may be in a state with color gradation, may be in a state in which a color changes gradually, or may be in a state in which a color changes continuously or stepwise from a state with a constant color. The light shielding ratio can be controlled by voltages applied to the first electrode and the second electrode. A potential difference between the first electrode and the second electrode may be controlled, or a voltage applied to the first electrode and a voltage applied to the second electrode may be independently controlled. In a case of adjusting the light shielding ratio, a test pattern may be displayed on the optical device.

The display device or the like of the present disclosure may further include an environmental illuminance measuring sensor for measuring the illuminance of an environment in which the display device is placed, and may control the light shielding ratio of the dimming device on the basis of a measurement result of the environmental illuminance measuring sensor. Alternatively, the display device or the like may further include an environmental illuminance measuring sensor for measuring the illuminance of an environment in which the display device is placed, and may control the brightness of an image formed by the image forming device on the basis of a measurement result of the environmental illuminance measuring sensor. These forms may be combined with each other.

Alternatively, the display device or the like may further include a transmitted light illuminance measuring sensor for measuring illuminance based on light which has passed through the dimming device from an external environment, and may control the light shielding ratio of the dimming device on the basis of a measurement result of the transmitted light illuminance measuring sensor. Alternatively, the display device or the like may further include a transmitted light illuminance measuring sensor for measuring illuminance based on light which has passed through the dimming device from an external environment, and may control the brightness of an image formed by the image forming device on the basis of a measurement result of the transmitted light illuminance measuring sensor. The transmitted light illuminance measuring sensor is desirably disposed closer to an observer side than the optical device. At least two transmitted light illuminance measuring sensors may be disposed, and illuminance based on light which has passed through a portion with a high light shielding ratio and illuminance based on light which has passed through a portion with a low light shielding ratio may be measured. These forms may be combined with each other. Furthermore, these forms may be combined with the above-described form in which control is performed on the basis of a measurement result of the environmental illuminance measuring sensor.

The illuminance sensor (environmental illuminance measuring sensor or transmitted light illuminance measuring sensor) only needs to be constituted by a well-known illuminance sensor, and only needs to be controlled on the basis of a well-known control circuit.

The maximum light transmittance of the dimming device may be 50% or more, and the minimum light transmittance of the dimming device may be 30% or less. An upper limit value of the maximum light transmittance of the dimming device may be 99%, and a lower limit value of the minimum light transmittance of the dimming device may be 1%. Here, there is a relationship of (light transmittance)=1−(light shielding ratio).

It is only required to attach a connector to the dimming device, and to electrically connect the dimming device to a control circuit (for example, included in a control device for controlling an image forming device) for controlling the light shielding ratio (light transmittance) of the dimming device via the connector and wiring.

In some cases, light passing through the dimming device may be colored in a desired color by the dimming device. In addition, in this case, a color in which light is colored by the dimming device may be variable or fixed. In the former case, for example, it is only required to laminate a dimming device for coloring light in red, a dimming device for coloring light in green, and a dimming device for coloring light in blue. Furthermore, in the latter case, a color in which light is colored by the dimming device is not limited, but may be brown, for example.

Furthermore, in some cases, the dimming device may be detachably disposed. In order to detachably dispose the dimming device, for example, the dimming device may be attached, for example, to a frame using a screw manufactured from a transparent plastic. Alternatively, the dimming device may be attached to a frame by forming a groove in the frame and engaging the dimming device with the groove or by attaching a magnet to the frame. Alternatively, the dimming device may be fitted in a slide portion by forming the slide portion in a frame.

The optical device is a semi-transmission type (see-through type) device. Specifically, at least a portion of the optical device facing an eyeball (pupil) of an observer is made semi-transmissive (see-through), and an outside scene can be viewed through this portion of the optical device and the dimming device. The light shielding ratio can be controlled and adjusted manually by observation of the lightness of light which has passed through the dimming device and the optical device by an observer and operation of a switch, a button, a dial, a slider, a knob, or the like by the observer. Alternatively, the light shielding ratio can be controlled and adjusted on the basis of a measurement result of the above-described transmitted light illuminance measuring sensor for measuring illuminance based on light which has passed through the dimming device from an external environment. Specifically, control and adjustment of the light shielding ratio only need to be performed by controlling voltages applied to the first electrode and the second electrode. At least two transmitted light illuminance measuring sensors may be disposed, and illuminance based on light which has passed through a portion with a high light shielding ratio and illuminance based on light which has passed through a portion with a low light shielding ratio may be measured. The display device may include one image display device (single eye type) or two image display devices (binocular type). In a case where the display device includes two image display devices, by adjusting voltages applied to the first electrode and the second electrode in each of one dimming device and the other dimming device, the light shielding ratios of one dimming device and the other dimming device can be equalized. The light shielding ratios in one dimming device and the other dimming device can be controlled, for example, on the basis of a measurement result of the above-described transmitted light illuminance measuring sensor for measuring illuminance based on light which has passed through the dimming device from an external environment, or can be controlled and adjusted manually by observation of the lightness of light which has passed through one dimming device and the optical device and the lightness of light which has passed through the other dimming device and the optical device by an observer and operation of a switch, a button, a dial, a slider, a knob, or the like by the observer. In a case of adjusting the light shielding ratio, a test pattern may be displayed on the optical device.

Here, the term "semi-transmissive" may be used, and the term "semi-transmissive" does not mean that a half (50%) of incident light is transmitted or reflected, but means that a part of incident light is transmitted and the remaining light is reflected.

In the optical device with first structure, as described above, the first deflecting unit may reflect light incident on the light guide plate, and the second deflecting unit may transmit and reflect light propagated by total reflection through the inside of the light guide plate (a plurality of times). In addition, in this case, the first deflecting unit may function as a reflecting mirror, and the second deflecting unit may function as a semi-transmissive mirror. Such an optical device with first structure is referred to as an "optical device with structure 1-A" for convenience.

In such an optical device with structure 1-A, the first deflecting unit may be constituted by, for example, a light reflecting film (a kind of mirror) that is constituted by metal including alloy and reflects light incident on the light guide plate, or a diffraction grating (for example, a hologram diffraction grating film) that diffracts light incident on the light guide plate. Alternatively, the first deflecting unit may be constituted by a multilayer laminated structure in which many dielectric laminated films are laminated, a half mirror, or a polarization beam splitter, for example. Furthermore, the second deflecting unit may be constituted by a multilayer laminated structure in which many dielectric laminated films are laminated, a half mirror, a polarization beam splitter, or a hologram diffraction grating film. In addition, the first deflecting unit and the second deflecting unit are disposed inside the light guide plate (incorporated in the light guide plate). In the first deflecting unit, parallel light incident on the light guide plate is reflected or diffracted so as to be totally reflected inside the light guide plate. Meanwhile, in the second deflecting unit, parallel light propagated by total reflection through the inside of the light guide plate is reflected or diffracted (a plurality of times), and is emitted from the light guide plate in the state of parallel light.

Alternatively, the first deflecting unit may diffract and reflect light incident on the light guide plate, and the second deflecting unit may diffract and reflect light propagated by total reflection through the inside of the light guide plate. In addition, in this case, the first deflecting unit and the second deflecting unit may be constituted by diffraction grating elements. Furthermore, the diffraction grating elements may be constituted by reflection type diffraction grating elements or transmission type diffraction grating elements. Alternatively, one of the diffraction grating elements may be constituted by a reflection type diffraction grating element, and the other of the diffraction grating elements may be constituted by a transmission type diffraction grating element. Examples of the reflection type diffraction grating element include a reflection type volume hologram diffraction grating. The reflection type volume hologram diffraction grating means a hologram diffraction grating for diffracting and reflecting only +1st order diffracted light. A first deflecting unit constituted by a hologram diffraction grating may be referred to as a "first diffraction grating member" for convenience, and a second deflecting unit constituted by a hologram diffraction grating may be referred to as a "second diffraction grating member" for convenience. Furthermore, such an optical device with first structure is referred to as an "optical device with structure 1-B" for convenience.

The image display device in the display device or the like of the present disclosure can display an image of a single color (for example, green). In addition, in this case, for example, by dividing an angle of view into two (more specifically, for example, by dividing the angle of view into two equal parts) for example, the first deflecting unit may be formed by laminating two diffraction grating members corresponding to groups of the angle of view divided into two. Alternatively, in a case where a color image is displayed, the first diffraction grating member or the second diffraction grating member may be formed by laminating P layers of diffraction grating layers each including a hologram diffraction grating so as to correspond to diffraction reflection of P types of light beams having different P types (for example, P=3, and three types of red, green, and blue) of wavelength bands (or wavelengths). In each diffraction grating layer, an interference fringe corresponding to one type of wavelength band (or wavelength) is formed. Alternatively, the first diffraction grating member or the second diffraction grating member including one diffraction grating layer may have P types of interference fringes formed so as to correspond to diffraction reflection of P types of light beams having different P types of wavelength bands (or wavelengths). Alternatively, for example, a diffraction grating member including a diffraction grating layer including a hologram diffraction grating for diffracting and reflecting light having a red wavelength band (or wavelength) may be disposed on a first light guide plate, a diffraction grating member including a diffraction grating layer including a hologram diffraction grating for diffracting and reflecting light having a green wavelength band (or wavelength) may be disposed on a second light guide plate, a diffraction grating member including a diffraction grating layer including a hologram diffraction grating for diffracting and reflecting light having a blue wavelength band (or wavelength) may be disposed on a third light guide plate, and the first light guide plate, the second light guide plate, and the third light guide plate may be stacked with a gap therebetween. Alternatively, the first diffraction grating member or the second diffraction grating member may be constituted by dividing an angle of view, for example, into three equal parts and laminating diffraction grating layers corresponding to the divided angles of view. In addition, by adopting these configurations, it is possible to increase diffraction efficiency, to increase a diffraction reception angle, and to optimize a diffraction angle when light having each wavelength band (or wavelength) is diffracted and reflected by the first diffraction grating member or the second diffraction grating member. A protective member is preferably disposed such that an observer does not touch a hologram diffraction grating.

Examples of a material constituting the first diffraction grating member and the second diffraction grating member include a photopolymer material. A constituent material and a basic structure of each of the first diffraction grating member and the second diffraction grating member including a hologram diffraction grating only need to be the same as those of a conventional hologram diffraction grating. Interference fringes are formed from the inside to a surface of a diffraction grating member. A method for forming the interference fringes themselves only needs to be the same as a conventional formation method. Specifically, for example, by irradiating a member (for example, a photopolymer material) constituting a diffraction grating member with object light from a first predetermined direction on one side, and at the same time, by irradiating the member constituting a diffraction grating member with reference light from a second predetermined direction on the other side, it is only required to record an interference fringe formed by the object light and the reference light inside the member constituting a diffraction grating member. By appropriately selecting the first predetermined direction, the second predetermined direction, and the wavelengths of the object light and the reference light, it is possible to obtain a desired pitch of an interference fringe on a surface of a diffraction grating member and a desired inclination angle (slant angle) of the interference fringe. The inclination angle of an interference fringe means an angle formed by a surface of a diffraction grating member (or diffraction grating layer) and the interference fringe. In a case where the first diffraction grating member and the second diffraction grating member are each constituted by a laminated structure of P layers of diffraction grating layers each including a hologram diffraction grating, such a lamination of diffraction grating layers only needs to be performed by manufacturing each of P layers of diffraction grating layers separately, and then laminating (bonding) the P layers of diffraction grating layers using, for example, an ultraviolet curable adhesive. Furthermore, by manufacturing a single diffraction grating layer using an adhesive photopolymer material and then sequentially sticking an adhesive photopolymer material onto the diffraction grating layer to manufacture a diffraction grating layer, the P layers of diffraction grating layers may be manufactured. By irradiating the manufactured diffraction grating layer with an energy ray, if necessary, a monomer remaining in the photopolymer material without being polymerized when the diffraction grating layer is irradiated with the object light and the reference light may be polymerized and fixed. Furthermore, if necessary, a heat treatment may be performed for stabilization.

Alternatively, in the image display device in the display device or the like of the present disclosure, the optical device may be constituted by a semi-transmissive mirror into which light emitted from the image forming device is incident and from which the light is emitted toward a pupil of an observer or may be constituted by a polarization beam splitter (PBS). The semi-transmissive mirror or the polarization beam splitter forms a virtual image forming region of the optical device. Light emitted from the image forming device may be propagated in air to be incident on the semi-transmissive mirror or the polarization beam splitter. For example, the light may be propagated through the inside of a transparent member such as a glass plate or a plastic plate (specifically, a member constituted by a similar material to a material constituting a light guide plate described later) to be incident on the semi-transmissive mirror or the polarization beam splitter. The semi-transmissive mirror or the polarization beam splitter may be attached to the image forming device via this transparent member or via a member different from this transparent member. Such an optical device is referred to as an "optical device with second structure" for convenience. The semi-transmissive mirror may be constituted by the first deflecting unit in the optical device with structure 1-A, for example, a light reflecting film (a kind of mirror) that is constituted by metal including alloy and reflects light, or a diffraction grating (for example, a hologram diffraction grating film). Alternatively, the optical device may be constituted by a prism on which light emitted from the image forming device is incident and from which the light is emitted toward a pupil of an observer.

In the image display device in the display device or the like of the present disclosure including the above-described various preferable forms and configurations, the image forming device may have a plurality of pixels arranged in a two-dimensional matrix. Such a configuration of the image forming device is referred to as an "image forming device with first configuration" for convenience.

Examples of the image forming device with first configuration include: an image forming device including a reflection type spatial light modulator and a light source; an image forming device including a transmission type spatial light modulator and a light source; and an image forming device including a light emitting element such as an organic electro luminescence (EL), an inorganic EL, a light emitting diode (LED), or a semiconductor laser element. Among these devices, the image forming device (organic EL display device) including an organic EL light emitting element and the image forming device including a reflection type spatial light modulator and a light source are preferable. Examples of the spatial light modulator include a light valve, a transmission type or reflection type liquid crystal display device such as a liquid crystal on silicon (LCOS), and a digital micromirror device (DMD). Examples of the light source include a light emitting element. Furthermore, the reflection type spatial light modulator may include a liquid crystal display device and a polarization beam splitter for reflecting a part of light emitted from a light source to guide the light to the liquid crystal display device and transmitting a part of the light reflected by the liquid crystal display device to guide the light to an optical device (for example, light guide plate). Examples of the light emitting element constituting the light source include a red light emitting element, a green light emitting element, a blue light emitting element, and a white light emitting element. Alternatively, white light may be obtained by mixing colors of red light, green light, and blue light emitted from the red light emitting element, the green light emitting element, and the blue light emitting element using a light pipe and uniformizing brightness. Examples of the light emitting element include a semiconductor laser element, a solid state laser, and an LED. The number of pixels only needs to be determined on the basis of specifications required for the image display device, and examples of a specific value of the number of pixels include 320×240, 432×240, 640×480, 1024×768, 1920×1080, and the like. In the image forming device with first configuration, a diaphragm may be disposed at a position of a front focal point (focal point on the image forming device side) of a lens system (described later), and this diaphragm corresponds to an image emitting portion from which an image is emitted in the image forming device.

Alternatively, in the image display device in the display device or the like of the present disclosure including the above-described preferable forms and configurations, the image forming device may include a light source and a scanning unit for scanning light emitted from the light source to form an image. Such an image forming device is referred to as an "image forming device with second configuration" for convenience.

Examples of the light source in the image forming device with second configuration include a light emitting element, and specific examples thereof include a red light emitting element, a green light emitting element, a blue light emitting element, and a white light emitting element. Alternatively, white light may be obtained by mixing colors of red light, green light, and blue light emitted from the red light emitting element, the green light emitting element, and the blue light emitting element using a light pipe and uniformizing brightness. Examples of the light emitting element include a semiconductor laser element, a solid state laser, and an LED. The number of pixels (virtual pixels) in the image forming device with second configuration only needs to be determined on the basis of specifications required for the image display device, and examples of a specific value of the number of pixels (virtual pixels) include 320×240, 432×240, 640×480, 1024×768, 1920×1080, and the like. Furthermore, in a case where a color image is to be displayed and in a case where the light source includes a red light emitting element, a green light emitting element, and a blue light emitting element, color synthesis is preferably performed using, for example, a cross prism. Examples of the scanning unit include a micro electro mechanical systems (MEMS) mirror having a micro mirror rotatable in a two-dimensional direction and a galvanometer mirror, the mirrors horizontally and vertically scanning light emitted from the light source. In the image forming device with second configuration, a MEMS mirror or a galvanometer mirror may be disposed at a position of a front focal point (focal point on the image forming device side) of a lens system (described later), and the MEMS mirror or the galvanometer mirror corresponds to an image emitting portion from which an image is emitted in the image forming device.

In the image forming device with first configuration or the image forming device with second configuration in the image display device including the optical device with first structure, light converted into a plurality of parallel light beams by a lens system (an optical system for converting emitted light into parallel light) is incident on an optical device (for example, light guide plate). Such a requirement for obtaining parallel light is on the basis of necessity of saving optical wavefront information when the light is incident on the optical device even after the light is emitted from the optical device via the first deflecting unit and the second deflecting unit. In order to generate a plurality of parallel light beams, specifically, as described above, for example, it is only required to locate a light emitting portion of the image forming device at a position (location) of a focal length in the lens system. The lens system has a function of converting position information of a pixel into angle information in the optical device. Examples of the lens system include an optical system having a positive optical power as a whole, such as a convex lens, a concave lens, a free curved surface prism, a hologram lens, or a combination thereof. A light shielding portion having an opening may be disposed between the lens system and the optical device in order to prevent undesired light emitted from the lens system from being incident on the optical device.

The light guide plate has two parallel surfaces (first surface and second surface) extending parallel to an axis (longitudinal direction or horizontal direction, corresponding to an X direction) of the light guide plate. The width direction (height direction or vertical direction) of the light guide plate corresponds to a Y direction. If a surface of the light guide plate on which light is incident is referred to as a light guide plate incident surface and a surface of the light guide plate from which light is emitted is referred to as a light guide plate emission surface, the first surface may constitute the light guide plate incident surface and the light guide plate emission surface, or the first surface may constitute the light guide plate incident surface and the second surface may constitute the light guide plate emission surface. The first deflecting unit is disposed on the first surface or the second surface of the light guide plate, and the second deflecting unit is disposed on the first surface or the second surface of the light guide plate. An interference fringe of a diffraction grating member extends substantially parallel to the Y direction. Examples of a material constituting the light guide plate include glass including an optical glass such as a quartz glass or BK7, a soda lime glass, and a white plate glass, and a plastic material (for example, PMMA, a polycarbonate resin, a laminated structure of a polycarbonate resin and an acrylic resin, an acrylic resin, a cycloolefin polymer, an amorphous polypropylene-based resin, and a styrene-based resin including an AS resin). The shape of the light guide plate is not limited to a flat plate, and may be a curved shape. The dimming device may be curved.

In the display device or the like of the present disclosure, a light shielding member for shielding incidence of external light on the optical device may be disposed in a region of the optical device on which light emitted from the image forming device is incident. By disposing the light shielding member for shielding incidence of external light on the optical device in a region of the optical device on which light emitted from the image forming device is incident, even if the amount of incident external light changes due to operation of the dimming device, in the first place, external light is not incident on the region of the optical device on which light emitted from the image forming device is incident. Therefore, deterioration in image display quality of the display device due to generation of undesirable stray light or the like does not occur. The region of the optical device on which light emitted from the image forming device is incident is preferably included in a projected image of the light shielding member on the optical device.

Alternatively, in the display device or the like of the present disclosure, a light shielding member for shielding incidence of external light on the first deflecting unit may be disposed in a region of the first deflecting unit on which light emitted from the image forming device is incident. By disposing the light shielding member for shielding incidence of external light on the light guide plate in a region of the light guide plate on which light emitted from the image forming device is incident, external light is not incident on the region of the light guide plate on which light emitted from the image forming device is incident. Therefore, deterioration in image display quality of the display device due to generation of undesirable stray light or the like does not occur. The region of the light guide plate on which light emitted from the image forming device is incident is preferably included in an orthogonally projected image of the light shielding member on the light guide plate.

The light shielding member may be disposed away from the optical device (light guide plate) on the opposite side to a side where the image forming device is disposed in the optical device (light guide plate). In the display device having such a configuration, the light shielding member only needs to be manufactured, for example, from an opaque plastic material. Such a light shielding member may integrally extend from a casing of the image forming device, may be attached to the casing of the image forming device, may integrally extend from a frame, or may be attached to the frame. Alternatively, the light shielding member may be disposed in a portion of the optical device (light guide plate) on the opposite side to a side where the image forming device is disposed, or may be disposed in the dimming device. For example, a light shielding member containing an opaque material may be formed on a surface of the optical device (light guide plate) on the basis of a physical vapor deposition method (PVD method) or a chemical vapor deposition method (CVD method), a printing method, or the like. A film, a sheet, or a foil including an opaque material (plastic material, metal material, alloy material, or the like) may be stuck to the surface of the optical device (light guide plate). A projected image of an end portion of the dimming device on the optical device (light guide plate) is preferably included in a projected image of a light shielding member on the optical device (light guide plate).

In the display device or the like of the present disclosure, as described above, the frame may include a front portion disposed in front of an observer and two temple portions rotatably attached to both ends of the front portion via hinges. A modern portion is attached to a distal end portion of each of the temple portions. The image display device is attached to the frame. Specifically, for example, it is only required to attach the image forming device to the temple portions. Furthermore, the front portion and the two temple portions may be integrally formed. In other words, when the entire display device or the like of the present disclosure is viewed, the frame has substantially the same structure as that of ordinary eyeglasses. A material constituting the frame including a pad portion may be the same material as a material constituting ordinary eyeglasses, such as metal, alloy, plastic, or a combination thereof. Furthermore, a nose pad may be attached to the front portion. That is, when the entire display device or the like of the present disclosure is viewed, an assembly of the frame (including a rim portion) and the nose pad has substantially the same structure as that of ordinary eyeglasses. The nose pad may also have a well-known configuration and structure.

Furthermore, in the display device or the like of the present disclosure, wiring (signal line, power supply line, or the like) from one or two image forming devices desirably extends from a distal end portion of a modern portion to the outside via a temple portion and the inside of the modern portion to be connected to a control device (control circuit or control unit) from a viewpoint of design or ease of mounting. Furthermore, each image forming device may include a headphone portion, and headphone portion wiring from each image forming device may extend from a distal end portion of the modern portion to the headphone portion via the temple portion and the inside of the modern portion. Examples of the headphone portion include an inner ear type headphone portion and a canal type headphone portion. More specifically, the headphone portion wiring preferably extends from a distal end portion of the modern portion to the headphone portion so as to go around a back side of the auricle (auditory capsule). Furthermore, a camera (imaging device) may be attached to the central portion of the front portion. Specifically, the camera includes, for example, a solid-state imaging element including a CCD or CMOS sensor and a lens. Wiring from the camera only needs to be connected to one of the image display devices (or the image forming devices), for example, via the front portion.

Furthermore, the wiring only needs to be included in the wiring extending from the image display device (or the image forming device).

The display device of the present disclosure may receive a signal for displaying an image in the image display device (a signal for forming a virtual image in the optical device (for example, light guide plate)) from the outside. In such a form, information and data regarding an image to be displayed on the image display device is recorded, stored, and saved, for example, in a so-called cloud computer or a server. By inclusion of a communication unit such as a mobile phone or a smartphone in the display device or by combination of the display device and the communication unit, various kinds of information and data can be transmitted and exchanged between the cloud computer or the server and the display device, and a signal based on various kinds of information and data, that is, a signal for displaying an image in the image display device (a signal for forming a virtual image in the optical device) can be received. Alternatively, a signal for displaying an image in the image display device (a signal for forming a virtual image in the optical device) may be stored in the display device. An image displayed on the image display device includes various kinds of information and various kinds of data. Alternatively, the display device may include a camera (imaging device). An image imaged by the camera may be sent to a cloud computer or a server via a communication unit. The cloud computer or the server may retrieve various kinds of information and data corresponding to the image imaged by the camera. The various kinds of information and data retrieved may be sent to the display device via the communication unit. An image of the various kinds of information and data retrieved may be displayed on the image display device.

When the image imaged by the camera (imaging device) is sent to the cloud computer or the server via the communication unit, the image imaged by the camera may be displayed on the image display device and may be confirmed by the optical device (for example, light guide plate). Specifically, an outer edge of a space region imaged by the camera may be displayed in a frame shape in the dimming device. Alternatively, the light shielding ratio of a region of the dimming device corresponding to the space region imaged by the camera may be higher than the light shielding ratio of a region of the dimming device corresponding to the outside of the space region imaged by the camera. In such a form, an observer sees the space region imaged by the camera darker than the outside of the space region imaged by the camera. Alternatively, the light shielding ratio of a region of the dimming device corresponding to the space region imaged by the camera may be lower than the light shielding ratio of a region of the dimming device corresponding to the outside of the space region imaged by the camera. In such a form, an observer sees the space region imaged by the camera brighter than the outside of the space region imaged by the camera. In addition, this makes it possible for an observer to easily and reliably recognize a position in the outside to be imaged by the camera.

A position in a region of the dimming device corresponding to the space region imaged by the camera (imaging device) can be calibrated. Specifically, for example, by inclusion of a mobile phone or a smartphone in the display device or by combination of the display device with the mobile phone, the smartphone, or a personal computer, the mobile phone, the smartphone, or the personal computer can display a space region imaged by the camera. In addition, in a case where there is a difference between a space region displayed on the mobile phone, the smartphone, or the personal computer and a region of the dimming device corresponding to a space region imaged by the camera, by moving/rotating or enlarging/reducing a region of the dimming device corresponding to the space region imaged by the camera using a control circuit (which can be substituted by a mobile phone, a smartphone, or a personal computer) for controlling a light shielding ratio (light transmittance) of the dimming device, it is only required to eliminate the difference between the space region displayed on the mobile phone, the smartphone, or the personal computer and the region of the dimming device corresponding to the space region imaged by the camera.

The display device of the present disclosure including the above-described various modified examples can be used, for example, for receiving/displaying an electronic mail; display of various kinds of information or the like in various sites on the Internet; display of various explanations, for example, for driving, operating, maintaining, or disassembling an observation object such as various devices, a symbol, a sign, a mark, an emblem, a design, or the like; display of various explanations concerning an observation object such as a person or an article, a symbol, a sign, a mark, an emblem, a design, or the like; display of a moving image and a still image; display of subtitles of a movie and the like; display of descriptive text concerning video synchronized with video and closed caption; and display of various explanations concerning an observation object in play, Kabuki, Noh, Kyogen, opera, concert, ballet, various dramas, an amusement park, a museum, a sightseeing spot, a holiday destination, tourist information, and the like, and descriptive text or the like for explaining contents thereof, progress status thereof, backgrounds thereof, and the like, and can be used for display of closed caption. In play, Kabuki, Noh, Kyogen, opera, concert, ballet, various dramas, an amusement park, a museum, a sightseeing spot, a holiday destination, tourist information, and the like, it is only required to display characters as an image relating to an observation object on the display device at an appropriate timing. Specifically, for example, in accordance with progress status of a movie or the like, or in accordance with progress status of a play or the like, an image control signal is sent to the display device, and an image is displayed on the display device on the basis of a predetermined schedule or time allocation by operation of an operator or under control of a computer or the like. Furthermore, various kinds of explanations concerning an observation object such as various devices, a person, or an article are displayed. If the camera captures an image of (images) an observation object such as various devices, a person, or an article, and the display device analyzes the captured (imaged) contents, the display device can display previously-created various explanations concerning an observation object such as various devices, a person, or an article.

An image signal to the image forming device may include not only an image signal (for example, character data) but also, for example, brightness data (brightness information) concerning an image to be displayed, chromaticity data (chromaticity information), or brightness data and chromaticity data. The brightness data may correspond to brightness of a predetermined region including an observation object viewed through the optical device (for example, light guide plate). The chromaticity data may correspond to chromaticity of a predetermined region including an observation object viewed through the optical device. In this way, by inclusion of brightness data concerning an image, brightness (lightness) of an image displayed can be controlled. By inclusion of chromaticity data concerning an image, chromaticity (color) of an image displayed can be controlled. By inclusion of brightness data and chromaticity data concerning an image, brightness (lightness) and chromaticity (color) of an image displayed can be controlled. In a case where brightness data corresponds to brightness of a predetermined region including an observation object viewed through the optical device, it is only required to set a value of brightness data such that the higher a value of brightness of a predetermined region including an observation object viewed through the optical device is, the higher a value of brightness of an image is (that is, the lighter an image is displayed). Furthermore, in a case where chromaticity data corresponds to chromaticity of a predetermined region including an observation object viewed through the optical device, it is only required to set a value of chromaticity data such that chromaticity of a predetermined region including an observation object viewed through the optical device has a roughly complementary color relationship with chromaticity of an image to be displayed. A complementary color refers to a combination of colors diametrically opposed to each other in a color circle. The complementary color also means a complementary color, for example, green for red, violet for yellow, and orange for blue. The complementary color also means a color to cause a decrease in color saturation by mixing a certain color with another color at an appropriate ratio, for example, white in a case of light and black in a case of an object. However, a complementary property in visual effects in parallel disposition is different from a complementary property in mixing. The complementary color is also referred to as a surplus color, a control color, or an opposite color. However, the opposite color directly indicates a color opposite to a complementary color, whereas a range indicated by the complementary color is slightly wider. A color combination of complementary colors has a synergistic effect for bringing mutual colors into prominence, and this is referred to as complementary color harmony.

The display device or the like of the present disclosure can constitute, for example, a head mounted display (HMD). In addition, this makes it possible to reduce the weight and size of the display device, to largely reduce discomfort when the display device is mounted, and further to reduce manufacturing cost. Alternatively, the display device or the like of the present disclosure can be applied to a head-up display (HUD) disposed in a cockpit of a vehicle or an aircraft, or the like. Specifically, in a HUD in which a virtual image forming region where a virtual image is formed on the basis of light emitted from an image forming device is disposed on a windshield of a cockpit of a vehicle or an aircraft, or the like, or in a HUD in which a combiner having a virtual image forming region where a virtual image is formed on the basis of light emitted from an image forming device is disposed on a windshield of a cockpit of a vehicle or an aircraft, or the like, the virtual image forming region and the combiner only need to overlap with at least a part of a dimming device. The display device or the like of the present disclosure can also be used as a stereoscopic displaying device. In this case, if necessary, it is only required to detachably attach a polarizing plate or a polarizing film to an optical device (for example, light guide plate), or to stick the polarizing plate or the polarizing film to the optical device.

Furthermore, sunglasses may be configured by the dimming device according to the first and second aspects of the present disclosure, or the dimming device according to the first and second aspects of the present disclosure may be attached to a window (including not only the window of a home but also a window in any field, such as a car window).

Example 1

Figure 1A:
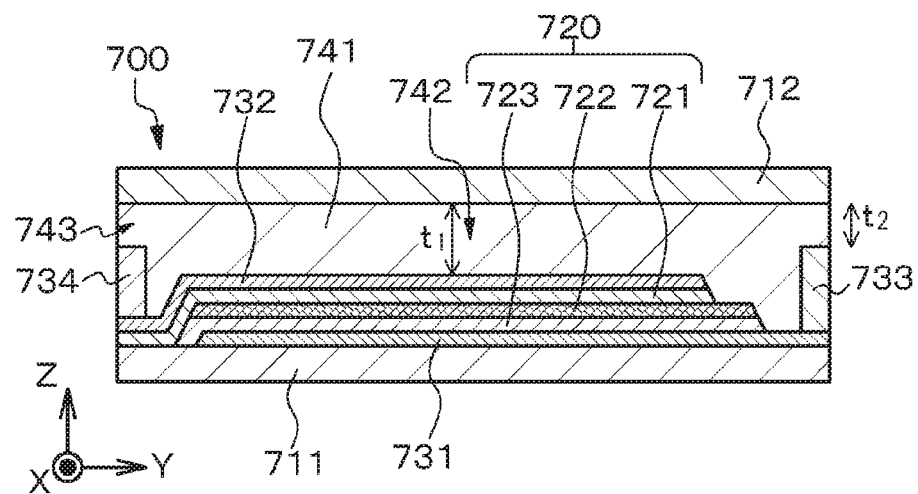
FIGS. 1A and 1B are schematic cross-sectional views obtained by cutting a dimming device of Example 1 along the arrow A-A and the arrow B-B in FIG. 2A, respectively.
Figure 1B:
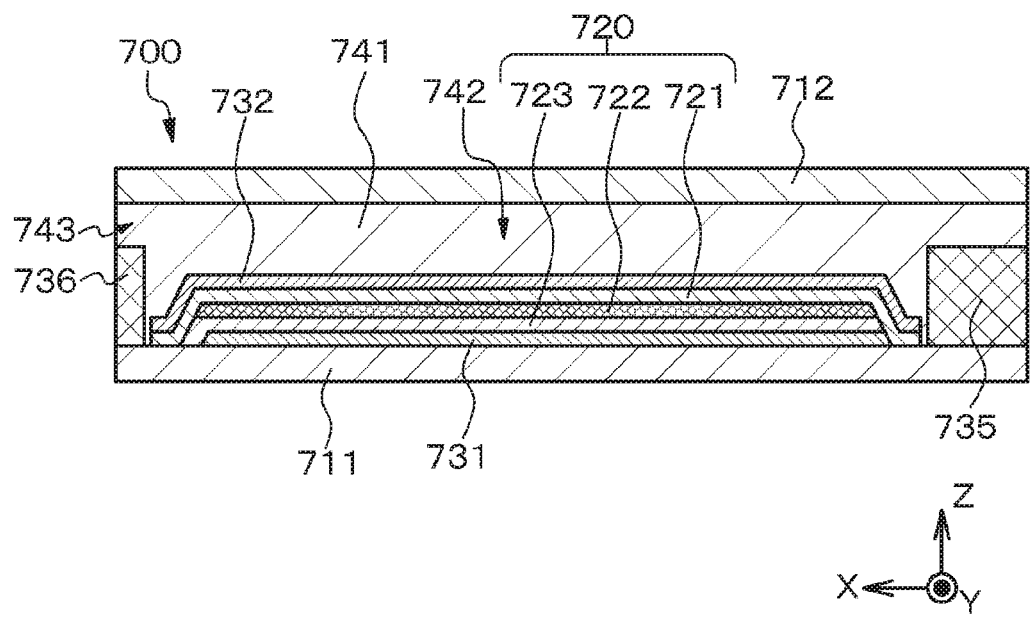
Figure 2B:
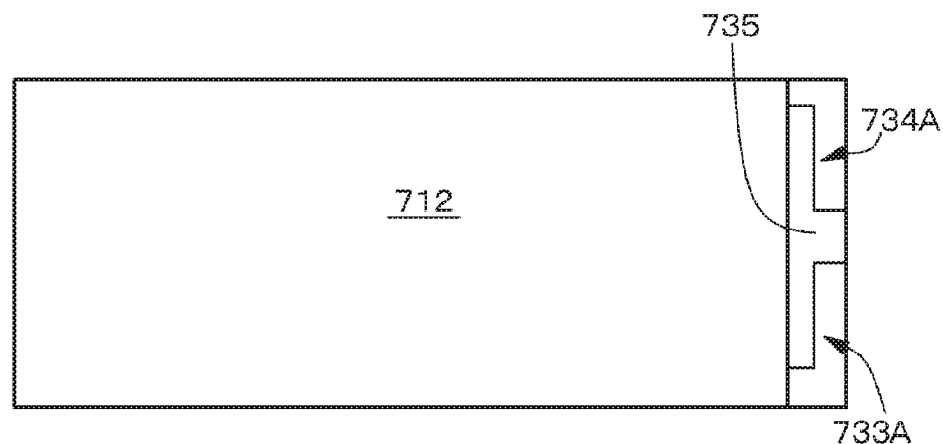
Figure 3A:
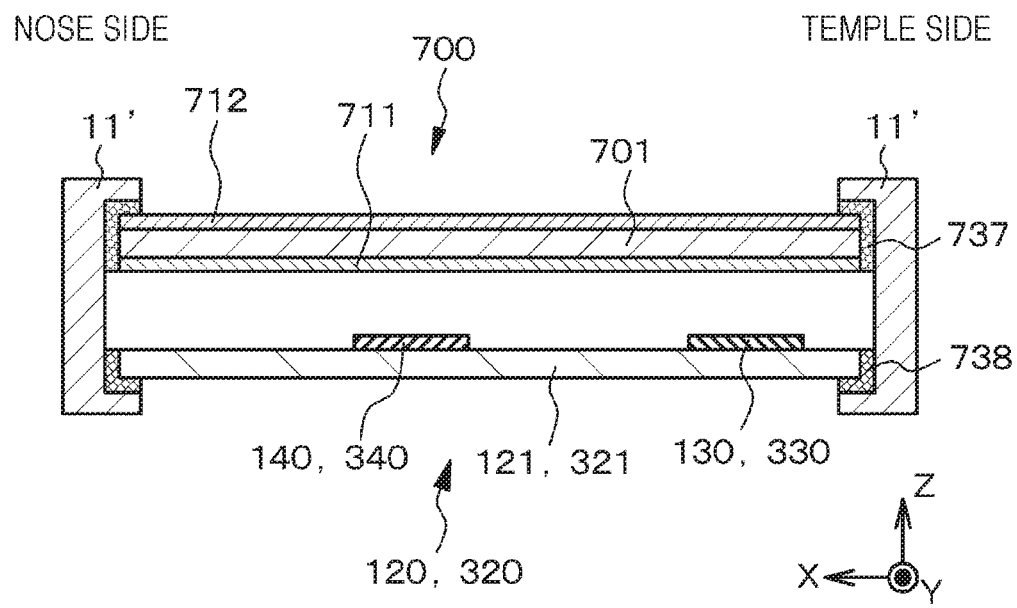
FIGS. 3A and 3B are a schematic cross-sectional view obtained by cutting a part of an image display device of Example 1 along an XZ plane and a schematic view of the dimming device of Example 1 as viewed from the front, respectively.
Figure 3B:
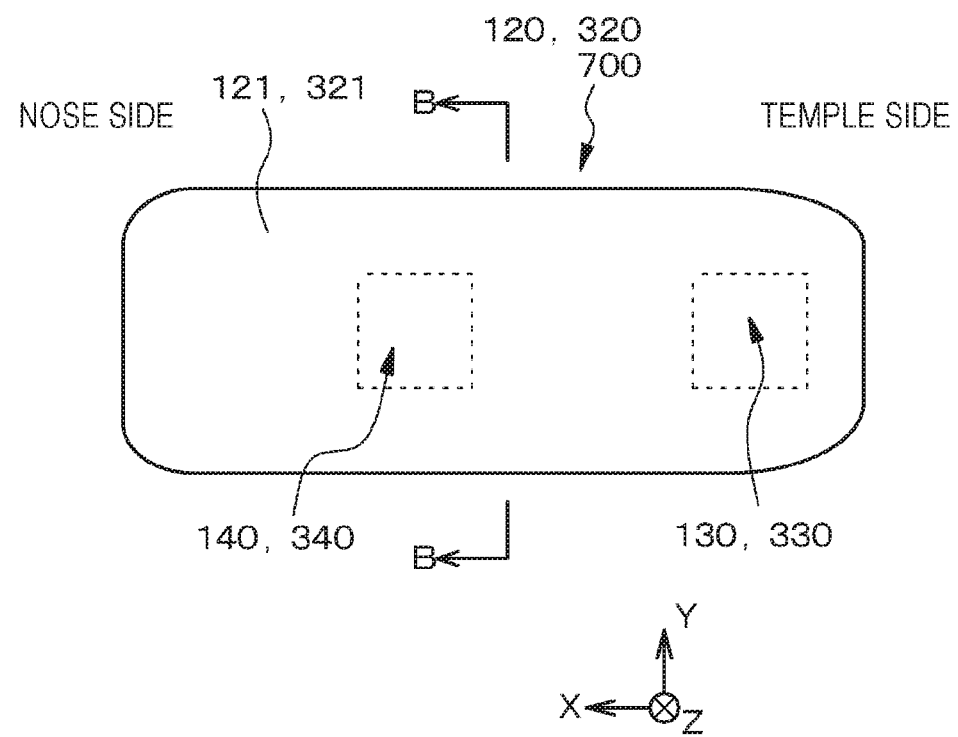
Figure 4A:
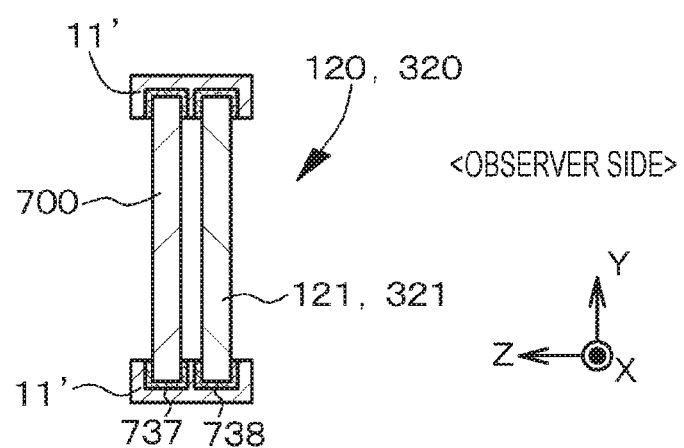
FIG. 4A is a schematic cross-sectional view obtained by cutting a part of the image display device of Example 1 along the arrow B-B in FIG. 3B (that is, cutting along a YZ plane).
Figure 4B:
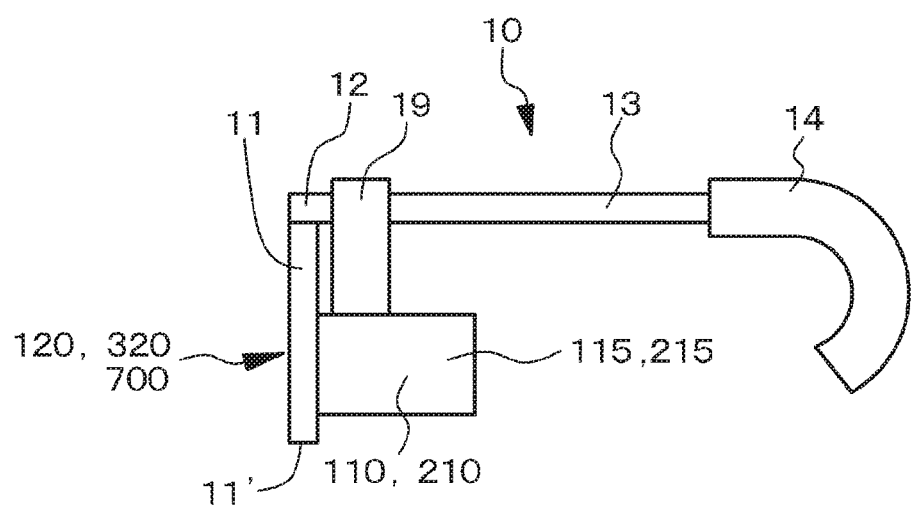
FIG. 4B is a schematic view of the display device of Example 1 as viewed from the side.
Figure 5:
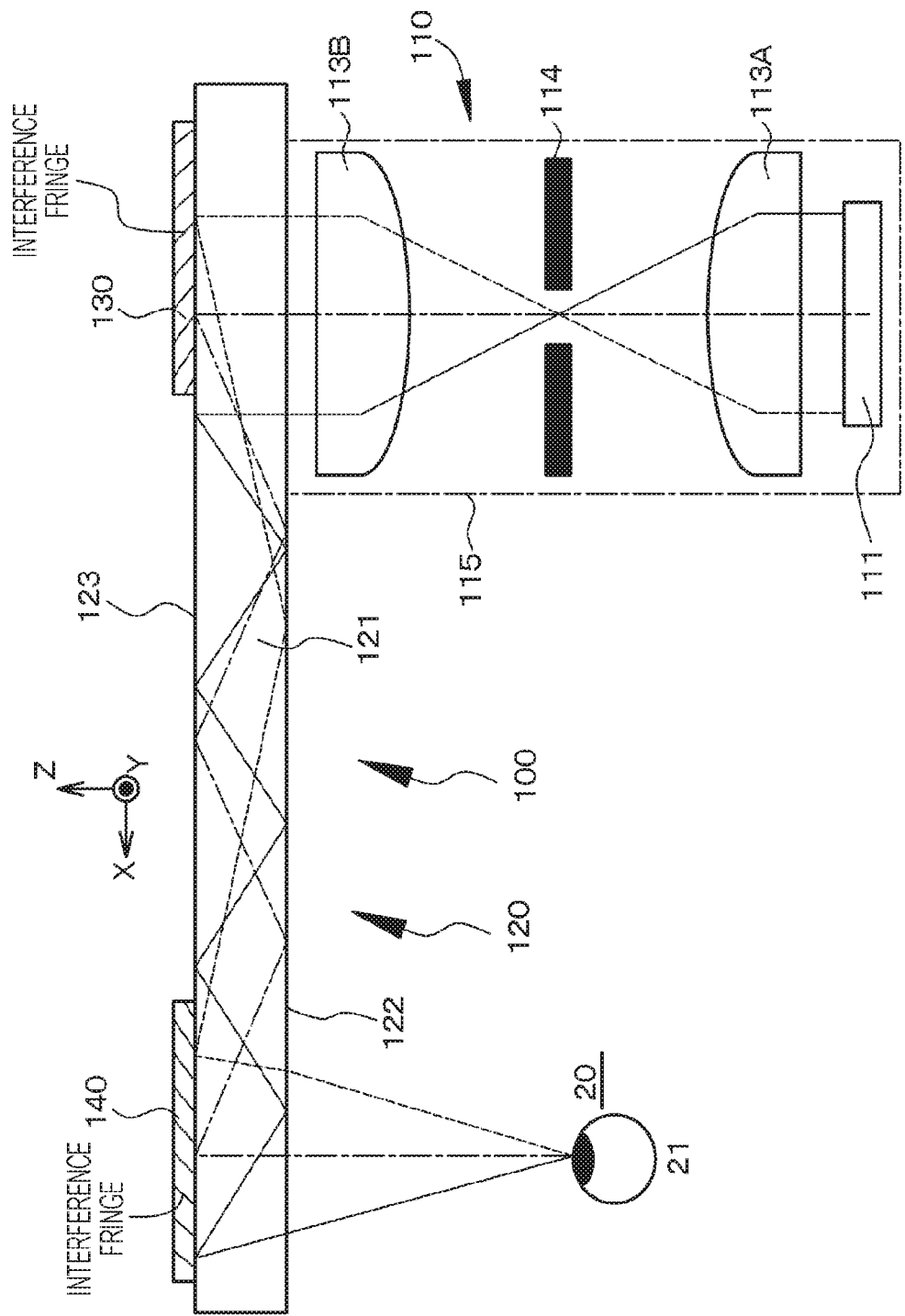
FIG. 5 is a conceptual diagram of the image display device of Example 1.
Figure 6:
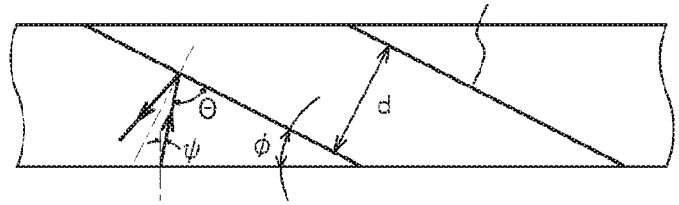
FIG. 6 is a schematic cross-sectional view illustrating a part of a reflection type volume hologram diffraction grating in an enlarged manner.
Figure 7:
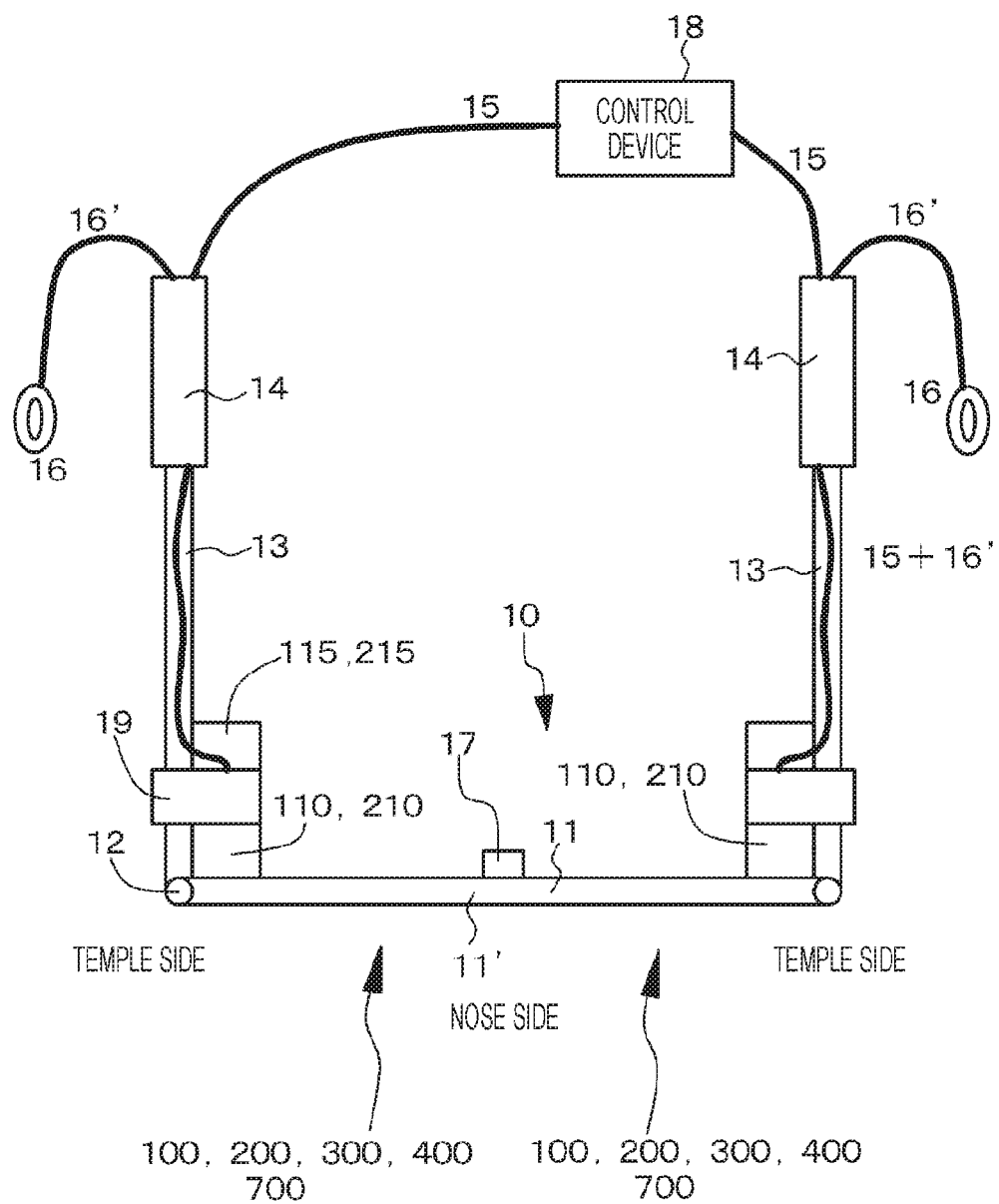
FIG. 7 is a schematic view of the display device of Example 1 as viewed from above.
Figure 8:
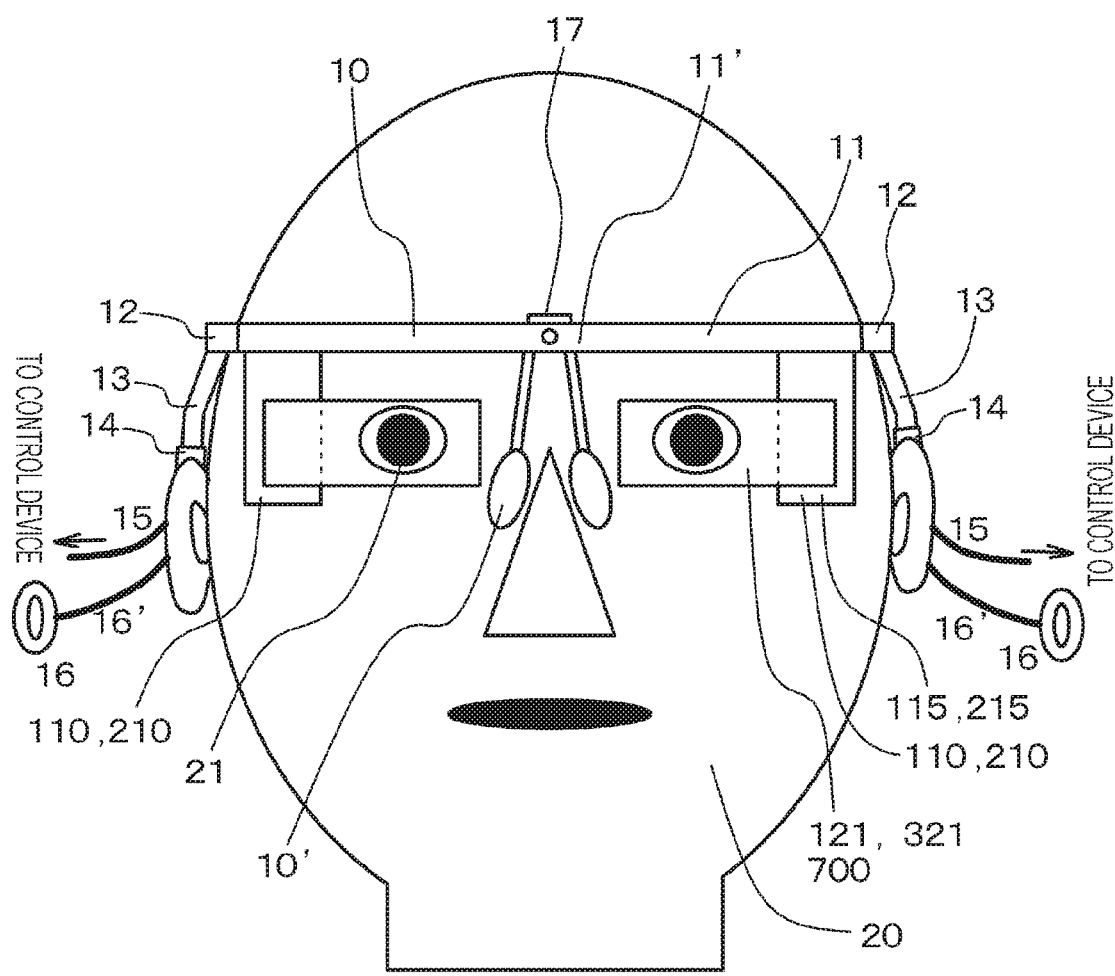
FIG. 8 is a schematic view of the display device of Example 1 as viewed from the front.

Example 1 relates to the dimming device according to the first aspect of the present disclosure, the image display device of the present disclosure, and the display device of the present disclosure (specifically, a head-mounted display (HMD)). Specifically, Example 1 relates to an optical device having a structure 1 (more specifically, an optical device having a structure 1-B) and a display device provided with an image forming device having a first configuration. Schematic cross-sectional views of the dimming device of Example 1 are illustrated in FIGS. 1A and 1B, a plan view of the first substrate and the like as viewed from the light-incident side (above) is illustrated in FIG. 2A, a plan view of the second substrate and the like as viewed from the light-incident side (above) is illustrated in FIG. 2B, a schematic cross-sectional view obtained by cutting a part of the image display device of Example 1 along an XZ plane is illustrated in FIG. 3A, a schematic view of the dimming device as viewed from the front is illustrated in FIG. 3B, a schematic cross-sectional view obtained by cutting a part of the image display device of Example 1 along the arrow B-B in FIG. 3B (that is, cutting along a YZ plane) is illustrated in FIG. 4A, and a schematic view of the display device as viewed from the side is illustrated in FIG. 4B. Furthermore, a conceptual diagram of the image display device of Example 1 is illustrated in FIG. 5, a schematic cross-sectional view illustrating a part of a reflection type volume hologram diffraction grating in an enlarged manner is illustrated in FIG. 6, a schematic view of the display device of Example 1 as viewed from above is illustrated in FIG. 7, and a schematic view of the display device of Example 1 as viewed from the front is illustrated in FIG. 8. Herein, FIGS. 1A and 1B are schematic cross-sectional views of the dimming device obtained by respectively cutting the dimming device along the arrows A-A and B-B in FIG. 2A. Also, the plan views illustrated in FIGS. 2A, 2B, 2C, 9B, 10B, 12B, and 13B illustrate not only the structural elements of the dimming device in the same level, but also the structural elements of the dimming device in different levels.

An image display device 100, 200, 300, 400, 500 of Example 1 or Examples 2 to 13 described later includes:

(a) an image forming device 110, 210;

(b) an optical device 120, 320, 520 having a virtual image forming region where a virtual image is formed on the basis of light emitted from the image forming device 110, 210; and (c) a dimming device 700 for adjusting the amount of external light incident from the outside, disposed so as to face the virtual image forming region at least. The optical device 120, 320, 520 is a see-through type (semi-transmission type) device. Furthermore, the image forming device 110, 210 displays an image (virtual image) of a single color (for example, green).

The dimming device 700 includes:

(c-1) a first substrate 711;

(c-2) a second substrate 712, disposed facing the first substrate 711, which external light enters;

(c-3) a first electrode 731 formed on top of the first substrate 711;

(c-4) a dimming layer 720 formed on top of the first electrode 731;

(c-5) a second electrode 732 formed on top of at least the dimming layer 720;

(c-6) a moisture-retaining member 741 that covers at least the second electrode 732 and faces the second substrate 712; and (c-7) sealing members 733, 734, 735, and 736 provided in an edge portion of the first substrate 711.

Furthermore, a display device of Example 1 or Examples 2 to 9 described later is more specifically a head mounted display (HMD), and includes:

(A) a frame 10 (for example, eyeglasses type frame 10) to be mounted on a head of an observer 20; and (B) an image display device attached to the frame 10.

The image display device is constituted by the image display device 100, 200, 300, 400 of Example 1 or Examples 2 to 9 described later. Each of the display devices of Examples is specifically a binocular type device including two image display devices, but may be a single eye type device including one image display device. The display device is a direct drawing type display device for directly drawing an image on a pupil 21 of an observer 20.

Additionally, a moisture-retaining member extending portion 743 that extends from the moisture-retaining member 741 is provided between the sealing members 733, 734 and the second substrate. The thickness ($t_2$) of the moisture-retaining member extending portion 743 is thinner than the thickness ($t_1$) of a moisture-retaining member 742 in the central portion of the dimming device. Specifically, the thickness is set as follows.

Average value of $t_1$=0.175 mm

Average value of $t_2$=0.110 mm

As illustrated in FIG. 3A, for example, the edge portion of the dimming device 700 is fixed (bonded) to the frame 10 (specifically, for example, rim portions 11') using an adhesive 737. The edge portions of light guide plates 121 and 321 described later are also fixed (bonded) to the frame 10 (specifically, the rim portions 11') using an adhesive 738.

In Example 1 or Examples 2 to 14 described later, optical devices 120, 320, and 520 at least partially overlap with the dimming device 700, which is a type of optical shutter. Specifically, in the example illustrated in FIGS. 3A and 3B, the optical devices 120, 320, and 520 overlap with the dimming device 700. In other words, the light guide plates 121 and 321 have the same (or substantially the same) outward shape as the first substrate 711 and the second substrate 712. The dimming device 700 overlaps with most of the light guide plates 121 and 321. However, the configuration is not limited thereto, and the optical devices 120, 320, and 520 may also overlap with a part of the dimming device 700, or the dimming device 700 may overlap with a part of the optical devices 120, 320, and 520. Also, the devices are disposed in the order of the optical device 120, 320, or 520 and the dimming device 700 from the observer side, but may also be disposed in the order of the dimming device 700 and the optical device 120, 320, or 520. Note that to simplify the drawings, the outward shape of the first substrate and the second substrate in FIGS. 2A and 2B and the outward shape of the dimming device illustrated in FIG. 3B are displayed as different shapes, but in actuality, the dimming device has the outward shape illustrated in FIG. 3B, for example.

Also, in the dimming device 700 of Example 1, the second electrode 732 is formed extending over from the dimming layer 720 to the first substrate 711, and also separated from the first electrode 731, while the moisture-retaining member 741 covers at least the second electrode 732 and the dimming layer 720. Furthermore, sealing members 733 and 734 which are part of sealing members 733, 734, 735, and 736 are formed as auxiliary electrodes containing copper (Cu). Also, the remaining parts 735 and 736 of the sealing members 733, 734, 735, and 736 contain a resin, specifically an acrylic adhesive. The auxiliary electrode includes a first auxiliary electrode 733 formed on top of the first electrode 731 and a second auxiliary electrode 734 formed on top of the second electrode 732 and separated from the first auxiliary electrode 733. The side walls of the dimming device 700 are formed by the sealing members 733, 734, 735, and 736 as well as the moisture-retaining member extending portion 743. Also, the sealing members 733, 734, 735, and 736 are provided without gaps.

The first electrode 731 and the second electrode 732 containing ITO are not patterned but are so-called solid electrodes. As illustrated in FIGS. 2A and 2B, connectors (not illustrated) are attached to portions 733A and 734A of the auxiliary electrodes 733 and 734 of the dimming device 700, while the first electrode 731 and the second electrode 732 are electrically connected to a control circuit (specifically, a control device 18 described later) for controlling the light shielding ratio of the dimming device 700.

The first substrate 711 and the second substrate 712 contain a polycarbonate resin 0.3 mm thick, for example. On an outer face of the second substrate 712, a hard coat layer (not illustrated) containing acrylic modified colloidal silica particles, phenyl ketone and acrylate organic matter, and methyl ethyl ketone is formed.

The dimming device 700 is constituted by an optical shutter to which a color change of a substance generated by a redox reaction of an electrochromic material is applied. Specifically, the dimming layer 720 includes an electrochromic material. In other words, the dimming layer 720 constituting the dimming device 700 includes an electrochromic material layer. Specifically, the dimming layer (electrochromic material layer) 720 has a laminated structure of a reduction coloring layer 721, an electrolyte layer 722, and an oxidation coloring layer 723. More specifically, each of the first electrode 731 and the second electrode 732 is constituted by a transparent conductive material such as ITO or IZO, the reduction coloring layer 721 is constituted by a $WO_3$ layer, the electrolyte layer 722 is constituted by a $Ta_2O_5$ layer, and the oxidation coloring layer 723 is constituted by an $Ir_XSn_{1-X}O$ layer. The $WO_3$ layer reductively develops a color. Furthermore, the $Ir_XSn_{1-X}O$ layer oxidatively develops a color.

In the $Ir_XSn_{1-X}O$ layer, Ir and $H_2O$ react with each other, and exist as iridium hydroxide $Ir(OH)_n$. If a negative potential is applied to the first electrode 731 and a positive potential is applied to the second electrode 732, a proton $H^+$ moves from the $Ir_XSn_{1-X}O$ layer to the $Ta_2O_5$ layer, an electron is released to the second electrode 732, the following oxidation reaction proceeds, and the $Ir_XSn_{1-X}O$ layer is colored.

$$Ir(OH)_n \rightarrow IrO_X(OH)_{n-X}\text{ (colored)} + X.H^+ + X.e^-$$

Meanwhile, a proton $H^+$ in the $Ta_2O_5$ layer moves into the $WO_3$ layer, and an electron is injected from the first electrode 731 into the $WO_3$ layer. In the $WO_3$ layer, the following reduction reaction proceeds, and the $WO_3$ layer is colored.

$$WO_3 + X.H^+ + X.e^- \rightarrow H_XWO_3\text{ (colored)}$$

Conversely, if a positive potential is applied to the first electrode 731 and a negative potential is applied to the second electrode 732, in the $Ir_XSn_{1-X}O$ layer, a reduction reaction proceeds in the opposite direction to the above, and decoloring occurs. In the $WO_3$ layer, an oxidation reaction proceeds in the opposite direction to the above, and decoloring occurs. The $Ta_2O_5$ layer contains $H_2O$. $H_2O$ is ionized by applying a voltage to the first electrode and the second electrode. The $Ta_2O_5$ layer includes a proton $H^+$ and an $OH^-$ ion, contributing to a coloring reaction and a decoloring reaction.

The Young's modulus of the material (specifically, the resin) contained in the moisture-retaining member 741 and the moisture-retaining member extending portion 743 is desirably $1 \times 10^6$ Pa or less. The resin contained in the moisture-retaining member 741 and the moisture-retaining member extending portion 743, which may also be called a proton-supplying member, a transparent adhesive member capable of retaining moisture, or a transparent sealing member capable of retaining moisture, may be selected appropriately from among acrylic resins, silicone resins, and urethane resins, and for Example 1 or Examples 2 to 15 described later, an acrylic resin is contained specifically.

In this way, by having the moisture-retaining member 741 and the moisture-retaining member extending portion 743 contain a material whose Young's modulus is $1 \times 10^6$ Pa or less, various differences in level occurring inside the dimming device can be absorbed, and inconsistencies in the thickness of the moisture-retaining member 742 in the central portion of the dimming device and inconsistencies in the thickness of the moisture-retaining member extending portion 743 can be reduced. In other words, a uniform overall distance between the first substrate and the second substrate may be attained. Furthermore, as a result, degraded visibility can be prevented. Specifically, when looking out at the external world through the dimming device 700, the occurrence of distortions or discrepancies in the image of the external world can be suppressed.

For comparison, a dimming device provided with a moisture-retaining member and a moisture-retaining member extending portion (Young's modulus: approximately 3 GPa) obtained by applying and heat-curing a two-part epoxy resin was prototyped. The dimming device prototype (dimming device of Comparative Example 1) has the same configuration and structure as those of the dimming device 700 of Example 1, except for the material contained in the moisture-retaining member and the moisture-retaining member extending portion.

Subsequently, graph paper was placed directly underneath the dimming device 700 of Example 1 and the dimming device of Comparative Example 1, and the graph paper was imaged through the dimming device 700 of Example 1 and the dimming device of Comparative Example 1. As a result, with the dimming device of Comparative Example 1, an angle of view discrepancy of up to 8.3' occurred between the captured image of the graph paper and the actual graph paper. On the other hand, with the dimming device 700 of Example 1, the angle of view discrepancy was 0°. The above results demonstrate that with a moisture-retaining member and a moisture-retaining member extending portion obtained by applying and heat-curing a two-part epoxy resin, the cure shrinkage of the two-part epoxy resin causes distortions to occur in the moisture-retaining member, causes distortions to occur in the second substrate, or causes the thickness of the moisture-retaining member in the central portion of the dimming device to become thinner. As a result, an angle of view discrepancy like the above occurs. In the dimming device of Comparative Example 1, measuring the thickness in the central portion of the dimming device, near the four corners of the dimming device, and at nine sites near the central portion of each edge of the dimming device indicated that the difference in thickness between the thickest portion and the thinnest portion was 0.106 mm. On the other hand, in the dimming device of Example 1, performing similar thickness measurements indicated that the difference in thickness between the thickest portion and the thinnest portion was 0.01 mm. Also, if a heat-curing resin is used as the moisture-retaining member, flexibility (suppleness) may be lacking, and cracks may occur in the dimming layer or dripping may occur during the manufacture of the dimming device. On the other hand, the dimming device of Example 1 is highly flexible (supple), distortions do not occur in the moisture-retaining member or the second substrate, the thickness of the dimming device is uniform, and furthermore an angle of view discrepancy does not occur. Also, a high yield can be achieved without the occurrence of cracks in the dimming layer or dripping during the manufacture of the dimming device.

The optical device 120, 320 of Example 1 or Examples 2 to 9 described later has a first structure, and includes:

(b-1) the light guide plate 121, 321 in which light incident from the image forming device 110, 210 is propagated by total reflection through the inside, and then the light is emitted toward the observer 20;

(b-2) a first deflecting unit 130, 330 for deflecting light incident on the light guide plate 121, 321 such that the light incident on the light guide plate 121, 321 is totally reflected inside the light guide plate 121, 321; and (b-3) a second deflecting unit 140, 340 for deflecting light propagated by total reflection through the inside of the light guide plate 121, 321 and emitting the light from the light guide plate 121, 321. In addition, the second deflecting unit 140, 340 forms a virtual image forming region of the optical device. Furthermore, the second deflecting unit (virtual image forming region) 140, 340 is located in a projection image of the dimming device 700.

In Example 1 or Examples 2 to 13 described later, the light guide plate 121, 321 containing an optical glass or a plastic material has two parallel surfaces (first surface 122, 322 and a second surface 123, 323) extending parallel to a light propagation direction (X direction) due to total internal reflection of the light guide plate 121, 321. The first surface 122, 322 faces the second surface 123, 323. In addition, parallel light is incident on the first surface 122, 322 corresponding to a light incident surface, propagated by total reflection through the inside, and then emitted from the first surface 122, 322 corresponding to a light emission surface. However, the present disclosure is not limited thereto. The light incident surface may be constituted by the second surface 123, 323, and the light emission surface may be constituted by the first surface 122, 322.

In Example 1, the optical device is the optical device with structure 1-B, and the image display device is the image forming device with first configuration. Specifically, the first deflecting unit and the second deflecting unit are disposed on (specifically, stuck to) a surface of the light guide plate 121 (specifically, the second surface 123 of the light guide plate 121). In addition, the first deflecting unit diffracts and reflects light incident on the light guide plate 121, and the second deflecting unit diffracts and reflects light propagated by total reflection through the inside of the light guide plate 121. Each of the first deflecting unit and the second deflecting unit is constituted by a diffraction grating element, specifically a reflection type diffraction grating element, more specifically a reflection type volume hologram diffraction grating. In the following description, a first deflecting unit constituted by a hologram diffraction grating is referred to as a "first diffraction grating member 130" for convenience, and a second deflecting unit constituted by a hologram diffraction grating is referred to as a "second diffraction grating member 140" for convenience.

In addition, in Example 1 or Example 7 described later, each of the first diffraction grating member 130 and the second diffraction grating member 140 is constituted by a single diffraction grating layer. In each diffraction grating layer containing a photopolymer material, an interference fringe corresponding to one type of wavelength band (or wavelength) is formed, and is manufactured by a conventional method. A pitch of the interference fringe formed in the diffraction grating layer (optical diffraction element) is constant, and the interference fringe is linear and parallel to the Y direction. The axes of the first diffraction grating member 130 and the second diffraction grating member 140 are parallel to the X direction, and the normal lines thereof are parallel to the Z direction.

FIG. 6 illustrates a schematic cross-sectional view illustrating a part of a reflection type volume hologram diffraction grating in an enlarged manner. In the reflection type volume hologram diffraction grating, an interference fringe having an inclination angle (slant angle) φ is formed. The inclination angle φ refers to an angle formed by a surface of the reflection type volume hologram diffraction grating and an interference fringe. The interference fringe is formed from the inside to a surface of the reflection type volume hologram diffraction grating. The interference fringe satisfies a Bragg condition. The Bragg condition means a condition satisfying the following formula (A). In formula (A), m represents a positive integer, λ represents a wavelength, d represents a pitch of a lattice plane (an interval in a normal direction of a virtual plane including an interference fringe), and Θ represents a complementary angle of an angle incident on the interference fringe. Furthermore, a relationship among Θ, an inclination angle φ, and an incident angle ψ in a case where light enters a diffraction grating member at the incident angle ψ is as illustrated in formula (B).

$$m \cdot \lambda = 2 \cdot d \cdot \sin(\Theta) \tag{A}$$

$$\Theta = 90° - (\varphi + \psi) \tag{B}$$

As described above, the first diffraction grating member 130 is disposed on (bonded to) the second surface 123 of the light guide plate 121, and diffracts and reflects parallel light incident on the light guide plate 121 from the first surface 122 such that the parallel light incident on the light guide plate 121 is totally reflected inside the light guide plate 121. Furthermore, as described above, the second diffraction grating member 140 is disposed on (bonded to) to the second surface 123 of the light guide plate 121, diffracts and reflects the parallel light propagated by total reflection through the inside of the light guide plate 121, and emits the parallel light from the first surface 122 of the light guide plate 121 in the form of parallel light.

In addition, the parallel light is propagated by total reflection through the inside of the light guide plate 121 and then emitted. At this time, the light guide plate 121 is thin, and a path through which light travels inside the light guide plate 121 is long. Therefore, the number of times of total reflection before the light reaches the second diffraction grating member 140 differs depending on an angle of view. More specifically, in the parallel light incident on the light guide plate 121, the number of times of reflection of the parallel light incident at an angle in a direction approaching the second diffraction grating member 140 is smaller than the number of times of reflection of the parallel light incident on the light guide plate 121 at an angle in a direction away from the second diffraction grating member 140. This is because the parallel light diffracted and reflected by the first diffraction grating member 130 and incident on the light guide plate 121 at an angle in a direction approaching the second diffraction grating member 140 has a smaller angle formed with the normal line of the light guide plate 121 when light propagated through the inside of the light guide plate 121 collides with an inner surface of the light guide plate 121 than the parallel light incident on the light guide plate 121 at an angle in the opposite direction thereto. Furthermore, the shape of an interference fringe formed inside the second diffraction grating member 140 and the shape of an interference fringe formed inside the first diffraction grating member 130 have a symmetrical relationship with respect to a virtual plane perpendicular to the axis of the light guide plate 121. A surface of each of the first diffraction grating member 130 and the second diffraction grating member 140 not facing the light guide plate 121 may be covered with a transparent resin plate or a transparent resin film, and the first diffraction grating member 130 and the second diffraction grating member 140 may be prevented from being damaged. Furthermore, a transparent protective film may be stuck to the first surface 122 to protect the light guide plate 121.

Basically, the light guide plate 121 in Example 7 described later has the same configuration and structure as those of the above-described light guide plate 121.

In Example 1 or Example 8 described later, the image forming device 110 is the image forming device with first configuration and has a plurality of pixels arranged in a two-dimensional matrix. Specifically, the image forming device 110 is constituted by an organic EL display device 111. Light emitted from the organic EL display device 111 passes through a first convex lens 113A constituting a lens system, further passes through a second convex lens 113B constituting the lens system, and is converted into parallel light to travel toward the light guide plate 121. A front focal point $f_{2F}$ of the second convex lens 113B is located at a rear focal point $f_{1B}$ of the first convex lens 113A. Furthermore, a diaphragm 114 is disposed at the position of the rear focal point $f_{1B}$ of the first convex lens 113A (the front focal point $f_{2F}$ of the second convex lens 113B). The diaphragm 114 corresponds to an image emitting portion. The entire image forming device 110 is housed in a casing 115. The organic EL display device 111 includes a plurality of (for example, 640×480) pixels (organic EL elements) arranged in a two-dimensional matrix.

The frame 10 includes a front portion 11 disposed in front of the observer 20, two temple portions 13 rotatably attached to both ends of the front portion 11 via hinges 12, and a modern portion (also referred to as a leading cell, an earmuff, or an ear pad) 14 attached to a distal end portion of each of the temple portions 13. Furthermore, a nose pad 10' (refer to FIG. 8) is attached. In other words, basically, an assembly of the frame 10 and the nose pad 10' has substantially the same structure as that of ordinary eyeglasses. Furthermore, each casing 115 is attached to each of the temple portions 13 by an attachment member 19. The frame 10 is manufactured from metal or plastic. Each casing 115 may be detachably attached to each of the temple portions 13 by the attachment member 19. Furthermore, for an observer owing and wearing eyeglasses, each casing 115 may be detachably attached to each of the temple portions 13 of the frame 10 of the eyeglasses owned by the observer by the attachment member 19. Each casing 115 may be attached to the outside or the inside of each of the temple portions 13. Alternatively, the light guide plate 121 may be fitted in the rim portion 11' included in the front portion 11.

Furthermore, wiring (signal line, power supply line, or the like) 15 extending from one of the image forming devices 110 and 210 extends to the outside from a distal end portion of the modern portion 14 via each of the temple portions 13 and the inside of the modern portion 14, and is connected to a control device (control circuit or control unit) 18. Each of the image forming devices 110 and 210 includes a headphone portion 16. Headphone portion wiring 16' extending from each of the image forming devices 110 and 210 extends from a distal end portion of the modern portion 14 to the headphone portion 16 via each of the temple portions 13 and the inside of the modern portion 14. More specifically, the headphone portion wiring 16' extends from a distal end portion of the modern portion 14 to the headphone portion 16 so as to go around a back side of the auricle (auditory capsule). With such a configuration, an impression that the headphone portion 16 or the headphone portion wiring 16' is disorderly disposed is not given, and a simple display device can be obtained. As described above, the wiring (signal line, power supply line, or the like) 15 is connected to the control device (control circuit) 18, and the control device 18 performs processing for image display. The control device 18 can be constituted by a well-known circuit.

A camera 17 including a solid-state imaging element including a CCD or CMOS sensor and a lens (these are not illustrated) is attached to a central portion of the front portion 11 with a suitable attachment member (not illustrated), if necessary. A signal from the camera 17 is sent to the control device (control circuit) 18 via wiring (not illustrated) extending from the camera 17.

For example, the dimming device 700 can be manufactured by the following method.

[Step-100]

In other words, first, the first electrode 731, the dimming layer 720, and the second electrode 732 are formed on top of the first substrate 711, and the sealing members are formed in the edge portion of the first substrate 711.

[Step-100A]

Specifically, the first electrode 731 constituted by ITO having a thickness of 0.30 μm is formed on the preferred region of the first substrate 711. Subsequently, the oxidation coloring layer 723 constituted by an $Ir_xSn_{1-x}O$ layer (iridium tin oxide layer) having a thickness of 0.15 µm is formed on the first electrode 731 on the basis of a reactive sputtering method, and the electrolyte layer 722 constituted by a $Ta_2O_5$ layer (tantalum oxide) having a thickness of 0.45 µm is further formed thereon. Subsequently, the reduction coloring layer 721 constituted by a $WO_3$ layer (tungsten oxide) having a thickness of 0.48 µm is formed on the basis of a reactive sputtering method. The oxidation coloring layer 723, the electrolyte layer 722, and the reduction coloring layer 721 can be formed also by a magnetron sputtering method, an anodic oxidation method, a plasma CVD method, a sol-gel method, or the like. During film formation, the oxidation coloring layer 723, the electrolyte layer 722, and the reduction coloring layer 721 may be formed using a metal mask. Thereafter, the second electrode 732 constituted by ITO having a thickness of 0.30 µm is formed on the reduction coloring layer 721. The first electrode 731 and the second electrode 732 can be formed on the basis of a PVD method such as an ion plating method or a vacuum vapor deposition method, a sol-gel method, or a CVD method. During film formation, the first electrode 731 and the second electrode 732 may be formed using a metal mask.

[Step-100B]

After that, the sealing members 733, 734, 735, and 736 are formed in the edge portion of the first substrate 711. Specifically, on the basis of a printing method, the sealing members 733 and 734 (first auxiliary electrode 733 and second auxiliary electrode 734) containing copper (Cu) are formed in the edge portion of the first substrate 711. Also, the sealing members 735 and 736 are formed in the edge portion of the first substrate 711 by a printing method. The sealing members 733, 734, 735, and 736 are formed such that there are no gaps between the sealing members 733, 734, 735, and 736 (see FIG. 2A).

[Step-110]

Next, the moisture-retaining member 741 is disposed on top of at least the second electrode 732, and the moisture-retaining member extending portion 743 that extends from the moisture-retaining member 741 is disposed on top of the sealing members. At this point, because an acrylic resin is used, the moisture-retaining member 741 is stuck to at least the second electrode 732, and the moisture-retaining member extending portion 743 is stuck to the sealing members 733, 734, 735, and 736. Note that if the moisture-retaining member 741 is stored at room temperature with a relative humidity of 50%, for example, an equilibrium moisture state can be maintained. A liquid-state moisture-retaining member 741 can also be applied onto the second electrode 732 and the like using a flow coater, a spin coater, screen printing, a gravure coater, or the like.

[Step-120]

Subsequently, the second substrate 712 is disposed on top of the moisture-retaining member 741 and the moisture-retaining member extending portion 743. In other words, the second substrate 712 having a hard coat layer formed on the outer face thereof is prepared. Subsequently, the second substrate 712 is placed on top of the moisture-retaining member 741 and the moisture-retaining member extending portion 743 such that the moisture-retaining member 741 and the moisture-retaining member extending portion 743 touch the inner face of the second substrate 712. By applying pressure uniformly to the second substrate 712, the moisture-retaining member 741 and the moisture-retaining member extending portion 743 are stuck to the second substrate 712. In this way, the dimming device 700 of Example 1 can be obtained.

In the display device of Example 1, by applying a DC voltage of 1.5 V between the first electrode 731 and the second electrode 732 for 30 seconds, the total light transmittance in the visible light region was reduced from 76% to 4%. Subsequently, when the application of a voltage to the first electrode 731 and the second electrode 732 was stopped, the total light transmittance was maintained at 8% even after one hour passed. By applying a voltage to a decoloring side in this state, decoloring occurred. Specifically, by applying a DC voltage of 1.5 V for four seconds, the total light transmittance in the visible light region returned to 76%.

A cycle test was performed in which a constant voltage of 1.5 V and −1.5 V was continuously applied between the first electrode 731 and the second electrode 732 at a cycle of 60 seconds. As a result, deterioration of the dimming device was not observed even after 30,000 cycles, and coloring/decoloring was repeated.

Furthermore, when a drying environment having a dew point of −25° C. was formed in a glove box, and the display device was stored in the glove box for 30 days. Thereafter, the display device was driven in the glove box. At this time, it was confirmed that the total light transmittance in the visible light region was 5% or less.

Furthermore, the display device was stored in an environment of 60° C. or higher and 10% RH or less for 32 hours, and then a DC voltage of 1.5 V was applied between the first electrode 731 and the second electrode 732 for 30 seconds. At this time, the total light transmittance in the visible light region was reduced to 7%. Thereafter, the display device was stored in an environment of normal temperature/normal humidity for 10 hours, and then a DC voltage of 1.5 V was applied between the first electrode 731 and the second electrode 732 for 30 seconds. At this time, the total light transmittance in the visible light region was reduced to 4%. In other words, the display device recovered to an initial state.

As above, with the dimming device, image display device, and display device of Example 1, because the moisture-retaining member (moisture-retaining layer) is provided, it is possible to suppress a phenomenon in which a color change does not occur in the dimming device when moisture disappears in the dimming device. Therefore, a dimming device, an image display device, and a display device with high long-term reliability can be provided. Moreover, because the thickness of the moisture-retaining member extending portion is thinner than the thickness of the moisture-retaining member in the central portion of the dimming device, even in cases where moisture enters or exits through the edge face of the moisture-retaining member extending portion (the side wall or side face of the dimming device), the entering and exiting of moisture can be suppressed. For this reason, the problem of lowered reliability of the dimming device, image display device, or display device due to excessive entering and exiting of moisture can be avoided. Furthermore, because the auxiliary electrodes are provided, appropriate voltages can be applied easily to the first electrode and the second electrode, and the occurrence of a voltage drop in the first electrode or the second electrode can be suppressed, thereby reducing unevenness when the dimming device is colored.

Figure 2C:
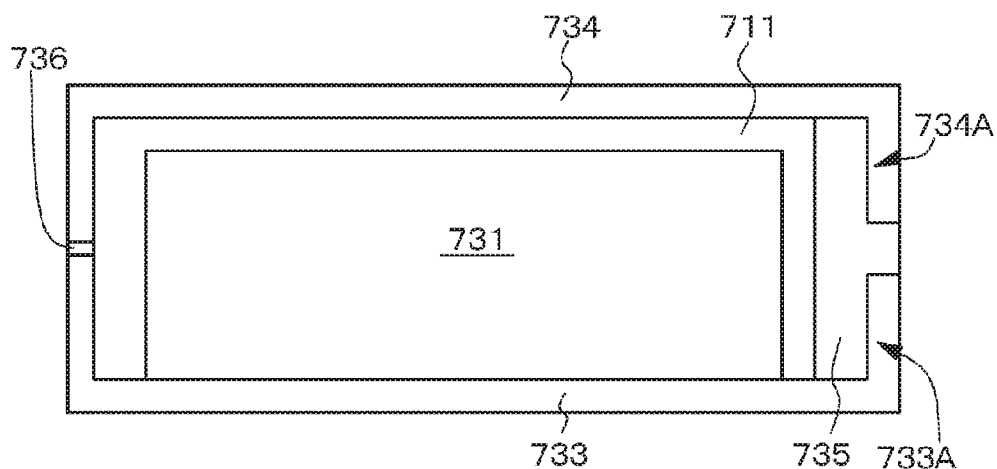
FIG. 2C is a plan view of the first substrate and the like as viewed from the light-incident side (above) in a modified example of the dimming device of Example 1.

As illustrated in FIG. 2C by the plan view of the first substrate and the like as viewed from the light-incident side (above) in a modified example of the dimming device of Example 1, a part of the sealing member 736 may be replaced by the first auxiliary electrode 733 and the second auxiliary electrode 734.

Information and data regarding an image to be displayed on the image display device 100, 200, 300, 400, 500 or a signal to be received by a receiving device is recorded, stored, and saved, for example, in a so-called cloud computer or a server. By inclusion of a communication unit (sending/receiving device) such as a mobile phone or a smartphone in the display device or by incorporation of a communication unit (receiving device) into the control device (control circuit or control unit) 18, various kinds of information, data, and signals can be transmitted and exchanged between the cloud computer or the server and the display device via the communication unit, a signal based on various kinds of information and data, that is, a signal for displaying an image in the image display device 100, 200, 300, 400, 500 can be received, and the receiving device can receive the signal.

Specifically, if an observer inputs a request for "information" to be obtained to a mobile phone or a smartphone, the mobile phone or the smartphone accesses a cloud computer or a server to obtain "information" from the cloud computer or the server. In this way, the control device 18 receives a signal for displaying an image in the image display device 100, 200, 300, 400, 500. The control device 18 performs well-known image processing on the basis of this signal, and displays "information" in the image forming device 110 as an image. The "information" is displayed as a virtual image at a predetermined position controlled by the control device 18 on the basis of light emitted from the image forming device 110, 210 in the light guide plate 121, 321. In other words, a virtual image is formed in a part of the virtual image forming region (second deflecting unit 140, 340, or the like).

In some cases, a signal for displaying an image in the image display device 100, 200, 300, 400, 500 may be stored in the display device (specifically, the control device 18).

Alternatively, an image imaged by the camera 17 included in the display device may be sent to a cloud computer or a server via a communication unit. The cloud computer or the server may retrieve various kinds of information and data corresponding to the image imaged by the camera 17. The various kinds of information and data retrieved may be sent to the display device via the communication unit. An image of the various kinds of information and data retrieved may be displayed on the image display device 100, 200, 300, 400, 500. Furthermore, if input of "information" is performed together with such a form, for example, information regarding a place or the like where an observer is located or a direction or the like in which the observer is facing can be weighted. Therefore, "Information" can be displayed on the image forming device 110, 210 with higher accuracy.

The dimming device 700 may be in an operation state all the time, may be determined to be in an operation/non-operation (ON/OFF) state by instruction (operation) of an observer, or may be normally in a non-operation state while starting operation on the basis of a signal for displaying an image in the image display device 100, 200, 300, 400, 500. In order to determine an operation/non-operation state by instruction (operation) of an observer, for example, the display device only needs to further include a microphone via which a voice is input and the dimming device 700 is thereby controlled. Specifically, switching of operation/non-operation of the dimming device 700 only needs to be controlled according to an instruction based on a real voice of an observer. Alternatively, information to be obtained may be input by voice input. Alternatively, the display device only needs to further include an infrared input/output device to control operation of the dimming device 700. Specifically, switching of operation/non-operation of the dimming device 700 only needs to be controlled by detection of a blink of an observer by the infrared input/output device.

Note that, as described later with reference to FIG. 34, the dimming device may also have a configuration that controls the light shielding ratio in each region of the dimming device. Additionally, with such a dimming device, the dimming device can be controlled such that the light shielding ratio of the virtual image projection region of the dimming device where a projection image of the virtual image onto the dimming device is included is higher than the light shielding ratio of other regions of the dimming device. Specifically, the voltages applied to the first electrode 731 and the second electrode 732 are controlled by the control device 18. In the image forming device 110, the size and position of the virtual image projection region of the dimming device is decided on the basis of a signal for displaying an image. Alternatively, a form may be adopted in which the light shielding ratio of the virtual image projection region of the dimming device is increased before a virtual image is formed in the light guide plates 121 and 321 on the basis of light emitted from the image forming devices 110 and 210. The time between when the light shielding ratio of the virtual image projection region of the dimming device is increased and when the virtual image is formed may be from 0.5 seconds to 30 seconds as an example, but is not limited to such values. In this way, the observer is able to understand in advance which position of the light guide plate and when a virtual image is to be formed, and therefore an improvement in the visibility of the virtual image to the observer may be attained. The light shielding ratio of the virtual image projection region of the dimming device may also be configured to increase successively over time. In other words, what is referred to as a fade in can be achieved. Alternatively, in the case where a virtual image has not been formed, it is sufficient to set the light shielding ratio of the dimming device as a whole to the same value as the light shielding ratio of other regions of the dimming device. When the formation of the virtual image ends and the virtual image disappears, the light shielding ratio of the virtual image projection region of the dimming device where the projection image of the virtual image onto the dimming device is included may be set immediately to the same value as the light shielding ratio of the other regions of the dimming device, but may also be controlled to become equal to the light shielding ratio of the other regions of the dimming device over time (for example, over 3 seconds). In other words, what is referred to as a fade out can be achieved.

Example 2

Figure 9A:
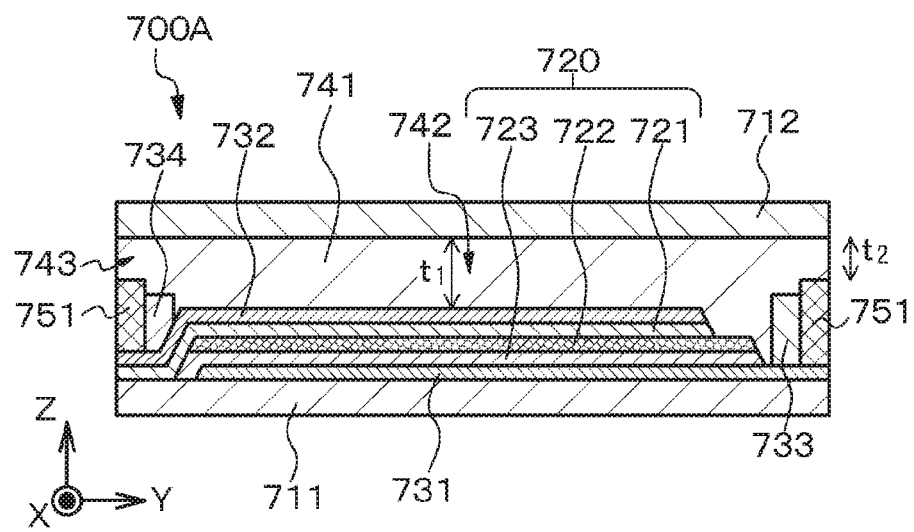
FIGS. 9A and 9B are, respectively, a schematic cross-sectional view similar to a view obtained by cutting a dimming device of Example 2 along the arrow A-A in FIG. 2A, and a plan view of a first substrate and the like of the dimming device of Example 2 as viewed from the light-incident side (above).
Figure 9B:
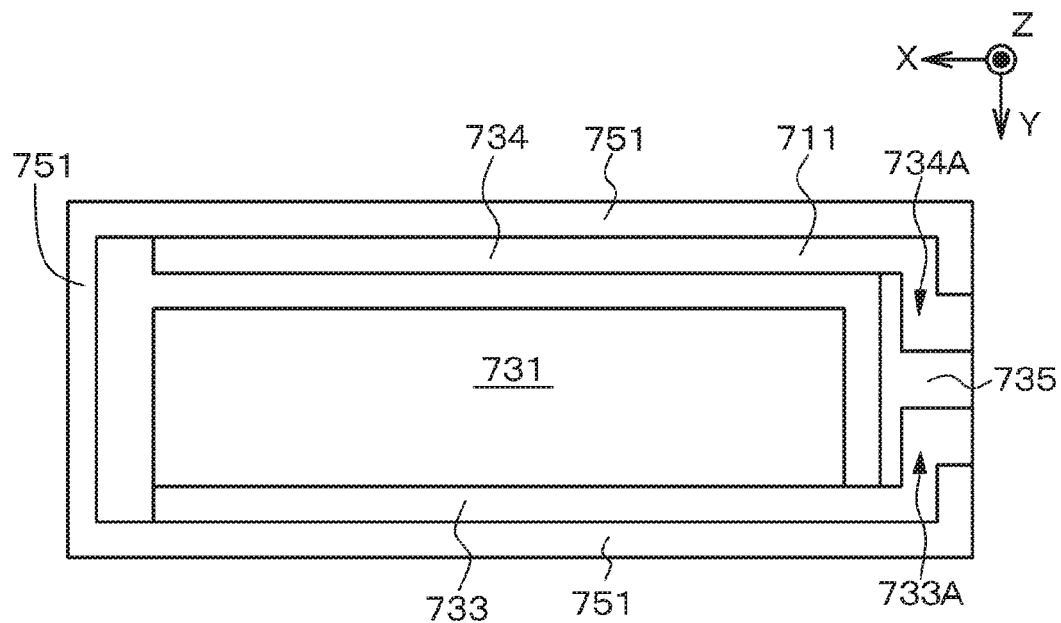

Example 2 is a modification of Example 1. A schematic cross-sectional view of a dimming device 700A of Example 2 similar to the view along the arrow A-A in FIG. 2A is illustrated in FIG. 9A, and a plan view of the first substrate and the like as viewed from the light-incident side (above) is illustrated in FIG. 9B.

In the dimming device 700A of Example 2, a sealing member 751 contains a resin. The Young's modulus of the resin contained in the sealing member 751 is $1 \times 10^7$ Pa or less. Additionally, an auxiliary electrode is provided on the inner side of a part of the sealing member 751. The auxiliary electrode includes a first auxiliary electrode 733 formed on top of the first electrode 731 and a second auxiliary electrode 734 formed on top of the second electrode 732 and separated from the first auxiliary electrode 733. Examples of the resin contained in the sealing member 751 include ultraviolet-curing resins (specifically, resins containing acrylic resins, urethane resins, silicone resins, fluorine resins, polyimide resins, and epoxy resins).

In the dimming device 700A, the sealing member 751 corresponding to a part of the outer wall of the dimming device 700A is formed such that there are no gaps, except for the regions corresponding to portions 733A and 734A of the auxiliary electrodes 733 and 734 where connectors are to be attached. Except for the above points, the configuration and structure of the dimming device 700A of Example 2 as well as an image display device and a display device using the dimming device 700A of Example 2 may be similar to the configuration and structure of the dimming device 700, the image display device, and the display device described in Example 1, and therefore a detailed description is omitted.

Example 3

Figure 10A:
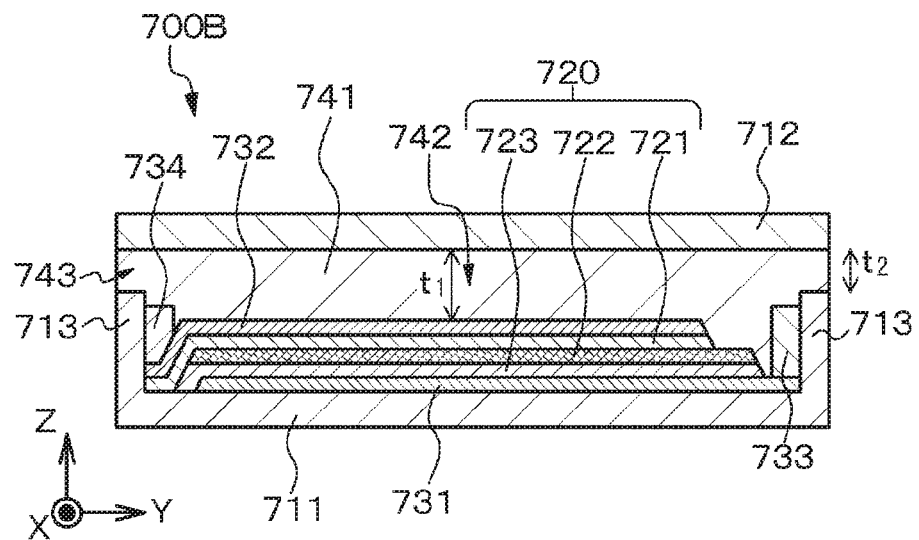
FIGS. 10A and 10B are, respectively, a schematic cross-sectional view similar to a view obtained by cutting a dimming device of Example 3 along the arrow A-A in FIG.
Figure 10B:
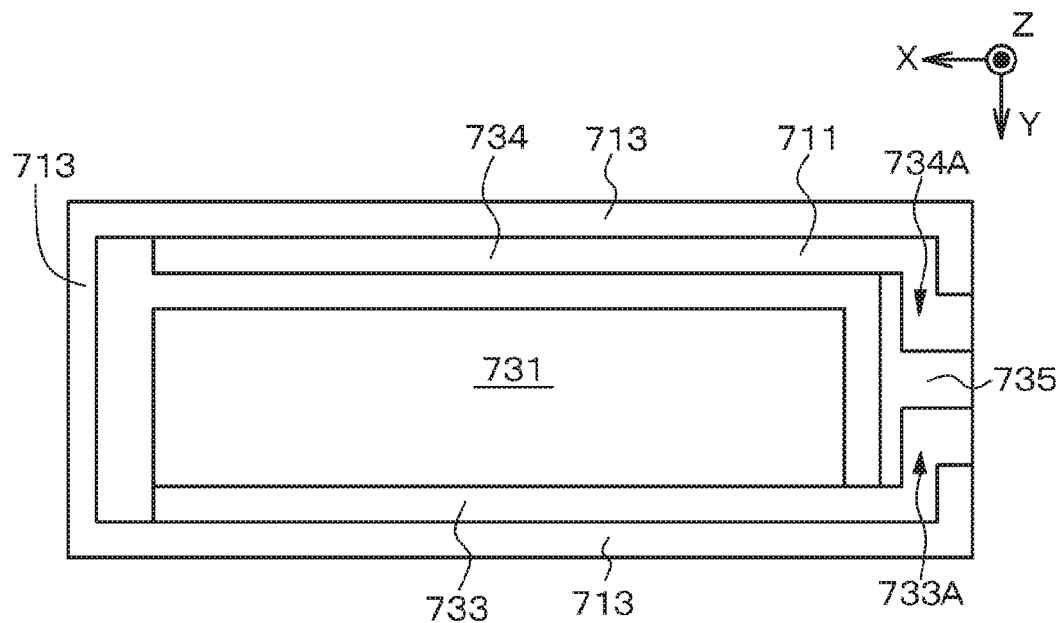

Example 3 is also a modification of Example 1. A schematic cross-sectional view of a dimming device 700B of Example 3 similar to the view along the arrow A-A in FIG. 2A is illustrated in FIG. 10A, and a plan view of the first substrate and the like as viewed from the light-incident side (above) is illustrated in FIG. 10B.

In the dimming device 700B of Example 3, the sealing member is a protruding portion 713 provided in the edge portion of the first substrate 711. The protruding portion in the edge portion of the first substrate 711 may be formed by hot-pressing the edge portion of the first substrate 711 using a hot press, for example. An auxiliary electrode is provided on the inner side of a part of the sealing member, that is, the protruding portion 713. The auxiliary electrode includes a first auxiliary electrode 733 formed on top of the first electrode 731 and a second auxiliary electrode 734 formed on top of the second electrode 732 and separated from the first auxiliary electrode 733.

In the dimming device 700B, the sealing member (protruding portion 713) corresponding to a part of the outer wall of the dimming device 700B is formed such that there are no gaps, except for the regions corresponding to portions 733A and 734A of the auxiliary electrodes 733 and 734 where connectors are to be attached. Except for the above points, the configuration and structure of the dimming device 700B of Example 3 as well as an image display device and a display device using the dimming device 700B of Example 3 may be similar to the configuration and structure of the dimming device 700, the image display device, and the display device described in Example 1, and therefore a detailed description is omitted.

Example 4

Example 4 is a modification of Examples 1 to 3. As illustrated in FIG. 11 by the schematic plan view of a dimming device 700C of Example 4 similar to the view along the arrow A-A in FIG. 2A, an inorganic film 714 containing aluminum oxide ($Al_2O_3$) is formed on the face (inner face) of the second substrate 712 that faces the moisture-retaining member 741. In this way, by forming the inorganic film 714, rigidity is imparted to the second substrate 712, thereby making strain occur less readily in the second substrate 712. The inorganic film 714 can be formed on the basis of a PVD method, for example. Except for the above points, the configuration and structure of the dimming device 700C of Example 4 as well as an image display device and a display device using the dimming device 700C of Example 4 may be similar to the configuration and structure of the dimming devices 700, 700A, and 700B, the image display devices, and the display devices described in Examples 1 to 3, and therefore a detailed description is omitted.

Example 5

Example 5 is a modification of Examples 1 to 4. In Example 5, by providing branching auxiliary electrodes that extend from an auxiliary electrode, a uniform voltage can be applied easily to the first electrode and/or the second electrode. A schematic cross-sectional view of a dimming device 700D of Example 5 similar to the view along the arrow B-B in FIG. 2A is illustrated in FIG. 12A, and a plan view of the second electrode and the like of the dimming device 700D of Example 5 as viewed from the light-incident side (above) is illustrated in FIG. 12B. Second branching auxiliary electrodes 734' that extend in the Y direction from the second auxiliary electrode 734 extending in the X direction are formed on top of the second electrode 732.

Alternatively, a schematic cross-sectional view of a modified example of the dimming device 700D of Example 5 similar to the view along the arrow B-B in FIG. 2A is illustrated in FIG. 13A, and a plan view of the first electrode and the like as viewed from the opposite side (below) of the light-incident side is illustrated in FIG. 13B. First branching auxiliary electrodes 733' that extend in the Y direction from the first auxiliary electrode 733 extending in the X direction are formed on the underside (on the first electrode side) of the first electrode 731. Specifically, the first branching auxiliary electrodes 733' are provided touching the first electrode 731 between the first substrate 711 and the first electrode 731. A layer 744 containing the same material as the moisture-retaining member is formed between the first branching auxiliary electrodes 733'. The edge face of the dimming device 700D is also formed by the layer 744.

Alternatively, a schematic cross-sectional view of a modified example of the dimming device 700D of Example 5 similar to the view along the arrow B-B in FIG. 2A is illustrated in FIG. 14. The second branching auxiliary electrode 734' that extends in the Y direction from the second auxiliary electrode 734 extending in the X direction is formed on top of the second electrode 732. Also, the first branching auxiliary electrode 733' that extends in the Y direction from the first auxiliary electrode 733 extending in the X direction is formed on top (on the second electrode side) of the first electrode 731.

By providing branching auxiliary electrodes in this way, the occurrence of an excessive voltage drop in the first electrode or the second electrode can be suppressed, thereby reducing unevenness when the dimming device is colored. Note that the width of the branching auxiliary electrodes is preferably thin from the perspective of visibility.

Except for the above points, the configuration and structure of the dimming device 700D of Example 5 as well as an image display device and a display device using the dimming device 700D of Example 5 may be similar to the configuration and structure of the dimming devices 700, 700A, 700B, and 700C, the image display devices, and the display devices described in Examples 1 to 4, and therefore a detailed description is omitted.

Example 6

Example 6 relates to a dimming device according to second aspect of the present disclosure. Schematic cross-sectional views of a dimming device 700E of Example 6 similar to the views obtained by cutting along the arrows A-A and B-B in FIG. 2A are illustrated in FIGS. 15A and 15B as well as FIGS. 16A and 16B.

The dimming device 700E of Example 6 includes:
a first substrate 711;
a second substrate 712, disposed facing the first substrate 711, which external light enters;
a first electrode 731 formed on top of the first substrate 711;
a dimming layer 720 formed on top of the first electrode 731;
a second electrode 732 formed on top of at least the dimming layer 720; and
a moisture-retaining member 741 that covers at least the second electrode 732 and faces the second substrate 712.

Further provided are
a first sealing member 761 disposed on top of an edge portion of the first substrate 711 and
a second sealing member 762 disposed between the first sealing member 761 and the second substrate 712.

Herein, in the dimming device 700E of Example 6 illustrated in FIGS. 15A and 15B, a part of the first sealing member 761 is formed by a first auxiliary electrode 733 and a second auxiliary electrode 734 as in Example 1, while the remaining parts 735 and 736 are formed by a resin as in Example 1. The second sealing member 762 contains a different resin than the moisture-retaining member 741. Examples of the resin contained in the second sealing member 762 include resins containing acrylic resins, urethane resins, silicone resins, fluorine resins, polyimide resins, and epoxy resins. Note that the plan view of the first substrate and the like and the plan view of the second substrate and the like when viewing the dimming device of Example 6 from the light-incident side (above) are the same as FIGS. 2A and 2B.

In the manufacturing of the dimming device 700E of Example 6, first, a step similar to [Step-100] of Example 1 is executed. Next, a step similar to [Step-110] of Example 1 is executed. However, although the moisture-retaining member 741 is disposed on top of at least the second electrode 732, the moisture-retaining member 741 is not disposed on the top faces of the first auxiliary electrode 733, the second auxiliary electrode 734, and the remaining parts 735 and 736 of the first sealing member 761. After that, the second substrate 712 is disposed on top of the moisture-retaining member 741. Next, the second sealing member 762 is formed between the first sealing member 761 and the second substrate 712. Specifically, a liquid second sealing member is made to infiltrate between the first sealing member 761 and the second substrate 712 on the basis of capillary action. With this arrangement, the occurrence of stress caused by the second sealing member can be suppressed. Additionally, by radiating ultraviolet light, the second sealing member is cured, thereby sticking the moisture-retaining member 741 and the second sealing member 762 to the second substrate 712. In this way, the dimming device 700E of Example 6 can be obtained.

Alternatively, in a modified example 700E of the dimming device of Example 6 illustrated in FIGS. 16A and 16B, a first sealing member 763 contains a resin. Note that in this modified example, the plan view of the first substrate and the like when viewing the dimming device from the light-incident side (above) is substantially the same as FIG. 9B. Additionally, in this case, the Young's modulus of the resin contained in the first sealing member 763 is preferably $1 \times 10^7$ Pa or less. Additionally, auxiliary electrodes 733 and 734 are provided on the inner side of a part of the first sealing member 763. The auxiliary electrodes 733 and 734 may also extend to the inner side of a part of the second sealing member 762. Here, the auxiliary electrodes include a first auxiliary electrode 733 formed on top of the first electrode 731 and a second auxiliary electrode 734 formed on top of the second electrode 732 and separated from the first auxiliary electrode 733. Examples of the resin contained in the first sealing member 763 include ultraviolet-curing resins (specifically, resins containing acrylic resins, urethane resins, silicone resins, fluorine resins, polyimide resins, and epoxy resins). Additionally, the second sealing member 762 may also contain a resin, and in this case, examples of the resin contained in the second sealing member 762 include resins containing acrylic resins, urethane resins, silicone resins, fluorine resins, polyimide resins, and epoxy resins.

In the manufacturing of the modified example of the dimming device 700E of Example 6, first, a step similar to [Step-100A] of Example 1 is executed. Next, a step similar to [Step-100B] of Example 1 is executed. However, the resinous first sealing member 763 is formed in an edge portion of the first substrate 711 on the basis of a printing method and ultraviolet curing. Furthermore, the first auxiliary electrode 733 and the second auxiliary electrode 734 are formed. After that, a step similar to [Step-110] of Example 1 is executed. However, although the moisture-retaining member 741 is disposed on top of at least the second electrode 732, the moisture-retaining member 741 is not disposed on the top face of the first sealing member 763. Next, the second sealing member 762 is formed between the first sealing member 763 and the second substrate 712. Specifically, a liquid second sealing member is made to infiltrate between the first sealing member 763 and the second substrate 712 on the basis of capillary action. With this arrangement, the occurrence of stress caused by the second sealing member can be suppressed. Additionally, by radiating ultraviolet light, the second sealing member is cured, thereby sticking the moisture-retaining member 741 and the second sealing member 762 to the second substrate 712. In this way, the modified example 700E of the dimming device of Example 6 can be obtained.

Except for the above points, the configuration and structure of the dimming device 700E of Example 6 as well as an image display device and a display device using the dimming device 700E of Example 6 may be similar to the configuration and structure of the dimming devices 700, 700C, and 700D, the image display devices, and the display devices described in Examples 1, 4, and 5, and therefore a detailed description is omitted.

As above, with the dimming device, image display device, and display device of Example 6, a first sealing member and a second sealing member are provided between an edge portion of a first substrate and an edge portion of a second substrate. Consequently, because the entering and exiting of moisture with respect to the moisture-retaining member can be suppressed, the problem of lowered reliability of the dimming device, image display device, or display device can be avoided.

Example 7

Example 7 is a modification of Example 1 to Example 6, and relates to the optical device with structure 1-B and the image forming device with second configuration. As illustrated in a conceptual diagram of the image display device 200 in a display device (head mounted display) of Example 7 in FIG. 17, the image forming device 210 of Example 7 is constituted by the image forming device with second configuration. In other words, the image forming device 210 includes a light source 211, a scanning unit 212 for scanning parallel light emitted from the light source 211, and a lens system 213 for converting light emitted from the light source 211 into parallel light. The entire image forming device 210 is housed in a casing 215, and an opening (not illustrated) is formed in the casing 215, and light is emitted from the lens system 213 via the opening. In addition, each casing 215 is detachably attached to each of the temple portions 13 by the attachment member 19. Furthermore, in FIGS. 17, 18, 19, 26, 27, 29A, 29B, 30A, and 30B, a dimming device is not illustrated.

The light source 211 is constituted by, for example, a semiconductor laser element. In addition, light emitted from the light source 211 is converted into parallel light by a lens (not illustrated). The parallel light is horizontally and vertically scanned by the scanning unit 212 including a MEMS mirror that can make a micromirror rotatable in a two-dimensional direction and can scan incident parallel light two-dimensionally, and formed into a kind of two-dimensional image to generate virtual pixels (the number of pixels can be the same as, for example, that of Example 1). Then, then, the light from the virtual pixels (the scanning unit 212 corresponding to an image emitting portion) passes through the lens system 213 having a positive optical power, and a light flux that has been converted into parallel light is incident on the light guide plate 121.

The optical device 120 has the same configuration and structure as those of the optical device described in Example 1. Therefore, a detailed description thereof will be omitted. Furthermore, as described above, the display device of Example 7 has substantially the same configuration and structure as those of the display device of Example 1 except for a difference in the image forming device 210. Therefore, a detailed description thereof will be omitted.

Example 8

Example 8 is also a modification of Example 1 to Example 7, but relates to the optical device with structure 1-A and the image forming device with first or second configuration.

As illustrated in a conceptual diagram of the image display device 300 in a display device (head mounted display) of Example 8 in FIG. 18 the first deflecting unit 330 and the second deflecting unit 340 of Example 8 are disposed inside the light guide plate 321. In addition, the first deflecting unit 330 reflects light incident on the light guide plate 321, and the second deflecting unit 340 transmits and reflects light propagated by total reflection through the inside of the light guide plate 321 a plurality of times. In other words, the first deflecting unit 330 functions as a reflecting mirror, and the second deflecting unit 340 functions as a semi-transmissive mirror. More specifically, the first deflecting unit 330 disposed inside the light guide plate 321 is constituted by a light reflecting film (a kind of mirror) that is constituted by aluminum (Al) and reflects light incident on the light guide plate 321. Meanwhile, the second deflecting unit 340 disposed inside the light guide plate 321 is constituted by a multilayer laminated structure in which many dielectric laminated films are laminated. The dielectric laminated film includes, for example, a $TiO_2$ film as a high dielectric constant material and a $SiO_2$ film as a low dielectric constant material. Japanese Translation of PCT International Application No. 2005-521099 discloses a multilayer laminated structure in which many dielectric laminated films are laminated. Six layers of dielectric laminated films are illustrated in the drawings, but the present disclosure is not limited thereto. A thin piece containing the same material as a material constituting the light guide plate 321 is sandwiched between dielectric laminated films. In the first deflecting unit 330, parallel light incident on the light guide plate 321 is reflected so as to be totally reflected inside the light guide plate 321. Meanwhile, in the second deflecting unit 340, parallel light propagated by total reflection through the inside of the light guide plate 321 is reflected a plurality of times, and emitted from the light guide plate 321 toward the pupil 21 of the observer 20 in the state of parallel light.

As for the first deflecting unit 330, it is only required to perform the following. That is, by cutting out a portion 324 in which the first deflecting unit 330 is to be disposed in the light guide plate 321, a slope to form the first deflecting unit 330 is formed in the light guide plate 321, a light reflecting film is formed on the slope, and then the cut-out portion 324 of the light guide plate 321 is bonded to the first deflecting unit 330. Furthermore, as for the second deflecting unit 340, it is only required to perform the following. That is, a multilayer laminated structure obtained by laminating many layers of the same material (for example, glass) as a material constituting the light guide plate 321 and dielectric laminated films (for example, the dielectric laminated films can be formed by a vacuum vapor deposition method) is manufactured, a portion 325 in which the second deflecting unit 340 is to be disposed in the light guide plate 321 is cut out to form a slope, the multilayer laminated structure is bonded to the slope, and polishing or the like is performed to adjust an outer shape. In this way, the optical device 320 in which the first deflecting unit 330 and the second deflecting unit 340 are disposed inside the light guide plate 321 can be obtained.

Alternatively, FIG. 19 illustrates a conceptual diagram of the image display device 400 in the display device (head mounted display) of Example 8. In the example illustrated in FIG. 19, the image forming device 210 is constituted by the image forming device with second configuration in a similar manner to Example 7.

The display device of Example 8 has substantially the same configuration and structure as those of the display devices of Example 1 to Example 7 except for the above difference, and therefore detailed description thereof will be omitted.

Example 9

Example 9 is a modification of the image display devices of Example 7 to Example 8, and relates to the optical device with second structure and the image forming device with second configuration. FIG. 20 illustrates a schematic view of a display device of Example 9 as viewed from above.

In Example 9, the optical device 520 constituting the image display device 500 includes semi-transmissive mirrors 530A and 530B on which light emitted from a light source is incident and from which the light is emitted toward the pupil 21 of the observer 20. In Example 9, light beams emitted from light sources 211A and 211B disposed in casings 215A and 215B are propagated through the inside of an optical fiber (not illustrated), and incident on, for example, scanning units 212A and 212B attached to the rim portion 11' in the vicinity of a nose pad, and the light beams scanned by the scanning units 212A and 212B are incident on the semi-transmissive mirrors 530A and 530B, respectively. Alternatively, light beams emitted from the light sources 211A and 211B disposed in the casings 215A and 215B are propagated through the inside of an optical fiber (not illustrated), and incident on, for example, the scanning units 212A and 212B attached above the rim portion 11' corresponding to both eyes, and the light beams scanned by the scanning units 212A and 212B are incident on the semi-transmissive mirrors 530A and 530B, respectively. Alternatively, light beams emitted from the light sources 211A and 211B disposed in the casings 215A and 215B are incident on the scanning units 212A and 212B disposed in the casings 215A and 215B, and the light beams scanned by the scanning units 212A and 212B are directly incident on the semi-transmissive mirrors 530A and 530B, respectively. Then, the light beams reflected by the semi-transmissive mirrors 530A and 530B are incident on the pupils 21 of the observer 20. The image forming device 210A, 210B can be substantially the image forming device 210 described in Example 7. The display device of Example 9 has substantially the same configuration and structure as those of the display devices of Examples 7 and 8 except for the above difference, and therefore detailed description thereof will be omitted.

Example 10

Example 10 is a modification of Examples 1 to 9. FIG. 21A illustrates a schematic view of a display device of Example 10 as viewed from above. Furthermore, FIG. 21B illustrates a schematic diagram of a circuit for controlling an illuminance sensor.

The display device of Example 10 further includes an environmental illuminance measuring sensor 801 for measuring the illuminance of an environment where the display device is placed, and controls the light shielding ratio of the dimming device 700 on the basis of a measurement result of the environmental illuminance measuring sensor 801. At the same time, or independently, the display device of Example 10 controls the brightness of an image formed by the image forming device 110, 210 on the basis of the measurement result of the environmental illuminance measuring sensor 801. The environmental illuminance measuring sensor 801 having a well-known configuration and structure only needs to be disposed, for example, at an outer end portion of the dimming device 700. The environmental illuminance measuring sensor 801 is connected to the control device 18 via a connector and wiring (not illustrated). The control device 18 includes a circuit for controlling the environmental illuminance measuring sensor 801. The circuit for controlling the environmental illuminance measuring sensor 801 includes an illuminance calculating circuit for receiving a measurement value from the environmental illuminance measuring sensor 801 to determine illuminance, a comparison calculating circuit for comparing an illuminance value determined by the illuminance calculating circuit with a standard value, and an environmental illuminance measuring sensor control circuit for controlling the dimming device 700 and/or the image forming device 110, 210 on the basis of the value determined by the comparison calculating circuit. These circuits may be constituted by well-known circuits. In control of the dimming device 700, the light shielding ratio of the dimming device 700 is controlled. Meanwhile, in control of the image forming device 110, 210, the brightness of an image formed by the image forming device 110, 210 is controlled. Control of the light shielding ratio in the dimming device 700 and control of the brightness of an image in the image forming device 110, 210 may be performed independently or with correlation.

For example, when a measurement result of the environmental illuminance measuring sensor 801 becomes a predetermined value (first illuminance measurement value) or more, the light shielding ratio of the dimming device 700 is set to a predetermined value (first light shielding ratio) or more. Meanwhile, when a measurement result of the environmental illuminance measuring sensor 801 becomes a predetermined value (second illuminance measurement value) or less, the light shielding ratio of the dimming device 700 is set to a predetermined value (second light shielding ratio) or less. The first illuminance measurement value may be 10 lux. The first light shielding ratio may be any value of 99% to 70%. The second illuminance measurement value may be 0.01 lux. The second light shielding ratio may be any value of 49% to 1%.

The environmental illuminance measuring sensor 801 in Example 10 can be applied to the display device described in any one of Examples 7 to 9. Furthermore, in a case where the display device includes the camera 17, the environmental illuminance measuring sensor 801 can be constituted by a light receiving element for exposure measurement included in the camera 17.

In the display device of Example 10 or Example 11 described below, the light shielding ratio of the dimming device is controlled on the basis of a measurement result of the environmental illuminance measuring sensor, the brightness of an image formed by the image forming device is controlled on the basis of a measurement result of the environmental illuminance measuring sensor, the light shielding ratio of the dimming device is controlled on the basis of a measurement result of the transmitted light illuminance measuring sensor, and the brightness of an image formed by the image forming device is controlled on the basis of a measurement result of the transmitted light illuminance measuring sensor. Therefore, it is possible not only to impart a high contrast to a virtual image observed by an observer but also to optimize an observation state of a virtual image depending on the illuminance of an environment around the display device.

Example 11

Example 11 is also a modification of Examples 1 to 9. FIG. 22A illustrates a schematic view of a display device of Example 11 as viewed from above. Furthermore, FIG. 22B illustrates a schematic diagram of a circuit for controlling a second illuminance sensor.

The display device of Example 11 further includes a transmitted light illuminance measuring sensor 802 for measuring illuminance based on light which has passed through the dimming device from an external environment, that is, for measuring whether environmental light passes through the dimming device and is incident at desired illuminance adjusted, and controls the light shielding ratio of the dimming device 700 on the basis of a measurement result of the transmitted light illuminance measuring sensor 802. At the same time, or independently, the display device of Example 11 controls the brightness of an image formed by the image forming device 110, 210 on the basis of the measurement result of the transmitted light illuminance measuring sensor 802. The transmitted light illuminance measuring sensor 802 having a well-known configuration and structure is disposed closer to an observer side than the optical device 120, 320. Specifically, it is only required to dispose the transmitted light illuminance measuring sensor 802, for example, on an inner surface of the casing 115, 215 or on a surface of the light guide plate 121, 321 on an observer side. The transmitted light illuminance measuring sensor 802 is connected to the control device 18 via a connector and wiring (not illustrated). The control device 18 includes a circuit for controlling the transmitted light illuminance measuring sensor 802. The circuit for controlling the transmitted light illuminance measuring sensor 802 includes an illuminance calculating circuit for receiving a measurement value from the transmitted light illuminance measuring sensor 802 to determine illuminance, a comparison calculating circuit for comparing an illuminance value determined by the illuminance calculating circuit with a standard value, and a transmitted light illuminance measuring sensor control circuit for controlling the dimming device 700 and/or the image forming device 110, 210 on the basis of the value determined by the comparison calculating circuit. These circuits may be constituted by well-known circuits. In control of the dimming device 700, the light shielding ratio of the dimming device 700 is controlled. Meanwhile, in control of the image forming device 110, 210, the brightness of an image formed by the image forming device 110, 210 is controlled. Control of the light shielding ratio in the dimming device 700 and control of the brightness of an image in the image forming device 110, 210 may be performed independently or with correlation. Furthermore, in a case where a measurement result of the transmitted light illuminance measuring sensor 802 cannot be controlled to desired illuminance in view of the illuminance of the environmental illuminance measuring sensor 801, that is, in a case where a measurement result of the transmitted light illuminance measuring sensor 802 is not desired illuminance, or in a case where even more delicate illumination adjustment is desired, it is only required to adjust the light shielding ratio of the dimming device while a value of the transmitted light illuminance measuring sensor 802 is monitored. At least two transmitted light illuminance measuring sensors may be disposed, and illuminance based on light which has passed through a portion with a high light shielding ratio and illuminance based on light which has passed through a portion with a low light shielding ratio may be measured.

The transmitted light illuminance measuring sensor 802 in Example 11 can be applied to the display device described in any one of Examples 7 to 9. Alternatively, the transmitted light illuminance measuring sensor 802 in Example 11 and the environmental illuminance measuring sensor 801 in Example 10 may be combined with each other. In this case, various tests may be performed, and control of a light shielding ratio in the dimming device 700 and control of the brightness of an image in the image forming device 110, 210 may be performed independently or with correlation. By adjusting voltages applied to the first electrode and the second electrode in each of the right eye dimming device and the left eye dimming device, light shielding ratios in the right eye dimming device and the left eye dimming device can be equalized. A potential difference between the first electrode and the second electrode may be controlled, or a voltage applied to the first electrode and a voltage applied to the second electrode may be independently controlled. The light shielding ratios in the right eye dimming device and the left eye dimming device can be controlled, for example, on the basis of a measurement result of the transmitted light illuminance measuring sensor 802, or can be controlled and adjusted manually by observation of the lightness of light which has passed through the right eye dimming device and optical device and the lightness of light which has passed through the left eye dimming device and optical device by an observer and operation of a switch, a button, a dial, a slider, a knob, or the like by the observer.

Example 12

Example 12 is a modification of Examples 1 to 11. FIG. 23 illustrates a schematic view of a display device of Example 12 as viewed from above. FIG. 24 illustrates a schematic front view of an optical device and a dimming device of Example 12. In the display device of Example 12, a light shielding member 811 is formed on an outer surface of the dimming device 700 facing the first deflecting unit 130, 330 in order to prevent light from leaking to the outside of the light guide plate 121, 321 to reduce light utilization efficiency. Alternatively, as illustrated in a schematic view viewed from above in FIG. 25, the light shielding member 812 is disposed outside the second surface 123, 323 of the light guide plate 121, 321 so as to cover the first deflecting unit 130, 330. An orthogonally projected image of the first deflecting unit 130, 330 on the light guide plate 121, 321 is included in an orthogonally projected image of the light shielding member 811, 812 on the light guide plate 121, 321. Specifically, for example, in a region of the light guide plate 121, 321 on which light emitted from the image forming device 110, 210 is incident, more specifically, in a region where the first deflecting unit 130, 330 is disposed, the light shielding member 811, 812 for shielding incidence of external light on the light guide plate 121, 321 is disposed. The region of the light guide plate 121, 321 on which light emitted from the image forming device 110, 210 is incident is included in an orthogonally projected image of the light shielding member 811, 812 on the light guide plate 121, 321.

The light shielding member 811, 812 is disposed away from the light guide plate 121, 321 on the opposite side to a side where the image forming device 110, 210 is disposed in the light guide plate 121, 321. The light shielding member 811 is disposed on a part of the second substrate 712. Specifically, by printing opaque ink on the second substrate 712, the light shielding member 811 can be formed. The light shielding member 812 is manufactured, for example, from an opaque plastic material. The light shielding member 812 integrally extends from the casing 115, 215 of the image forming device 110, 210, is attached to the casing 115, 215 of the image forming device 110, 210, extends integrally from the frame 10, is attached to the frame 10, or is attached to the light guide plate 121, 321. In the illustrated example, the light shielding member 812 integrally extends from the casing 115, 215 of the image forming device 110, 210. In this way, the light shielding member 811, 812 for shielding incidence of external light on the light guide plate 121, 321 is disposed in a region on which light emitted from the image forming device 110, 210 is incident in the light guide plate 121, 321. Therefore, external light is not incident on the region on which light emitted from the image forming device 110, 210 is incident in the light guide plate 121, 321, specifically on the first deflecting unit 130, 330. Therefore, deterioration in image display quality of the display device due to generation of undesirable stray light or the like does not occur. The light shielding member 811 can be combined with the light shielding member 812.

Example 13

Example 13 is a modification of Example 7. As illustrated in a conceptual diagram of an image display device of Example 13 in FIG. 26 or 27, an optical member 151 may be disposed in the optical device 120 so as to face the second deflecting unit 140. Light from the image forming device 210 is deflected (or reflected) by the first deflecting unit 130, propagated by total reflection through the inside of the light guide plate 121, deflected by the second deflecting unit 140, and incident on the optical member 151. The optical member 151 emits the incident light toward the pupil 21 of the observer 20. A large part of the light passing through the second deflecting unit 140 does not satisfy diffraction conditions in the second deflecting unit 140, and therefore is not diffracted or reflected by the second deflecting unit 140 and is incident on the pupil 21 of the observer 20. The optical member 151 is constituted, for example, by a hologram lens, and is disposed, for example, on a second surface side of the light guide plate 121. The second deflecting unit 140 is disposed on the second surface side of the light guide plate 121 (refer to FIG. 26) or on a first surface side (refer to FIG. 27).

In addition, in this case, the lens system 213 on which light from the image forming device 210 is incident and from which the light is emitted toward the light guide plate 121 may be further included. The image forming device 210 may be in a conjugate relationship with the pupil 21 of the observer 20. The lens system 213 and the optical member 151 may form a both-side telecentric system. Alternatively, an image emitting portion from which an image is emitted in the image forming device 210 may be located at a front focal point of the lens system 213 having a positive optical power, the pupil 21 (more specifically, a crystalline lens) of the observer 20 may be located at a rear focal point of the optical member 151 having a positive optical power, and a front focal point of the optical member 151 may be located at a rear focal point of the lens system 213. Here, when the image forming device 210 is in a conjugate relationship with the pupil 21 of the observer 20, if the image forming device 210 is placed at the position of the pupil 21 of the observer 20, an image is formed at the original position of the image forming device 210. Furthermore, when the lens system 213 and the optical member 151 form a both-side telecentric system, an incident pupil of the lens system 213 is at infinity, and an emission pupil of the optical member 151 is at infinity.

As described above, examples of the lens system 213 include an optical system having a positive optical power as a whole, such as a convex lens, a concave lens, a free curved surface prism, a hologram lens, or a combination thereof. A value of the positive optical power possessed by the lens system 213 may be larger than a value of the positive optical power possessed by the optical member 151. The optical power is a reciprocal of a focal length. Therefore, in other words, the focal length of the optical member 151 may be longer than the focal length of the lens system 213. In some cases, the diaphragm 114 is disposed at a position of a front focal point (focal point on the image forming device side) of the lens system 213. In some cases, the optical member 151 constitutes a kind of concave mirror, and the pupil 21 of the observer 20 (specifically, a crystalline lens of the observer) is located at a position of a rear focal point of the optical member 151.

Examples of a material constituting the hologram lens include a photopolymer material. The constituent material and basic structure of the hologram lens only need to be the same as those of a conventional hologram lens. An interference fringe for exerting a function as a lens (more specifically, a concave mirror) is formed in the hologram lens. A method for forming the interference fringe itself only needs to be the same as a conventional forming method. Specifically, for example, by irradiating a member constituting the hologram lens (for example, a photopolymer material) with object light from a first predetermined direction on one side, and at the same time, by irradiating the member constituting the hologram lens with reference light from a second predetermined direction on the other side, it is only required to record an interference fringe formed by the object light and the reference light inside the member constituting the hologram lens. For example, one of the object light and the reference light is a divergent beam, and the other is a focused beam. By appropriately selecting the first predetermined direction, the second predetermined direction, and the wavelengths of the object light and the reference light, an appropriate interference fringe can be formed in the hologram lens, and a desired positive optical power can be thereby imparted.

As illustrated in a conceptual diagram illustrating the optical system in FIG. 28, as described above, a structure in which the image forming device 210 (specifically, an image emitting portion) is in a conjugate relationship with the pupil (specifically, a crystalline lens) of the observer 20, and the lens system 213 and the optical member 151 form a both-side telecentric system can be cited. Alternatively, an image emitting portion (specifically, the scanning unit 212) from which an image is emitted in the image forming device 210 may be located at a front focal point $f_{1F}$ of the lens system 213 having a positive optical power, the pupil 21 (more specifically, a crystalline lens) of the observer 20 may be located at a rear focal point $f_{2B}$ of the optical member 151 having a positive optical power, and the front focal point $f_{2F}$ of the optical member 151 may be located at the rear focal point $f_{1B}$ of the lens system 213. Furthermore, as described above, the lens system 213 and the optical member 151 each have a positive optical power. In addition, in this case, a value of the positive optical power possessed by the lens system 213 may be larger than a value of the positive optical power possessed by the optical member 151. In other words, the focal length ($f_{2B}$) of the optical member 151 may be longer than the focal length ($f_{1F}$) of the lens system 213. Here, the scanning unit 212 corresponding to an image emitting portion is disposed at the position of the front focal point $f_{1F}$ (focal point on the image forming device side) of the lens system 213. Meanwhile, the optical member 151 constitutes a kind of concave mirror, and the pupil 21 (specifically, a crystalline lens) of the observer 20 is located at the position of the rear focal point $f_{2B}$ of the optical member 151.

In the image display device having such a structure and configuration, as described above, light (for example, corresponding to the size of one pixel or one subpixel) emitted from the light source 211 at a certain moment is converted into parallel light, scanned by the scanning unit 212, and incident on the lens system 213 in the form of parallel light. The light emitted from the lens system 213 forms an image once at the rear focal point (which is also the front focal point of the optical member 151) of the lens system 213, and is incident on the optical member 151. The light emitted from the optical member 151 is converted into parallel light and reaches the pupil 21 (specifically, a crystalline lens) of the observer 20 in the form of parallel light. Then, the light that has passed through the crystalline lens ultimately forms an image on a retina of the pupil 21 of the observer 20.

It goes without saying that the configuration and structure of the above-described image display device of Example 13 can be applied to Examples 1 to 12.

Example 14

Example 14 is a modification of the optical device constituting the optical device with second structure described in Example 9. FIGS. 29A and 29B illustrate schematic views of a display device of Example 14 as viewed from above.

In the example illustrated in FIG. 29A, light emitted from a light source 601 enters a light guide member 602 and collides with a polarization beam splitter 603 disposed in the light guide member 602. In the light that has been emitted from the light source 601 and has collided with the polarization beam splitter 603, a P polarization component passes through the polarization beam splitter 603, and an S polarization component is reflected by the polarization beam splitter 603 to travel toward a liquid crystal display device (LCD) 604 constituted by LCOS as a light valve. The liquid crystal display device (LCD) 604 forms an image. A polarization component of the light reflected by the liquid crystal display device (LCD) 604 is occupied by the P polarization component. Therefore, the light reflected by the liquid crystal display device (LCD) 604 passes through the polarization beam splitter 603, 605, passes through a quarter wave plate 606, collides with and reflected by a reflecting plate 607, passes through the quarter wave plate 606, and travels toward the polarization beam splitter 605. The polarization component of light at this time is occupied by the S polarization component. Therefore, the light is reflected by the polarization beam splitter 605 and travels toward the pupil 21 of an observer. As described above, the image forming device includes the light source 601 and the liquid crystal display device (LCD) 604. The optical device includes the light guide member 602, the polarization beam splitter 603, 605, the quarter wave plate 606, and the reflecting plate 607. The polarization beam splitter 605 corresponds to a virtual image forming region of the optical device.

In the example illustrated in FIG. 29B, light coming from an image forming device 611 travels through a light guide member 612 and collides with a semi-transmissive mirror 613. A part of the light passes through the semi-transmissive mirror 613, collides with and reflected by a reflecting plate 614, and collides with the semi-transmissive mirror 613 again. A part of the light is reflected by the semi-transmissive mirror 613 and travels toward the pupil 21 of an observer. As described above, the optical device includes the light guide member 612, the semi-transmissive mirror 613, and the reflecting plate 614. The semi-transmissive mirror 613 corresponds to a virtual image forming region of the optical device.

Alternatively, FIGS. 30A and 30B illustrate schematic views of a modified example of the display device of Example 14 as viewed from above and as viewed from a side, respectively. This optical device includes a hexahedron prism 622 and a convex lens 625. Light emitted from the image forming device 621 is incident on the prism 622, collides with and reflected by a prism surface 623, travels through the prism 622, collides with and reflected by a prism surface 624, and reaches the pupil 21 of an observer via the convex lens 625. The prism surface 623 and the prism surface 624 are inclined in a facing direction, and the planar shape of the prism 622 is a trapezoid, specifically, an isosceles trapezoid. Mirror coating has been applied to the prism surface 623, 624. If the thickness (height) of a portion of the prism 622 facing the pupil 21 is thinner than 4 mm which is an average pupil diameter of a human, an observer can view a virtual image from the prism 622 superimposed on an image of an outside world.

Example 15

In Example 1, a dimming device built into an image display device is described, but the dimming device of the present disclosure can also be used independently, without being built into an image display device. In other words, such a dimming device 700F of the present disclosure can be applied to a window, for example.

As illustrated in FIG. 31 by the schematic cross-sectional view, the dimming device 700F includes:

a first substrate 711;

a second substrate 712, disposed facing the first substrate 711, which external light enters;

a first electrode (not illustrated) formed on top of the first substrate;

a dimming layer 720 formed on top of the first electrode;

a second electrode (not illustrated) formed on top of at least the dimming layer; and a moisture-retaining member (not illustrated) that covers at least the second electrode and faces the second substrate. Note that the dimming device 700F has a configuration and structure substantially similar to those of the dimming devices 700, 700A, 700B, 700C, 700D, and 700E described in Examples 1 to 6. Herein, in the example illustrated in the diagram, the dimming device 700F is attached to a window frame 900. Such a dimming device 700F of the present disclosure can be applied to a window, a mirror, a reflex mirror, various types of display devices, and a screen, for example. Note that window glass 901 is also attached to the window frame 900.

The foregoing describes the present disclosure on the basis of Examples, but the present disclosure is not limited to these Examples. The configuration and structure of the display device (head-mounted display), image display device, and image forming device described in the Examples are for illustrative purposes, and may be modified as appropriate. The outward shape of the dimming device can be substantially any shape. FIG. 32 illustrates a dimming device having an elliptical outward shape. Furthermore, Example 1 and Example 2 may also be combined.

As illustrated in FIG. 33A or 33B by a schematic cross-sectional view similar to the view obtained by cutting along the arrow A-A in FIG. 2A, for example, in a modified example of the dimming device of Example 1, the cross-sectional shape of the sealing members 733, 734, 735, and 736 may become narrower as approaching the second substrate 712. Note that in the example illustrated in FIG. 33A, the top faces of the sealing members 733, 734, 735, and 736 are flat, while in the example illustrated in FIG. 33A, the top faces of the sealing members 733, 734, 735, and 736 are rounded. By causing the cross-sectional shape of the sealing members 733, 734, 735, and 736 to have such a shape, when the moisture-retaining member 741 is disposed on top of at least the second electrode 732 and the moisture-retaining member extending portion 743 that extends from the moisture-retaining member 741 is disposed on top of the sealing member, the occurrence of problems such as air bubbles getting under the moisture-retaining member 741 may be avoided. Note that such a problem occurs readily in the region labeled "region A" in FIGS. 33A and 33B. Such a cross-sectional shape of the sealing members 733, 734, 735, and 736 may be formed on the basis of any of various methods, such as molding of the sealing member based on a printing method or molding of the sealing member based on a sputtering method using a metal mask that causes wraparound, for example.

In the dimming device of the Examples, the dimming device may also be curved. With this arrangement, the dimming device can be easily and reliably mounted to the image display device or the display device. When the coloring/decoloring properties of the flat dimming device of Example 1 are taken to be 100%, the coloring/decoloring properties of a curved dimming device are as stated in Table 1 below. As Table 1 demonstrates, even if the dimming device is curved to a 30 mm radius of curvature, the coloring/decoloring properties are not discernibly changed.

TABLE 1

| Radius of curvature | Coloring property | Decoloring property |
|---|---|---|
| 100 mm | 98.1% | 98.1% |
| 50 mm | 97.5% | 102.7% |
| 30 mm | 99.0% | 103.9% |

For example, a surface relief type hologram (refer to U.S. Pat. No. 20040062505 A1) may be disposed on the light guide plate. In the optical device, the diffraction grating element may be constituted by a transmission type diffraction grating element. Alternatively, one of the first deflecting unit and the second deflecting unit may be constituted by a reflection type diffraction grating element, and the other may be constituted by a transmission type diffraction grating element. Alternatively, the diffraction grating element may be a reflection type blazed diffraction grating member. The display device of the present disclosure can also be used as a stereoscopic displaying device. In this case, if necessary, it is only required to detachably attach a polarizing plate or a polarizing film to the optical device, or to stick the polarizing plate or the polarizing film to the optical device.

In Examples, it has been described that the image forming device 110, 210 displays an image of a single color (for example, green), but the image forming device 110, 210 can display a color image. In this case, the light source only needs to include light sources for emitting, for example, red, green, and blue, respectively. Specifically, for example, it is only required to obtain white light by mixing colors of red light, green light, and blue light emitted from the red light emitting element, the green light emitting element, and the blue light emitting element, respectively, using a light pipe and uniformizing brightness. In some cases, light passing through the dimming device may be colored in a desired color by the dimming device. In this case, a color in which light is colored by the dimming device may be variable. Specifically, for example, it is only required to laminate a dimming device for coloring light in red, a dimming device for coloring light in green, and a dimming device for coloring light in blue.

Alternatively, a diffraction grating member (red diffraction grating member) including a diffraction grating layer including a hologram diffraction grating for diffracting and reflecting light having a red wavelength band (or wavelength) may be disposed on a first light guide plate, a diffraction grating member (green diffraction grating member) including a diffraction grating layer including a hologram diffraction grating for diffracting and reflecting light having a green wavelength band (or wavelength) may be disposed on a second light guide plate, a diffraction grating member (blue diffraction grating member) including a diffraction grating layer including a hologram diffraction grating for diffracting and reflecting light having a blue wavelength band (or wavelength) may be disposed on a third light guide plate, and the first light guide plate, the second light guide plate, and the third light guide plate may be stacked with a gap therebetween. Alternatively, one of the red diffraction grating member, the green diffraction grating member, and the blue diffraction grating member may be disposed on the first light guide plate, one of the remaining two diffraction grating members out of the red diffraction grating member, the green diffraction grating member, and the blue diffraction grating member may be disposed on a surface different from the first light guide plate on which the diffraction grating member is disposed, the remaining one diffraction grating member out of the red diffraction grating member, the green diffraction grating member, and the blue diffraction crating member may be disposed on a second light guide plate, and the first light guide plate and the second light guide plate may be stacked with a gap therebetween.

The light shielding ratio in the dimming device can be controlled, for example, on the basis of a simple matrix method. In other words, as Illustrated in a schematic plan view in FIG. 34, the first electrode 731 includes a plurality of band-shaped first electrode segments 731A extending in a first direction, the second electrode 732 includes a plurality of band-shaped second electrode segments 732A extending in a second direction different from the first direction, and the light shielding ratio of a portion of the dimming device corresponding to an overlap region between the first electrode segments 731A and the second electrode segments 732A (minimum unit region 730A in which the light shielding ratio of the dimming device changes) is controlled on the basis of control of voltages applied to the first electrode segments 731A and the second electrode segments 732A. The first direction is perpendicular to the second direction. Specifically, the first direction extends in a transverse direction (X direction), and the second direction extends in a longitudinal direction (Y direction). Note that with such a configuration, the auxiliary electrode is unnecessary, and the dimming device described in Examples 2 to 6 can be applied as appropriate.

Note that the present disclosure may have the following configurations.

[A01] <<Dimming device: first aspect>>

A dimming device including:

a first substrate;

a second substrate, disposed facing the first substrate, which external light enters;

a first electrode formed on top of the first substrate;

a dimming layer formed on top of the first electrode;

a second electrode formed on top of at least the dimming layer;

a moisture-retaining member that covers at least the second electrode and faces the second substrate; and a sealing member provided in an edge portion of the first substrate, in which a moisture-retaining member extending portion that extends from the moisture-retaining member is disposed between the sealing member and the second substrate, and a thickness of the moisture-retaining member extending portion is thinner than a thickness of the moisture-retaining member in a central portion of the dimming device.

[A02] The dimming device according to [A01], in which the second electrode is formed extending over from a dimming layer to a first substrate, and separated from a first electrode, and the moisture-retaining member covers at least the second electrode and the dimming layer.

[A03] The dimming device according to [A01] or [A02], in which a part of the sealing member is an auxiliary electrode.
[A04] The dimming device according to [A03], in which the auxiliary electrode includes a first auxiliary electrode formed on top of the first electrode and a second auxiliary electrode formed on top of the second electrode and separated from the first auxiliary electrode.
[A05] The dimming device according to [A01] or [A02], in which the sealing member contains a resin.
[A06] The dimming device according to [A05], in which the resin contained in the sealing member has a Young's modulus of $1\times10^7$ Pa or less.
[A07] The dimming device according to [A05] or [A06], in which an auxiliary electrode is provided on an inner side of a part of the sealing member.
[A08] The dimming device according to [A07], in which the auxiliary electrode includes a first auxiliary electrode formed on top of the first electrode and a second auxiliary electrode formed on top of the second electrode and separated from the first auxiliary electrode.
[A09] The dimming device according to [A01] or [A02], in which the sealing member includes a protruding portion provided in an edge portion of the first substrate.
[A10] The dimming device according to [A09], in which an auxiliary electrode is provided on an inner side of a part of the sealing member.
[A11] The dimming device according to [A10], in which the auxiliary electrode includes a first auxiliary electrode formed on top of the first electrode and a second auxiliary electrode formed on top of the second electrode and separated from the first auxiliary electrode.
[A12] The dimming device according to any one of [A01] to [A11], in which a cross-sectional shape of the sealing member becomes narrower as approaching the second substrate.
[A13] The dimming device according to any one of [A01] to [A12], in which an inorganic film is formed on a face of the second substrate that faces the moisture-retaining member.
[A14] The dimming device according to any one of [A01] to [A13], in which a material contained in the moisture-retaining member has a Young's modulus of $1\times10^6$ Pa or less.
[A15] The dimming device according to [A14], in which a resin contained in the moisture-retaining member is an acrylic resin, a silicone resin, or a urethane resin.
[A16] The dimming device according to any one of [A01] to [A16], in which the dimming device is curved.
[A17] The image display device according to any one of [A01] to
[A16], in which the dimming layer is provided with an electrochromic material layer.
[A18] The image display device according to [A17], in which the electrochromic material layer has a laminated structure of an oxidation coloring layer, an electrolyte layer, and a reduction coloring layer.
[B01]<<Dimming device: Second aspect>>
A dimming device including:
a first substrate;
a second substrate, disposed facing the first substrate, which external light enters;
a first electrode formed on top of the first substrate;
a dimming layer formed on top of the first electrode;
a second electrode formed on top of at least the dimming layer; and
a moisture-retaining member that covers at least the second electrode and faces the second substrate, in which
the dimming device further includes
a first sealing member disposed on top of an edge portion of the first substrate, and
a second sealing member disposed between the first sealing member and the second substrate.
[B02] The dimming device according to [B01], in which
the second electrode is formed extending over from a dimming layer to a first substrate, and separated from a first electrode, and
the moisture-retaining member covers at least the second electrode and the dimming layer.
[B03] The dimming device according to [B01] or [B02], in which an auxiliary electrode is provided on an inner side of a part of at least of the first sealing member.
[B04] The dimming device according to [B03] or [B04], in which the auxiliary electrode includes a first auxiliary electrode formed on top of the first electrode and a second auxiliary electrode formed on top of the second electrode and separated from the first auxiliary electrode.
[B05] The dimming device according to any one of [B01] to [B04], in which the first sealing member and the second sealing member contain a resin.
[B06] The dimming device according to [B05], in which the resin contained in the first sealing member and the second sealing member has a Young's modulus of $1\times10^7$ Pa or less.
[B07] The dimming device according to [B01] or [B02], in which a part of the first sealing member is an auxiliary electrode.
[B08] The dimming device according to [B07], in which the auxiliary electrode includes a first auxiliary electrode formed on top of the first electrode and a second auxiliary electrode formed on top of the second electrode and separated from the first auxiliary electrode.
[B09] The dimming device according to [B07] or [B08], in which the second sealing member contains a resin.
[B10] The dimming device according to any one of [B01] to [B09], in which cross-sectional shapes of the first sealing member and the second sealing member become narrower as approaching the second substrate.
[B11] The dimming device according to any one of [B01] to [B10], in which an inorganic film is formed on a face of the second substrate that faces the moisture-retaining member.
[B12] The dimming device according to any one of [B01] to [B12], in which a material contained in the moisture-retaining member has a Young's modulus of $1\times10^6$ Pa or less.
[B13] The dimming device according to [B12], in which a resin contained in the moisture-retaining member is an acrylic resin, a silicone resin, or a urethane resin.
[B14] The dimming device according to any one of [B01] to [B13], in which the dimming device is curved.
[B15] The image display device according to any one of [B01] to [B14], in which the dimming layer is provided with an electrochromic material layer.
[B16] The image display device according to [B15], in which the electrochromic material layer has a laminated structure of an oxidation coloring layer, an electrolyte layer, and a reduction coloring layer.
[C01]<<Image display device>>
An image display device including:
an image forming device;
an optical device having a virtual image forming region where a virtual image is formed on the basis of light emitted from the image forming device; and
a dimming device that adjusts the amount of external light incident from outside, disposed to face at least the virtual image forming region, in which the dimming device includes
a first substrate,
a second substrate, disposed facing the first substrate, which external light enters,
a first electrode formed on top of the first substrate,
a dimming layer formed on top of the first electrode,
a second electrode formed on top of at least the dimming layer,
a moisture-retaining member that covers at least the second electrode and faces the second substrate, and
a sealing member provided in an edge portion of the first substrate,
a moisture-retaining member extending portion that extends from the moisture-retaining member is disposed between the sealing member and the second substrate, and
a thickness of the moisture-retaining member extending portion is thinner than a thickness of the moisture-retaining member in a central portion of the dimming device.

[C02]<<Image display device>>
An image display device including:
an image forming device;
an optical device having a virtual image forming region where a virtual image is formed on the basis of light emitted from the image forming device; and
a dimming device that adjusts the amount of external light incident from outside, disposed to face at least the virtual image forming region, in which
the dimming device includes the dimming device according to any one of [A01] to [B16].

[D01]<<Display device>>
A display device including:
a frame to be mounted on a head of an observer; and
an image display device attached to the frame, in which
the image display device includes
an image forming device,
an optical device having a virtual image forming region where a virtual image is formed on the basis of light emitted from the image forming device, and
a dimming device that adjusts the amount of external light incident from outside, disposed to face at least the virtual image forming region,
the dimming device includes
a first substrate,
a second substrate, disposed facing the first substrate, which external light enters,
a first electrode formed on top of the first substrate,
a dimming layer formed on top of the first electrode,
a second electrode formed on top of at least the dimming layer,
a moisture-retaining member that covers at least the second electrode and faces the second substrate, and
a sealing member provided in an edge portion of the first substrate,
a moisture-retaining member extending portion that extends from the moisture-retaining member is disposed between the sealing member and the second substrate, and
a thickness of the moisture-retaining member extending portion is thinner than a thickness of the moisture-retaining member in a central portion of the dimming device.

[D02]<<Display device>>
A display device including:
a frame to be mounted on a head of an observer; and
an image display device attached to the frame, in which
the image display device includes:
an image forming device;
an optical device having a virtual image forming region where a virtual image is formed on the basis of light emitted from the image forming device; and
a dimming device that adjusts the amount of external light incident from outside, disposed to face at least the virtual image forming region, and
the dimming device includes the dimming device according to any one of [A01] to [B16].

[D03] The display device according to [D01] or [D02], in which at least an edge portion of the second substrate is fixed to the frame.

[D04] The display device according to any one of [D01] to [D03], in which light passing through the dimming device is colored in a desired color by the dimming device.

[D05] The display device according to [D04], in which a color in which light is colored by the dimming device is variable.

[D06] The display device according to [D04], in which a color in which light is colored by the dimming device is fixed.

[E01]<<Dimming device manufacturing method>>
A dimming device manufacturing method including the steps of:
forming a first electrode, a dimming layer, and a second electrode on top of a first substrate, and after providing a sealing member in an edge portion of the first substrate;
disposing a moisture-retaining member on top of at least the second electrode, and disposing a moisture-retaining member extending portion that extends from the moisture-retaining member on top of the sealing member; and
disposing a second substrate on top of the moisture-retaining member and the moisture-retaining member extending portion.

REFERENCE SIGNS LIST

10 Frame
10' Nose pad
11 Front portion
11' Rim portion
12 Hinge
13 Temple portion
14 Modern portion
15 Wiring (signal line, power supply line, or the like)
16 Headphone portion
16' Headphone portion wiring
17 Camera
18 Control device (control circuit or control unit)
19 Attachment member
20 Observer
21 Pupil
100, 200, 300, 400, 500 Image display device
110, 210 Image forming device
111 Organic EL display device
211, 211A, 211B Light source
212 Scanning unit
113A, 113B, 213 Lens system
114 Diaphragm
115, 215 Casing
120, 320, 520 Optical device
121, 321 Light guide plate
122, 322 First surface of light guide plate
123, 323 Second surface of light guide plate
324, 325 Portion of light guide plate
130 First deflecting unit (first diffraction grating member)

140 Second deflecting unit (second diffraction grating member)
330 First deflecting unit
340 Second deflecting unit (virtual image forming region)
151 Optical member (hologram lens)
530A, 530B Semi-transmissive mirror
601 Light source
602 Light guide member
603, 605 Polarization beam splitter
604 Liquid crystal display device
606 Quarter wave plate
607 Reflecting plate
611 Image forming device
612 Light guide member
613 Semi-transmissive mirror
614 Reflecting plate
621 Image forming device
622 Prism
623, 624 Prism surface
625 Convex lens
700, 700A Dimming device
710 Dimming layer
711 First substrate
712 Second substrate
713 Protruding portion provided in edge portion of first substrate
714 Inorganic film
720 Dimming layer (electrochromic material layer)
721 Reduction coloring layer ($WO_3$ layer)
722 Electrolyte layer ($Ta_2O_5$ layer)
723 Oxidation coloring layer ($Ir_xSn_{1-x}O$ layer)
731 First electrode
732 Second electrode
733, 734, 735, 736, 751 Sealing member
733 First auxiliary electrode
733' First branching auxiliary electrode
734 Second auxiliary electrode
734' Second branching auxiliary electrode
737, 738 Adhesive
741 Moisture-retaining member
742 Moisture-retaining member in central portion of dimming device (region thereof)
743 Moisture-retaining member extending portion
744 Layer containing same material that of as moisture-retaining member
761, 763 First sealing member
762 Second sealing member
801 Environmental illuminance measuring sensor
802 Transmitted light illuminance measuring sensor
811, 812 Light shielding member
900 Window frame
901 Window glass

The invention claimed is:

1. A dimming device, comprising:
a first substrate;
a second substrate facing the first substrate, wherein the second substrate is configured to receive external light;
a first electrode on the first substrate;
a dimming layer on the first electrode;
a second electrode on at least the dimming layer;
a moisture-retaining member that covers at least the second electrode and faces the second substrate;
a sealing member in an edge portion of the first substrate; and
a moisture-retaining member extending portion that extends from the moisture-retaining member, wherein the moisture-retaining member extending portion is between the sealing member and the second substrate, and
a thickness of the moisture-retaining member extending portion is thinner than a thickness of the moisture-retaining member in a central portion of the dimming device.

2. The dimming device according to claim 1, wherein
the second electrode extends over from the dimming layer to the first substrate,
the second electrode is separated from the first electrode, and
the moisture-retaining member covers at least the second electrode and the dimming layer.

3. The dimming device according to claim 1, wherein a part of the sealing member is an auxiliary electrode.

4. The dimming device according to claim 3, wherein
the auxiliary electrode includes:
a first auxiliary electrode on the first electrode, and
a second auxiliary electrode on the second electrode, and the second auxiliary electrode is separated from the first auxiliary electrode.

5. The dimming device according to claim 1, wherein the sealing member contains a resin.

6. The dimming device according to claim 5, wherein the resin contained in the sealing member has a Young's modulus of $1\times10^7$ Pa or less.

7. The dimming device according to claim 5, further comprising an auxiliary electrode on an inner side of a part of the sealing member.

8. The dimming device according to claim 7, wherein
the auxiliary electrode includes:
a first auxiliary electrode on the first electrode, and
a second auxiliary electrode on the second electrode, and the second auxiliary electrode is separated from the first auxiliary electrode.

9. The dimming device according to claim 1, wherein the sealing member includes a protruding portion in the edge portion of the first substrate.

10. The dimming device according to claim 9, further comprising an auxiliary electrode on an inner side of a part of the sealing member.

11. The dimming device according to claim 10, wherein
the auxiliary electrode includes:
a first auxiliary electrode on the first electrode, and
a second auxiliary electrode on the second electrode, and the second auxiliary electrode is separated from the first auxiliary electrode.

12. The dimming device according to claim 1, wherein
a first part of a cross-sectional shape of the sealing member is narrower than a second part of the cross-sectional shape of the sealing member, and
the first part of the cross-sectional shape of the sealing member is closer to the second substrate than the second part of the cross-sectional shape of the sealing member.

13. The dimming device according to claim 1, further comprising an inorganic film on a face of the second substrate, wherein the face of the second substrate faces the moisture-retaining member.

14. The dimming device according to claim 1, wherein the moisture-retaining member includes a material that has a Young's modulus of $1\times10^6$ Pa or less.

15. The dimming device according to claim 14, wherein the material includes at least one of an acrylic resin, a silicone resin, or a urethane resin.

16. The dimming device according to claim 1, wherein the dimming device has a curved shape.

17. A dimming device, comprising:
a first substrate;
a second substrate facing the first substrate, wherein the second substrate is configured to receive external light;
a first electrode on the first substrate;
a dimming layer on the first electrode;
a second electrode on at least the dimming layer;
a moisture-retaining member that covers at least the second electrode and faces the second substrate;
a first sealing member on an edge portion of the first substrate; and
a second sealing member between the first sealing member and the second substrate.

18. An image display device, comprising:
an image forming device;
an optical device having a virtual image forming region, wherein the image forming device is configured to:
emit light, and
form a virtual image on the virtual image forming region based on the emitted light; and
a dimming device configured to adjust an amount of external light incident from outside of the image display device, wherein
the dimming device faces at least the virtual image forming region, and
the dimming device includes:
a first substrate,
a second substrate facing the first substrate, wherein the second substrate is configured to receive the external light,
a first electrode on the first substrate,
a dimming layer on the first electrode,
a second electrode on at least the dimming layer,
a moisture-retaining member that covers at least the second electrode and faces the second substrate,
a sealing member in an edge portion of the first substrate, and
a moisture-retaining member extending portion that extends from the moisture-retaining member, wherein
the moisture-retaining member extending portion is between the sealing member and the second substrate, and
a thickness of the moisture-retaining member extending portion is thinner than a thickness of the moisture-retaining member in a central portion of the dimming device.

19. A display device, comprising:
a frame mountable on a head of an observer; and
an image display device attached to the frame, wherein the image display device includes:
an image forming device,
an optical device having a virtual image forming region, wherein the image forming device is configured to:
emit light, and
form a virtual image on the virtual image forming region based on the emitted light, and
a dimming device configured to adjust an amount of external light incident from outside of the image display device, wherein
the dimming device faces at least the virtual image forming region, and
the dimming device includes:
a first substrate,
a second substrate facing the first substrate, wherein the second substrate is configured to receive the external light,
a first electrode on the first substrate,
a dimming layer on the first electrode,
a second electrode on at least the dimming layer,
a moisture-retaining member that covers at least the second electrode and faces the second substrate,
a sealing member in an edge portion of the first substrate, and
a moisture-retaining member extending portion that extends from the moisture-retaining member, wherein
the moisture-retaining member extending portion is between the sealing member and the second substrate, and
a thickness of the moisture-retaining member extending portion is thinner than a thickness of the moisture-retaining member in a central portion of the dimming device.

20. A dimming device manufacturing method, comprising:
forming a first electrode, a dimming layer, and a second electrode on a first substrate;
providing a sealing member in an edge portion of the first substrate after the forming of the first electrode, the dimming layer, and the second electrode;
disposing a moisture-retaining member on at least the second electrode;
disposing, on the sealing member, a moisture-retaining member extending portion that extends from the moisture-retaining member; and
disposing a second substrate on the moisture-retaining member and the moisture-retaining member extending portion.

* * * * *